United States Patent
Donoghue et al.

(10) Patent No.: US 11,076,189 B2
(45) Date of Patent: Jul. 27, 2021

(54) PERSONAL MEDIA CHANNEL APPARATUS AND METHODS

(75) Inventors: Patrick Donoghue, Sea Cliff, NY (US); Jay Thomas, Denver, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 1795 days.

(21) Appl. No.: 12/414,554

(22) Filed: Mar. 30, 2009

(65) Prior Publication Data

US 2010/0251304 A1 Sep. 30, 2010

(51) Int. Cl.
*H04N 21/258* (2011.01)
*H04N 21/2668* (2011.01)
(Continued)

(52) U.S. Cl.
CPC ... *H04N 21/2668* (2013.01); *H04N 21/25883* (2013.01); *H04N 21/25891* (2013.01);
(Continued)

(58) Field of Classification Search
CPC ....... H04N 21/25891; H04N 21/26258; H04N 21/2665; H04N 21/4826; H04N 21/2668;
(Continued)

(56) References Cited

U.S. PATENT DOCUMENTS

| 4,677,501 A | 6/1987 | Saltzman et al. |
| 5,253,066 A | 10/1993 | Vogel et al. |

(Continued)

FOREIGN PATENT DOCUMENTS

| EP | 1087619 A1 | 3/2001 |
| EP | 1821459 A1 | 8/2007 |

(Continued)

OTHER PUBLICATIONS

US 6,940,674 B2, 09/2005, Sakamoto (withdrawn)
(Continued)

*Primary Examiner* — Nasser M Goodarzi
*Assistant Examiner* — Patrick A Ryan
(74) *Attorney, Agent, or Firm* — Gazdzinski & Associates, PC

(57) ABSTRACT

Network content delivery apparatus and methods based on content compiled from various sources and particularly selected for a given user. In one embodiment, the network comprises a cable television network, and the content sources include DVR, broadcast, nPVR, and VOD. The user-targeted content is assembled into a playlist, and displayed as a continuous stream on a virtual channel particular to that user. User interfaces accessible through the virtual channel present various functional options, including the selection or exploration of content having similarity or prescribed relationships to other content, and the ability to order purchasable content. An improved electronic program guide is also disclosed which allows a user to start over, record, view, receive information on, "catch up", and rate content. Apparatus for remote access and configuration of the playlist and virtual channel functions, as well as a business rules "engine" implementing operational or business goals, are also disclosed.

18 Claims, 20 Drawing Sheets

(51) Int. Cl.
  *H04N 21/472* (2011.01)
  *H04N 21/475* (2011.01)
  *H04N 21/482* (2011.01)
  *H04N 21/442* (2011.01)
  *H04N 5/45* (2011.01)
  *H04N 21/422* (2011.01)
  *H04N 21/431* (2011.01)
  *H04N 21/47* (2011.01)

(52) U.S. Cl.
  CPC ... *H04N 21/44204* (2013.01); *H04N 21/4755* (2013.01); *H04N 21/4756* (2013.01); *H04N 21/47202* (2013.01); *H04N 21/47214* (2013.01); *H04N 21/482* (2013.01); *H04N 21/4826* (2013.01); *H04N 5/45* (2013.01); *H04N 21/42204* (2013.01); *H04N 21/4316* (2013.01); *H04N 21/47* (2013.01)

(58) Field of Classification Search
  CPC ....... H04N 21/47202; H04N 21/47214; H04N 21/4755; H04N 21/4756; H04N 21/482
  USPC .............................................. 725/34, 36, 38
  See application file for complete search history.

(56) References Cited

U.S. PATENT DOCUMENTS

| | | |
|---|---|---|
| 5,285,272 A | 2/1994 | Bradley et al. |
| 5,335,277 A | 8/1994 | Harvey et al. |
| 5,357,276 A | 10/1994 | Banker et al. |
| 5,371,551 A | 12/1994 | Logan et al. |
| 5,410,344 A | 4/1995 | Graves et al. |
| 5,436,917 A | 7/1995 | Karasawa |
| 5,477,263 A | 12/1995 | O'Callaghan et al. |
| 5,517,257 A | 5/1996 | Dunn et al. |
| 5,528,282 A | 6/1996 | Voeten et al. |
| 5,528,284 A | 6/1996 | Iwami et al. |
| 5,534,911 A | 7/1996 | Levitan |
| 5,543,927 A | 8/1996 | Herz |
| 5,550,640 A | 8/1996 | Tsuboi et al. |
| 5,557,319 A | 9/1996 | Gurusami et al. |
| 5,579,183 A | 11/1996 | Van Gestel et al. |
| 5,619,247 A | 4/1997 | Russo |
| 5,628,284 A | 5/1997 | Sheen et al. |
| 5,671,386 A | 9/1997 | Blair et al. |
| 5,682,597 A | 10/1997 | Ganek et al. |
| 5,687,275 A | 11/1997 | Lane et al. |
| 5,699,360 A | 12/1997 | Nishida et al. |
| 5,708,961 A | 1/1998 | Hylton et al. |
| 5,710,970 A | 1/1998 | Walters et al. |
| 5,721,878 A | 2/1998 | Ottesen et al. |
| 5,727,113 A | 3/1998 | Shimoda |
| 5,729,280 A | 3/1998 | Inoue et al. |
| 5,729,648 A | 3/1998 | Boyce et al. |
| 5,745,837 A | 4/1998 | Fuhrmann |
| 5,748,254 A | 5/1998 | Harrison et al. |
| 5,758,257 A | 5/1998 | Herz et al. |
| 5,778,187 A | 7/1998 | Monteiro et al. |
| 5,793,971 A | 8/1998 | Fujita et al. |
| 5,794,217 A | 8/1998 | Allen |
| 5,798,785 A | 8/1998 | Hendricks et al. |
| 5,808,608 A | 9/1998 | Young et al. |
| 5,818,438 A | 10/1998 | Howe et al. |
| 5,818,510 A | 10/1998 | Cobbley et al. |
| 5,822,493 A | 10/1998 | Uehara et al. |
| 5,822,530 A | 10/1998 | Brown |
| 5,838,921 A | 11/1998 | Speeter |
| 5,844,552 A | 12/1998 | Gaughan et al. |
| 5,850,218 A | 12/1998 | Lajoie et al. |
| 5,861,881 A | 1/1999 | Freeman et al. |
| 5,887,243 A | 3/1999 | Harvey et al. |
| 5,897,635 A | 4/1999 | Torres et al. |
| 5,915,068 A | 6/1999 | Levine |
| 5,917,538 A | 6/1999 | Asamizuya |
| 5,940,738 A | 8/1999 | Rao |
| 5,999,525 A | 12/1999 | Krishnaswamy et al. |
| 5,999,535 A | 12/1999 | Krishnaswamy et al. |
| 6,005,603 A | 12/1999 | Flavin |
| 6,026,211 A | 2/2000 | Nakamura et al. |
| 6,046,760 A | 4/2000 | Jun |
| 6,047,327 A | 4/2000 | Tso et al. |
| 6,052,588 A | 4/2000 | Mo et al. |
| 6,055,358 A | 4/2000 | Traxlmayr |
| 6,065,050 A | 5/2000 | Demoney |
| 6,108,002 A | 8/2000 | Ishizaki |
| 6,115,532 A | 9/2000 | Saeki |
| 6,118,472 A | 9/2000 | Dureau et al. |
| 6,118,922 A | 9/2000 | Van Gestel et al. |
| 6,125,397 A | 9/2000 | Yoshimura et al. |
| 6,167,432 A | 12/2000 | Jiang |
| 6,172,712 B1 | 1/2001 | Beard |
| 6,177,931 B1 | 1/2001 | Alexander et al. |
| 6,181,697 B1 | 1/2001 | Nurenberg et al. |
| 6,219,710 B1 | 4/2001 | Gray et al. |
| 6,233,389 B1 * | 5/2001 | Barton et al. ................. 386/232 |
| 6,253,375 B1 | 6/2001 | Gordon et al. |
| 6,259,701 B1 | 7/2001 | Shur et al. |
| 6,314,572 B1 | 11/2001 | Larocca et al. |
| 6,317,884 B1 | 11/2001 | Eames et al. |
| 6,324,338 B1 | 11/2001 | Wood et al. |
| 6,345,038 B1 | 2/2002 | Selinger |
| 6,389,538 B1 | 5/2002 | Gruse et al. |
| 6,396,531 B1 | 5/2002 | Gerszberg et al. |
| 6,442,328 B1 | 8/2002 | Elliott et al. |
| 6,442,332 B1 | 8/2002 | Knudson et al. |
| 6,473,793 B1 | 10/2002 | Dillon et al. |
| 6,519,062 B1 | 2/2003 | Yoo |
| 6,523,696 B1 | 2/2003 | Saito et al. |
| 6,532,593 B1 | 3/2003 | Moroney |
| 6,543,053 B1 | 4/2003 | Li et al. |
| 6,546,016 B1 | 4/2003 | Gerszberg et al. |
| 6,564,381 B1 | 5/2003 | Hodge et al. |
| 6,581,207 B1 | 6/2003 | Sumita et al. |
| 6,609,253 B1 | 8/2003 | Swix et al. |
| 6,640,145 B2 | 10/2003 | Hoffberg et al. |
| 6,642,938 B1 * | 11/2003 | Gilboy ........................ 715/721 |
| 6,642,939 B1 | 11/2003 | Vallone et al. |
| 6,643,262 B1 | 11/2003 | Larsson et al. |
| 6,694,145 B2 | 2/2004 | Riikonen et al. |
| 6,711,742 B1 | 3/2004 | Kishi et al. |
| 6,718,552 B1 | 4/2004 | Goode |
| 6,721,789 B1 | 4/2004 | Demoney |
| 6,748,395 B1 | 6/2004 | Picker et al. |
| 6,754,904 B1 | 6/2004 | Cooper et al. |
| 6,757,906 B1 | 6/2004 | Look et al. |
| 6,769,127 B1 | 7/2004 | Bonomi et al. |
| 6,774,926 B1 * | 8/2004 | Ellis et al. ................. 348/14.01 |
| 6,788,676 B2 | 9/2004 | Partanen et al. |
| 6,847,778 B1 | 1/2005 | Vallone et al. |
| 6,865,746 B1 | 3/2005 | Herrington et al. |
| 6,909,726 B1 | 6/2005 | Sheeran |
| 6,917,614 B1 | 7/2005 | Laubach et al. |
| 6,917,641 B2 | 7/2005 | Kotzin et al. |
| 6,918,131 B1 | 7/2005 | Rautila et al. |
| 6,925,257 B2 | 8/2005 | Yoo |
| 6,931,018 B1 | 8/2005 | Fisher |
| 6,931,657 B1 | 8/2005 | Marsh |
| 6,934,964 B1 | 8/2005 | Schaffer et al. |
| 6,944,150 B1 | 9/2005 | McConnell et al. |
| 6,978,474 B1 | 12/2005 | Sheppard et al. |
| 6,981,045 B1 | 12/2005 | Brooks |
| 7,003,670 B2 | 2/2006 | Heaven et al. |
| 7,006,881 B1 | 2/2006 | Hoffberg et al. |
| 7,009,972 B2 | 3/2006 | Maher et al. |
| 7,013,290 B2 | 3/2006 | Ananian |
| 7,020,652 B2 | 3/2006 | Matz et al. |
| 7,027,460 B2 | 4/2006 | Iyer et al. |
| 7,039,048 B1 | 5/2006 | Monta et al. |
| 7,051,352 B1 | 5/2006 | Schaffer |
| 7,054,902 B2 | 5/2006 | Toporek et al. |
| 7,055,031 B2 | 5/2006 | Platt |
| 7,055,165 B2 | 5/2006 | Connelly |
| 7,068,639 B1 | 6/2006 | Varma et al. |

(56) References Cited

U.S. PATENT DOCUMENTS

| | | |
|---|---|---|
| 7,096,483 B2 | 8/2006 | Johnson |
| 7,099,308 B2 | 8/2006 | Merrill et al. |
| 7,100,183 B2 | 8/2006 | Kunkel et al. |
| 7,103,905 B2 | 9/2006 | Novak |
| 7,106,382 B2 | 9/2006 | Shiotsu |
| 7,146,627 B1 | 12/2006 | Ismail et al. |
| 7,149,772 B1 | 12/2006 | Kalavade |
| 7,167,895 B1 | 1/2007 | Connelly |
| 7,174,126 B2 | 2/2007 | McElhatten et al. |
| 7,174,127 B2 | 2/2007 | Otten et al. |
| 7,174,385 B2 | 2/2007 | Li |
| 7,185,355 B1* | 2/2007 | Ellis et al. ............ 725/46 |
| 7,197,708 B1 | 3/2007 | Frendo et al. |
| 7,206,775 B2 | 4/2007 | Kaiser et al. |
| 7,207,055 B1 | 4/2007 | Hendricks et al. |
| 7,209,458 B2 | 4/2007 | Ahvonen et al. |
| 7,213,036 B2 | 5/2007 | Apparao et al. |
| 7,228,656 B2 | 6/2007 | Mitchell et al. |
| 7,240,359 B1 | 7/2007 | Sie et al. |
| 7,242,960 B2 | 7/2007 | Van Rooyen et al. |
| 7,242,988 B1 | 7/2007 | Hoffberg et al. |
| 7,228,556 B2 | 8/2007 | Beach et al. |
| 7,254,608 B2 | 8/2007 | Yeager et al. |
| 7,257,106 B2 | 8/2007 | Chen et al. |
| 7,260,823 B2 | 8/2007 | Schlack et al. |
| 7,265,927 B2 | 9/2007 | Sugiyama et al. |
| 7,293,276 B2 | 11/2007 | Phillips et al. |
| 7,312,391 B2 | 12/2007 | Kaiser et al. |
| 7,325,043 B1* | 1/2008 | Rosenberg et al. ............ 709/219 |
| 7,325,073 B2 | 1/2008 | Shao et al. |
| 7,330,483 B1 | 2/2008 | Peters, Jr. et al. |
| 7,330,510 B2 | 2/2008 | Castillo et al. |
| 7,333,483 B2 | 2/2008 | Zhao et al. |
| 7,336,787 B2 | 2/2008 | Unger et al. |
| 7,337,458 B2 | 2/2008 | Michelitsch et al. |
| 7,340,759 B1 | 3/2008 | Rodriguez |
| 7,340,762 B2 | 3/2008 | Kim |
| 7,359,375 B2 | 4/2008 | Lipsanen et al. |
| 7,363,643 B2 | 4/2008 | Drake et al. |
| 7,376,386 B2 | 5/2008 | Phillips et al. |
| 7,382,786 B2 | 6/2008 | Chen et al. |
| 7,444,655 B2 | 10/2008 | Sardera |
| 7,457,520 B2 | 11/2008 | Rossetti et al. |
| 7,486,869 B2 | 2/2009 | Alexander et al. |
| 7,487,523 B1 | 2/2009 | Hendricks |
| 7,532,712 B2 | 5/2009 | Gonder et al. |
| 7,548,562 B2 | 6/2009 | Ward et al. |
| 7,567,983 B2 | 7/2009 | Pickelsimer et al. |
| 7,571,452 B2 | 8/2009 | Gutta |
| 7,592,912 B2 | 9/2009 | Hasek et al. |
| 7,602,820 B2 | 10/2009 | Helms |
| 7,609,637 B2 | 10/2009 | Doshi et al. |
| 7,624,337 B2 | 11/2009 | Sull et al. |
| 7,650,319 B2 | 1/2010 | Hoffberg et al. |
| 7,690,020 B2 | 3/2010 | Lebar |
| 7,693,171 B2 | 4/2010 | Gould |
| 7,721,314 B2 | 5/2010 | Sincaglia et al. |
| 7,725,553 B2 | 5/2010 | Rang et al. |
| 7,742,074 B2 | 6/2010 | Minatogawa |
| 7,763,360 B2 | 7/2010 | Paul et al. |
| 7,770,200 B2 | 8/2010 | Brooks et al. |
| 7,787,539 B2 | 8/2010 | Chen |
| 7,809,942 B2 | 10/2010 | Baran et al. |
| 7,889,765 B2 | 2/2011 | Brooks et al. |
| 7,893,171 B2 | 2/2011 | Le et al. |
| 7,900,052 B2 | 3/2011 | Jonas et al. |
| 7,908,626 B2 | 3/2011 | Williamson et al. |
| 7,916,755 B2 | 3/2011 | Hasek et al. |
| 7,924,451 B2 | 4/2011 | Hirooka |
| 7,936,775 B2 | 5/2011 | Iwamura |
| 7,937,725 B1 | 5/2011 | Schaffer et al. |
| 7,954,131 B2 | 5/2011 | Cholas et al. |
| 7,975,283 B2 | 7/2011 | Bedingfield, Sr. et al. |
| 7,987,491 B2 | 7/2011 | Reisman |
| 8,015,306 B2 | 9/2011 | Bowman |
| 8,024,762 B2 | 9/2011 | Britt |
| 8,032,914 B2 | 10/2011 | Rodriguez |
| 8,042,054 B2 | 10/2011 | White et al. |
| 8,046,836 B2 | 10/2011 | Isokawa |
| 8,056,103 B2 | 11/2011 | Candelore |
| 8,090,014 B2 | 1/2012 | Cheung et al. |
| 8,090,104 B2 | 1/2012 | Wajs et al. |
| 8,095,610 B2 | 1/2012 | Gould et al. |
| 8,099,757 B2 | 1/2012 | Riedl et al. |
| 8,151,194 B1 | 4/2012 | Chan et al. |
| 8,151,294 B2 | 4/2012 | Carlucci et al. |
| 8,166,126 B2 | 4/2012 | Bristow et al. |
| 8,170,065 B2 | 5/2012 | Hasek et al. |
| 8,181,209 B2 | 5/2012 | Hasek et al. |
| 8,214,256 B2 | 7/2012 | Riedl et al. |
| 8,219,134 B2 | 7/2012 | Maharajh et al. |
| 8,249,497 B2 | 8/2012 | Ingrassia et al. |
| 8,280,982 B2 | 10/2012 | La Joie et al. |
| 8,281,352 B2 | 10/2012 | Brooks et al. |
| 8,341,242 B2 | 12/2012 | Dillon et al. |
| 8,347,341 B2 | 1/2013 | Markley et al. |
| 8,396,055 B2 | 3/2013 | Patel et al. |
| 8,429,702 B2 | 4/2013 | Yasrebi et al. |
| 8,484,511 B2 | 7/2013 | Engel et al. |
| 8,516,529 B2 | 8/2013 | Lajoie et al. |
| 8,520,850 B2 | 8/2013 | Helms et al. |
| 8,549,013 B1 | 10/2013 | Sarma et al. |
| 8,561,103 B2* | 10/2013 | Begeja ............ H04N 7/165 725/10 |
| 8,561,116 B2 | 10/2013 | Hasek |
| 8,677,431 B2 | 3/2014 | Smith |
| 8,713,623 B2 | 4/2014 | Brooks |
| 8,731,053 B2 | 5/2014 | Karegoudar |
| 8,738,607 B2 | 5/2014 | Dettinger et al. |
| 8,750,490 B2 | 6/2014 | Murtagh et al. |
| 8,750,909 B2 | 6/2014 | Fan et al. |
| 8,805,270 B2 | 8/2014 | Maharajh et al. |
| 8,813,122 B1* | 8/2014 | Montie ............ H04N 21/4826 386/292 |
| 8,949,919 B2 | 2/2015 | Cholas et al. |
| 8,995,815 B2 | 3/2015 | Maharajh et al. |
| 9,015,736 B2* | 4/2015 | Cordray ............ H04N 21/431 725/10 |
| 9,021,566 B1 | 4/2015 | Panayotopoulos et al. |
| 9,124,608 B2 | 9/2015 | Jin et al. |
| 9,124,650 B2 | 9/2015 | Maharajh et al. |
| 9,215,423 B2 | 12/2015 | Kimble et al. |
| 2001/0004768 A1 | 6/2001 | Hodge et al. |
| 2001/0047516 A1 | 11/2001 | Swain et al. |
| 2001/0050924 A1 | 12/2001 | Herrmann et al. |
| 2001/0050945 A1 | 12/2001 | Lindsey |
| 2002/0002688 A1 | 1/2002 | Gregg et al. |
| 2002/0024943 A1 | 2/2002 | Karaul et al. |
| 2002/0026645 A1 | 2/2002 | Son et al. |
| 2002/0027883 A1 | 3/2002 | Belaiche |
| 2002/0027894 A1 | 3/2002 | Arrakoski et al. |
| 2002/0031120 A1 | 3/2002 | Rakib |
| 2002/0032754 A1 | 3/2002 | Logston et al. |
| 2002/0042914 A1 | 4/2002 | Walker et al. |
| 2002/0042921 A1 | 4/2002 | Ellis |
| 2002/0049755 A1 | 4/2002 | Koike |
| 2002/0053076 A1 | 5/2002 | Landesmann |
| 2002/0056087 A1* | 5/2002 | Berezowski ............ G06Q 30/02 725/9 |
| 2002/0056125 A1 | 5/2002 | Hodge et al. |
| 2002/0059218 A1 | 5/2002 | August et al. |
| 2002/0059619 A1 | 5/2002 | Lebar |
| 2002/0066033 A1 | 5/2002 | Dobbins et al. |
| 2002/0083451 A1 | 6/2002 | Gill et al. |
| 2002/0087995 A1 | 7/2002 | Pedlow et al. |
| 2002/0100059 A1 | 7/2002 | Buehl et al. |
| 2002/0123931 A1 | 9/2002 | Splaver et al. |
| 2002/0143607 A1 | 10/2002 | Connelly |
| 2002/0144267 A1 | 10/2002 | Gutta et al. |
| 2002/0147771 A1 | 10/2002 | Traversat et al. |
| 2002/0152091 A1 | 10/2002 | Nagaoka et al. |
| 2002/0152299 A1 | 10/2002 | Traversat et al. |
| 2002/0152474 A1* | 10/2002 | Dudkiewicz ...... G06F 17/30817 725/136 |

(56) References Cited

U.S. PATENT DOCUMENTS

| | | |
|---|---|---|
| 2002/0174430 A1 | 11/2002 | Ellis et al. |
| 2002/0174433 A1 | 11/2002 | Baumgartner et al. |
| 2002/0178444 A1 | 11/2002 | Trajkovic et al. |
| 2002/0188744 A1* | 12/2002 | Mani .................. H04L 65/1006 709/231 |
| 2002/0188869 A1 | 12/2002 | Patrick |
| 2002/0188947 A1 | 12/2002 | Wang et al. |
| 2002/0191950 A1 | 12/2002 | Wang |
| 2002/0194595 A1 | 12/2002 | Miller et al. |
| 2003/0005453 A1 | 1/2003 | Rodriguez et al. |
| 2003/0005457 A1 | 1/2003 | Faibish et al. |
| 2003/0028451 A1 | 2/2003 | Ananian |
| 2003/0028873 A1 | 2/2003 | Lemmons |
| 2003/0046704 A1 | 3/2003 | Laksono et al. |
| 2003/0056217 A1 | 3/2003 | Brooks |
| 2003/0061618 A1 | 3/2003 | Horiuchi et al. |
| 2003/0086422 A1 | 5/2003 | Klinker et al. |
| 2003/0093790 A1 | 5/2003 | Logan et al. |
| 2003/0093794 A1* | 5/2003 | Thomas et al. ................. 725/46 |
| 2003/0097574 A1 | 5/2003 | Upton |
| 2003/0115267 A1 | 6/2003 | Hinton et al. |
| 2003/0118014 A1 | 6/2003 | Iyer et al. |
| 2003/0123465 A1 | 7/2003 | Donahue |
| 2003/0135628 A1 | 7/2003 | Fletcher et al. |
| 2003/0135860 A1 | 7/2003 | Dureau |
| 2003/0163443 A1 | 8/2003 | Wang |
| 2003/0165241 A1 | 9/2003 | Fransdonk |
| 2003/0166401 A1 | 9/2003 | Combes et al. |
| 2003/0188317 A1 | 10/2003 | Liew et al. |
| 2003/0200548 A1 | 10/2003 | Baran et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2003/0220100 A1 | 11/2003 | McElhatten et al. |
| 2004/0015986 A1 | 1/2004 | Carver et al. |
| 2004/0019913 A1 | 1/2004 | Wong et al. |
| 2004/0031058 A1 | 2/2004 | Reisman |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0049694 A1 | 3/2004 | Candelore |
| 2004/0057457 A1 | 3/2004 | Ahn et al. |
| 2004/0083177 A1 | 4/2004 | Chen et al. |
| 2004/0117254 A1 | 6/2004 | Nemirofsky et al. |
| 2004/0117838 A1 | 6/2004 | Karaoguz et al. |
| 2004/0133923 A1 | 7/2004 | Watson et al. |
| 2004/0137918 A1 | 7/2004 | Varonen et al. |
| 2004/0158870 A1 | 8/2004 | Paxton et al. |
| 2004/0166832 A1 | 8/2004 | Portman et al. |
| 2004/0216158 A1 | 10/2004 | Blas |
| 2004/0230994 A1 | 11/2004 | Urdang et al. |
| 2004/0250273 A1 | 12/2004 | Swix et al. |
| 2004/0268398 A1 | 12/2004 | Fano et al. |
| 2004/0268403 A1 | 12/2004 | Krieger et al. |
| 2005/0002418 A1 | 1/2005 | Yang et al. |
| 2005/0002638 A1 | 1/2005 | Putterman et al. |
| 2005/0005308 A1 | 1/2005 | Logan et al. |
| 2005/0034171 A1 | 2/2005 | Benya |
| 2005/0047501 A1 | 3/2005 | Yoshida et al. |
| 2005/0049886 A1 | 3/2005 | Grannan et al. |
| 2005/0050579 A1 | 3/2005 | Dietz et al. |
| 2005/0055220 A1 | 3/2005 | Lee et al. |
| 2005/0055729 A1 | 3/2005 | Atad et al. |
| 2005/0071882 A1 | 3/2005 | Rodriguez et al. |
| 2005/0086334 A1 | 4/2005 | Aaltonen et al. |
| 2005/0086683 A1 | 4/2005 | Meyerson |
| 2005/0097599 A1 | 5/2005 | Plotnick et al. |
| 2005/0108763 A1 | 5/2005 | Baran et al. |
| 2005/0114701 A1 | 5/2005 | Atkins et al. |
| 2005/0114900 A1 | 5/2005 | Ladd et al. |
| 2005/0157731 A1 | 7/2005 | Peters |
| 2005/0165899 A1 | 7/2005 | Mazzola |
| 2005/0177855 A1 | 8/2005 | Maynard et al. |
| 2005/0188415 A1 | 8/2005 | Riley |
| 2005/0223097 A1 | 10/2005 | Ramsayer et al. |
| 2005/0228725 A1 | 10/2005 | Rao et al. |
| 2005/0289616 A1 | 12/2005 | Horiuchi et al. |
| 2005/0289618 A1 | 12/2005 | Hardin |
| 2006/0020786 A1 | 1/2006 | Helms et al. |
| 2006/0021004 A1 | 1/2006 | Moran et al. |
| 2006/0021019 A1 | 1/2006 | Hinton et al. |
| 2006/0041905 A1 | 2/2006 | Wasilewski |
| 2006/0041915 A1 | 2/2006 | Dimitrova et al. |
| 2006/0047957 A1 | 3/2006 | Helms et al. |
| 2006/0053463 A1 | 3/2006 | Choi |
| 2006/0059532 A1 | 3/2006 | Dugan et al. |
| 2006/0061682 A1* | 3/2006 | Bradley ................... H04N 5/46 348/441 |
| 2006/0090186 A1 | 4/2006 | Santangelo et al. |
| 2006/0095940 A1 | 5/2006 | Yearwood |
| 2006/0117379 A1 | 6/2006 | Bennett et al. |
| 2006/0130099 A1 | 6/2006 | Rooyen |
| 2006/0130101 A1 | 6/2006 | Wessel Van Rooyen et al. |
| 2006/0130107 A1 | 6/2006 | Gonder et al. |
| 2006/0130113 A1 | 6/2006 | Carlucci |
| 2006/0136964 A1 | 6/2006 | Diez et al. |
| 2006/0136968 A1 | 6/2006 | Han et al. |
| 2006/0139379 A1 | 6/2006 | Toma et al. |
| 2006/0149850 A1 | 7/2006 | Bowman |
| 2006/0156392 A1 | 7/2006 | Baugher et al. |
| 2006/0161635 A1 | 7/2006 | Lamkin et al. |
| 2006/0165082 A1 | 7/2006 | Pfeffer et al. |
| 2006/0165173 A1 | 7/2006 | Kim et al. |
| 2006/0171423 A1 | 8/2006 | Helms et al. |
| 2006/0187900 A1 | 8/2006 | Akbar |
| 2006/0206712 A1 | 9/2006 | Dillaway et al. |
| 2006/0209799 A1 | 9/2006 | Gallagher et al. |
| 2006/0218601 A1 | 9/2006 | Michel |
| 2006/0218604 A1 | 9/2006 | Riedl et al. |
| 2006/0221246 A1 | 10/2006 | Yoo |
| 2006/0236358 A1 | 10/2006 | Liu et al. |
| 2006/0238656 A1 | 10/2006 | Chen et al. |
| 2006/0248553 A1 | 11/2006 | Mikkelson et al. |
| 2006/0259927 A1 | 11/2006 | Acharya et al. |
| 2006/0288366 A1 | 12/2006 | Boylan et al. |
| 2006/0291506 A1 | 12/2006 | Cain |
| 2007/0014293 A1 | 1/2007 | Filsfils et al. |
| 2007/0019645 A1 | 1/2007 | Menon |
| 2007/0022459 A1 | 1/2007 | Gaebel, Jr. et al. |
| 2007/0022469 A1 | 1/2007 | Cooper et al. |
| 2007/0025372 A1 | 2/2007 | Brenes et al. |
| 2007/0033282 A1 | 2/2007 | Mao et al. |
| 2007/0033531 A1 | 2/2007 | Marsh |
| 2007/0038671 A1 | 2/2007 | Holm et al. |
| 2007/0049245 A1 | 3/2007 | Lipman |
| 2007/0050822 A1 | 3/2007 | Stevens et al. |
| 2007/0053513 A1 | 3/2007 | Hoffberg et al. |
| 2007/0061023 A1 | 3/2007 | Hoffberg I. et al. |
| 2007/0067851 A1 | 3/2007 | Fernando et al. |
| 2007/0073704 A1* | 3/2007 | Bowden et al. ................. 707/10 |
| 2007/0076728 A1 | 4/2007 | Rieger et al. |
| 2007/0081537 A1 | 4/2007 | Wheelock |
| 2007/0094691 A1 | 4/2007 | Gazdzinski |
| 2007/0113246 A1 | 5/2007 | Xiong |
| 2007/0118848 A1* | 5/2007 | Schwesinger et al. ........... 725/9 |
| 2007/0121578 A1 | 5/2007 | Annadata et al. |
| 2007/0121678 A1 | 5/2007 | Brooks et al. |
| 2007/0124488 A1 | 5/2007 | Baum et al. |
| 2007/0136777 A1 | 6/2007 | Hasek et al. |
| 2007/0153820 A1 | 7/2007 | Gould |
| 2007/0154041 A1 | 7/2007 | Beauchamp |
| 2007/0157234 A1 | 7/2007 | Walker |
| 2007/0157262 A1 | 7/2007 | Ramaswamy et al. |
| 2007/0180230 A1 | 8/2007 | Cortez |
| 2007/0192103 A1 | 8/2007 | Sato et al. |
| 2007/0204300 A1 | 8/2007 | Markley et al. |
| 2007/0204314 A1 | 8/2007 | Hasek et al. |
| 2007/0209054 A1 | 9/2007 | Cassanova |
| 2007/0209059 A1 | 9/2007 | Moore et al. |
| 2007/0217436 A1 | 9/2007 | Markley |
| 2007/0219910 A1 | 9/2007 | Martinez |
| 2007/0226365 A1 | 9/2007 | Hildreth et al. |
| 2007/0245376 A1 | 10/2007 | Svendsen |

(56) References Cited

U.S. PATENT DOCUMENTS

| | | |
|---|---|---|
| 2007/0250880 A1 | 10/2007 | Hainline |
| 2007/0261089 A1* | 11/2007 | Aaby .................. H04N 7/17318 725/100 |
| 2007/0261116 A1 | 11/2007 | Prafullchandra et al. |
| 2007/0276925 A1 | 11/2007 | La Joie et al. |
| 2007/0276926 A1 | 11/2007 | Lajoie et al. |
| 2007/0280298 A1 | 12/2007 | Hearn et al. |
| 2007/0288637 A1 | 12/2007 | Layton et al. |
| 2007/0288715 A1 | 12/2007 | Boswell et al. |
| 2007/0294717 A1 | 12/2007 | Hill et al. |
| 2007/0294738 A1 | 12/2007 | Kuo et al. |
| 2007/0299728 A1 | 12/2007 | Nemirofsky et al. |
| 2008/0021836 A1 | 1/2008 | Lao |
| 2008/0022012 A1 | 1/2008 | Wang |
| 2008/0036917 A1 | 2/2008 | Pascarella et al. |
| 2008/0059804 A1 | 3/2008 | Shah et al. |
| 2008/0066112 A1 | 3/2008 | Bailey et al. |
| 2008/0086750 A1 | 4/2008 | Yasrebi et al. |
| 2008/0091805 A1 | 4/2008 | Malaby et al. |
| 2008/0091807 A1 | 4/2008 | Strub et al. |
| 2008/0092181 A1 | 4/2008 | Britt et al. |
| 2008/0098212 A1 | 4/2008 | Helms et al. |
| 2008/0098241 A1 | 4/2008 | Cheshire |
| 2008/0098450 A1 | 4/2008 | Wu et al. |
| 2008/0101460 A1 | 5/2008 | Rodriguez |
| 2008/0109853 A1 | 5/2008 | Einarsson et al. |
| 2008/0112405 A1 | 5/2008 | Cholas |
| 2008/0133551 A1 | 6/2008 | Wensley et al. |
| 2008/0134043 A1 | 6/2008 | Georgis et al. |
| 2008/0134165 A1 | 6/2008 | Anderson et al. |
| 2008/0137541 A1 | 6/2008 | Agarwal et al. |
| 2008/0137740 A1 | 6/2008 | Thoreau et al. |
| 2008/0155059 A1 | 6/2008 | Hardin et al. |
| 2008/0155614 A1 | 6/2008 | Cooper et al. |
| 2008/0162353 A1 | 7/2008 | Tom et al. |
| 2008/0168487 A1 | 7/2008 | Chow et al. |
| 2008/0170551 A1 | 7/2008 | Zaks |
| 2008/0177998 A1 | 7/2008 | Apsangi et al. |
| 2008/0178225 A1 | 7/2008 | Jost |
| 2008/0184344 A1 | 7/2008 | Hernacki et al. |
| 2008/0189617 A1 | 8/2008 | Covell et al. |
| 2008/0192820 A1 | 8/2008 | Brooks et al. |
| 2008/0198780 A1 | 8/2008 | Sato |
| 2008/0200154 A1 | 8/2008 | Maharajh et al. |
| 2008/0201386 A1 | 8/2008 | Maharajh et al. |
| 2008/0201736 A1 | 8/2008 | Gordon et al. |
| 2008/0201748 A1 | 8/2008 | Hasek et al. |
| 2008/0215755 A1 | 9/2008 | Farber et al. |
| 2008/0222684 A1 | 9/2008 | Mukraj et al. |
| 2008/0229379 A1 | 9/2008 | Akhter |
| 2008/0235746 A1 | 9/2008 | Peters |
| 2008/0244667 A1 | 10/2008 | Osborne |
| 2008/0256615 A1 | 10/2008 | Schlacht et al. |
| 2008/0273591 A1 | 11/2008 | Brooks et al. |
| 2008/0279534 A1 | 11/2008 | Buttars |
| 2008/0281971 A1 | 11/2008 | Leppanen et al. |
| 2008/0282299 A1 | 11/2008 | Koat et al. |
| 2008/0297669 A1 | 12/2008 | Zalewski et al. |
| 2008/0306903 A1 | 12/2008 | Larson et al. |
| 2008/0320523 A1* | 12/2008 | Morris et al. .................. 725/47 |
| 2008/0320528 A1 | 12/2008 | Kim et al. |
| 2008/0320540 A1 | 12/2008 | Brooks et al. |
| 2009/0006211 A1 | 1/2009 | Perry et al. |
| 2009/0025027 A1 | 1/2009 | Craner |
| 2009/0030802 A1* | 1/2009 | Plotnick et al. ................ 705/14 |
| 2009/0031335 A1* | 1/2009 | Hendricks et al. .............. 725/1 |
| 2009/0064221 A1 | 3/2009 | Stevens |
| 2009/0083279 A1 | 3/2009 | Hasek |
| 2009/0083811 A1 | 3/2009 | Dolce et al. |
| 2009/0083813 A1 | 3/2009 | Dolce et al. |
| 2009/0086643 A1 | 4/2009 | Kotrla et al. |
| 2009/0094347 A1 | 4/2009 | Ting et al. |
| 2009/0098861 A1 | 4/2009 | Kalliola et al. |
| 2009/0100459 A1 | 4/2009 | Riedl et al. |
| 2009/0100493 A1 | 4/2009 | Jones et al. |
| 2009/0133048 A1 | 5/2009 | Gibbs et al. |
| 2009/0133090 A1* | 5/2009 | Busse .................. H04N 7/163 725/132 |
| 2009/0141696 A1 | 6/2009 | Chou et al. |
| 2009/0150210 A1 | 6/2009 | Athsani et al. |
| 2009/0150917 A1 | 6/2009 | Huffman et al. |
| 2009/0151006 A1 | 6/2009 | Saeki et al. |
| 2009/0158311 A1* | 6/2009 | Hon et al. ........................ 725/14 |
| 2009/0172757 A1* | 7/2009 | Aldrey .................. H04N 7/173 725/110 |
| 2009/0172776 A1 | 7/2009 | Makagon et al. |
| 2009/0175218 A1 | 7/2009 | Song et al. |
| 2009/0185576 A1 | 7/2009 | Kisel et al. |
| 2009/0187939 A1 | 7/2009 | LaJoie |
| 2009/0187944 A1 | 7/2009 | White et al. |
| 2009/0193486 A1 | 7/2009 | Patel et al. |
| 2009/0201917 A1 | 8/2009 | Maes et al. |
| 2009/0210899 A1 | 8/2009 | Lawrence-Apfelbaum |
| 2009/0210912 A1 | 8/2009 | Cholas et al. |
| 2009/0225760 A1 | 9/2009 | Foti |
| 2009/0228941 A1 | 9/2009 | Russell et al. |
| 2009/0235308 A1 | 9/2009 | Ehlers et al. |
| 2009/0248794 A1 | 10/2009 | Helms et al. |
| 2009/0282241 A1 | 11/2009 | Prafullchandra et al. |
| 2009/0282449 A1 | 11/2009 | Lee |
| 2009/0293101 A1 | 11/2009 | Carter et al. |
| 2009/0296621 A1 | 12/2009 | Park et al. |
| 2010/0012568 A1 | 1/2010 | Fujisawa et al. |
| 2010/0027560 A1 | 2/2010 | Yang et al. |
| 2010/0030578 A1 | 2/2010 | Siddique et al. |
| 2010/0031299 A1 | 2/2010 | Harrang et al. |
| 2010/0042478 A1 | 2/2010 | Reisman |
| 2010/0043030 A1* | 2/2010 | White .............................. 725/58 |
| 2010/0083329 A1 | 4/2010 | Joyce et al. |
| 2010/0083362 A1 | 4/2010 | Francisco |
| 2010/0086020 A1 | 4/2010 | Schlack |
| 2010/0106846 A1 | 4/2010 | Noldus et al. |
| 2010/0115091 A1 | 5/2010 | Park et al. |
| 2010/0115113 A1 | 5/2010 | Short et al. |
| 2010/0115540 A1 | 5/2010 | Fan et al. |
| 2010/0122274 A1 | 5/2010 | Gillies et al. |
| 2010/0122276 A1 | 5/2010 | Chen |
| 2010/0125658 A1 | 5/2010 | Strasters |
| 2010/0131973 A1 | 5/2010 | Dillon et al. |
| 2010/0132003 A1 | 5/2010 | Bennett et al. |
| 2010/0135646 A1 | 6/2010 | Bang et al. |
| 2010/0138900 A1 | 6/2010 | Peterka et al. |
| 2010/0169977 A1 | 7/2010 | Dasher et al. |
| 2010/0186029 A1 | 7/2010 | Kim et al. |
| 2010/0198655 A1 | 8/2010 | Ketchum et al. |
| 2010/0199299 A1 | 8/2010 | Chang et al. |
| 2010/0199312 A1 | 8/2010 | Chang et al. |
| 2010/0217613 A1 | 8/2010 | Kelly et al. |
| 2010/0218231 A1 | 8/2010 | Frink et al. |
| 2010/0219613 A1 | 9/2010 | Zaloom et al. |
| 2010/0251304 A1 | 9/2010 | Donoghue |
| 2010/0251305 A1 | 9/2010 | Kimble |
| 2010/0262999 A1 | 10/2010 | Curran |
| 2010/0269144 A1 | 10/2010 | Forsman et al. |
| 2010/0280641 A1 | 11/2010 | Harkness et al. |
| 2010/0287588 A1 | 11/2010 | Cox et al. |
| 2010/0287609 A1 | 11/2010 | Gonzalez et al. |
| 2010/0293494 A1 | 11/2010 | Schmidt |
| 2010/0312826 A1 | 12/2010 | Sarosi et al. |
| 2010/0313225 A1 | 12/2010 | Cholas et al. |
| 2010/0325547 A1 | 12/2010 | Keng et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0055866 A1 | 3/2011 | Piepenbrink et al. |
| 2011/0071841 A1 | 3/2011 | Fomenko et al. |
| 2011/0078001 A1 | 3/2011 | Archer et al. |
| 2011/0078005 A1 | 3/2011 | Klappert |
| 2011/0078731 A1 | 3/2011 | Nishimura |
| 2011/0090898 A1 | 4/2011 | Patel et al. |
| 2011/0093900 A1 | 4/2011 | Patel et al. |
| 2011/0099017 A1 | 4/2011 | Ure |
| 2011/0103374 A1 | 5/2011 | Lajoie et al. |
| 2011/0107364 A1 | 5/2011 | Lajoie et al. |

(56) References Cited

U.S. PATENT DOCUMENTS

| | | |
|---|---|---|
| 2011/0107379 A1 | 5/2011 | Lajoie et al. |
| 2011/0110515 A1 | 5/2011 | Tidwell et al. |
| 2011/0126018 A1 | 5/2011 | Narsinh et al. |
| 2011/0126244 A1 | 5/2011 | Hasek |
| 2011/0126246 A1 | 5/2011 | Thomas et al. |
| 2011/0138064 A1 | 6/2011 | Rieger et al. |
| 2011/0145049 A1 | 6/2011 | Hertel et al. |
| 2011/0154383 A1 | 6/2011 | Hao et al. |
| 2011/0173053 A1 | 7/2011 | Aaltonen et al. |
| 2011/0173095 A1 | 7/2011 | Kassaei et al. |
| 2011/0178943 A1 | 7/2011 | Motahari et al. |
| 2011/0191801 A1 | 8/2011 | Vytheeswaran |
| 2011/0212756 A1 | 9/2011 | Packard et al. |
| 2011/0213688 A1 | 9/2011 | Santos et al. |
| 2011/0219229 A1 | 9/2011 | Cholas et al. |
| 2011/0219411 A1 | 9/2011 | Smith |
| 2011/0231660 A1 | 9/2011 | Kanungo |
| 2011/0239253 A1 | 9/2011 | West et al. |
| 2011/0246616 A1 | 10/2011 | Ronca et al. |
| 2011/0258049 A1 | 10/2011 | Ramer et al. |
| 2011/0264530 A1 | 10/2011 | Santangelo et al. |
| 2011/0265116 A1 | 10/2011 | Stern et al. |
| 2011/0276881 A1 | 11/2011 | Keng et al. |
| 2011/0277008 A1 | 11/2011 | Smith |
| 2011/0302624 A1 | 12/2011 | Chen et al. |
| 2012/0005527 A1 | 1/2012 | Engel et al. |
| 2012/0008786 A1 | 1/2012 | Cronk et al. |
| 2012/0011567 A1 | 1/2012 | Cronk et al. |
| 2012/0023535 A1 | 1/2012 | Brooks et al. |
| 2012/0030363 A1 | 2/2012 | Conrad |
| 2012/0076015 A1 | 3/2012 | Pfeffer |
| 2012/0079523 A1 | 3/2012 | Trimper et al. |
| 2012/0089699 A1 | 4/2012 | Cholas |
| 2012/0124149 A1 | 5/2012 | Gross et al. |
| 2012/0124606 A1 | 5/2012 | Tidwell et al. |
| 2012/0137332 A1 | 5/2012 | Kumar |
| 2012/0144416 A1 | 6/2012 | Wetzer et al. |
| 2012/0151077 A1 | 6/2012 | Finster |
| 2012/0167132 A1 | 6/2012 | Mathews et al. |
| 2012/0170544 A1 | 7/2012 | Cheng et al. |
| 2012/0170741 A1 | 7/2012 | Chen et al. |
| 2012/0173746 A1 | 7/2012 | Salinger et al. |
| 2012/0185693 A1 | 7/2012 | Chen et al. |
| 2012/0185899 A1 | 7/2012 | Riedl et al. |
| 2012/0191844 A1 | 7/2012 | Boyns et al. |
| 2012/0215903 A1 | 8/2012 | Fleischman et al. |
| 2012/0246462 A1 | 9/2012 | Moroney et al. |
| 2012/0284804 A1 | 11/2012 | Lindquist et al. |
| 2012/0324552 A1 | 12/2012 | Padala et al. |
| 2013/0014140 A1 | 1/2013 | Ye et al. |
| 2013/0014171 A1 | 1/2013 | Sansom et al. |
| 2013/0024888 A1 | 1/2013 | Sivertsen |
| 2013/0024891 A1 | 1/2013 | Elend et al. |
| 2013/0031578 A1 | 1/2013 | Zhu et al. |
| 2013/0039338 A1 | 2/2013 | Suzuki et al. |
| 2013/0046849 A1 | 2/2013 | Wolf et al. |
| 2013/0067039 A1 | 3/2013 | Hartzler |
| 2013/0073400 A1 | 3/2013 | Heath |
| 2013/0097647 A1 | 4/2013 | Brooks et al. |
| 2013/0117692 A1 | 5/2013 | Padmanabhan et al. |
| 2013/0132986 A1 | 5/2013 | Mack et al. |
| 2013/0133010 A1 | 5/2013 | Chen |
| 2013/0166906 A1 | 6/2013 | Swaminathan et al. |
| 2013/0173745 A1 | 7/2013 | Biderman |
| 2013/0174271 A1 | 7/2013 | Handal et al. |
| 2013/0219178 A1 | 8/2013 | Xiques et al. |
| 2013/0227283 A1 | 8/2013 | Williamson et al. |
| 2013/0227284 A1 | 8/2013 | Pfeffer et al. |
| 2013/0311464 A1 | 11/2013 | Nix et al. |
| 2014/0012843 A1 | 1/2014 | Soon-Shiong |
| 2014/0074855 A1 | 3/2014 | Zhao et al. |
| 2014/0201799 A1 | 7/2014 | Smith |
| 2014/0245341 A1 | 8/2014 | Mack et al. |
| 2014/0259182 A1 | 9/2014 | Mershon |
| 2014/0351437 A1 | 11/2014 | Madani |
| 2015/0020126 A1 | 1/2015 | Kegel et al. |
| 2015/0040176 A1 | 2/2015 | Hybertson et al. |
| 2015/0095932 A1 | 4/2015 | Ren |

FOREIGN PATENT DOCUMENTS

| | | |
|---|---|---|
| JP | 2001275090 A | 10/2001 |
| JP | 2005519365 A | 6/2005 |
| JP | 2005519501 A | 6/2005 |
| JP | 2005339093 A | 12/2005 |
| JP | 2008015936 A | 1/2008 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| WO | WO-0011871 A1 | 3/2000 |
| WO | WO-0052928 A1 | 9/2000 |
| WO | WO-0110125 A1 | 2/2001 |
| WO | WO-0139505 A2 | 5/2001 |
| WO | WO-0156285 A1 | 8/2001 |
| WO | WO-0195610 A1 | 12/2001 |
| WO | WO-0195621 A1 | 12/2001 |
| WO | WO-2005015422 A1 | 2/2005 |
| WO | WO 2005031524 | 4/2005 |
| WO | WO-2007060451 A2 | 5/2007 |
| WO | WO-2011035443 A1 | 3/2011 |
| WO | WO-2011053858 A1 | 5/2011 |
| WO | WO-2012021245 A1 | 2/2012 |
| WO | WO-2012114140 A1 | 8/2012 |

OTHER PUBLICATIONS

Brian Lowry, Television, as you like it; Today's gadgetry is smart enough to let viewers choose camera angles, or kick back and rewind as the action unfolds live. Watch it, and it watches back, Los Angeles Times, Feb. 13, 2000, section: Calendar, p. 8, Calendar Desk, 2000 Times Mirror Company.

Dale Buss, "Ultra TV", Brandmarketing, Sep. 1999, vol. VI, No. 9, p. 74, ISSN 1091-6962, 1999 Responsive Database Services, Inc. Business and Industry; 1999 Fairchild Publications.

Duso et al, Operating System Support for a Video-On-Demand File Service, Digital Equipment Corporation, p. 4 ("CMFAP").

Future VOD role of studios vs. other companies debated, Video Week, Apr. 10, 2000, section: This Week's News, 2000 Warren Publishing, Inc.

"Independent study shows TiVo service increases enjoyment and changes people's attitudes towards T.V.", PR Newswire, May 2, 2000, 2000 FT Asia Intelligence Wire; 2000 PR Newswire.

Kale, RFC 1180 "A TCP/IP tutorial", Jan. 1991, Spider Systems Limited, Section 4 "ARP".

Marc Gunther; Irene Gashurov, "When technology attacks!; Your T.V. is looking weird. Network executives are getting flustered. Viewing choices are exploding. That's what happens . . . ", Fortune, Mar. 6, 2000, section: Features/Television, p. 152, 2000 Time Inc.

Mary Kathleen Flynn; Steve Young, "Interactive TV, CNNfn", transcript #00081407FN-111 interview Josh Bernoff, Digital Jam, Aug. 14, 2000, Mon. 8:08 p.m. EST, 2000 Cable News Network.

"More 'convergence' digital video recorders emerge", Video Week, Jun. 19, 2000, section: This Week's News, 2000 Warren Publishing, Inc.

Patricia Sabga; Charles Molineaux, "TiVo—Ceo, CNNfn", transcript # 000901 10FN-107 interview Michael Ramsay, The N.E.W. Show, Sep. 1, 2000, Fri. 5:18 p. m. EST, 2000 Cable News Network.

Peter Thal Larsen, "Inside Track: TV viewers can box clever: Technology Video Recorders: personal video reorders will be a godsend for viewers. But what about the schedulers", Financial Times London Ed., Jun. 23, 2000, p. 18, ISSN 0307-1766, 2000 Responsive Database Services, Inc. Business and Industry; 2000 Financial Times Ltd.

"PVR copyright concerns raised", Audio Week, Aug. 23, 1999, section: This Week's News, 1999 Warren Publishing, Inc.

Raymond Snoddy, "The TiVo—T.V.'s nemesis?", Times Newspapers Ltd., Sep. 1, 2000, section: Features, 2000 Times Newspapers Limited (the Times London).

(56) References Cited

OTHER PUBLICATIONS

Roy Furchgott, "Don't want people to control their T.V.s?", The New York Times, Aug. 24, 2000, Section G, p. 1, col. 2, Circuits, 2000 The New York Times Company.

Scaling of the distribution of fluctuations of financial market indices by P. Gopikrishnan et al. Physical Review E. vol. 60 No. 5., Nov. 1999.

Schonfeld, "Thuuz tells sports fans if a game is worth watching", Oct. 7, 2010, TC News from http://techcrunch.com/2010/10/07/thuuz, 2 pages.

Select a Channel to start watching, Videophiles: Curate your own online video channel with expressive, easy to use tools; © 2014 Redux, Inc. All rights reserved; http://www.redux.com/; 2 pages.

"TiVo and replay sign cable deals to boost PVR distribution", Warren's Cable Regulation Monitor, Aug. 21, 2000, section: This Week's News, 2000 Warren Publishing, Inc.

American national Standard. ANSI/SCTE 35 2012. Digital Program Insertion Cueing Message for Cable, by Society of Cable Telecommunication Engineers. 2012.

Apple Inc, The apparatus and methods of H1TP Live Streaming Overview, Apr. 1, 2011.

Enhanced TV Binary Interchange, Format 1.0 OC-SP-ETV-BIF1.0-104-070921 Date: Sep. 21, 2007, 420 pages.

Open Cable Specifications Alternate Content Real-Time Event Signaling and Management API by Cable Television Laboratories. Inc. 2012.

SAML Binding: S. Cantor et al. Bindings for the OASIS Security Assertion Markup Language (SAML) V2.0 OASIS Standard Mar. 2005. Document ID saml-bindings-2.0-os (http://docs.oasis-open.orgisecurity/saml/v2.0/saml-bindings-2.0-os.pdf).

SCTE Standards Document ANSUSCTE 118-2 2007 entitled Program-Specific Ad Insertion—Content Provider to Traffic Communication Applications Data Model.

SCTE Standards Document ANSUSCTE 130-1 2008 entitled Digital Progra section Advertising Systems Interfaces.

Security Assertion Markup Language (SAML) Specification (Version 2.0 released in 2005), as SAML Core: S. Cantor et al. Assertions and Protocols for the OASIS Security Assertion Markup Language (SAML) V2.0. OASIS Standard Mar. 2005. Document ID saml-core-2.0-os (http://docs.oasis-open.org/security/saml/v2.0/saml-core-2.0-os.pdf).

UTF-32, IBM, retrieved from http://publib.boulder.ibm.com/infocenter/iseries/v5r3/index.jsp?topic=%2Fnls%2Frbagsutf32.htm. on Aug. 28, 2013.

Zarnbell °T he Apparatus and Methods of HS Smooth Streaming Technical Overview, Mar. 2009.

DLNA (Digital Living Network Alliance) protocols described in DLNA Networked Device Interoperability Guidelines Expanded, Mar. 2006 and subsequent expanded version dated Oct. 2006.

DOCSIS 3.0 Management Features Differences Technical Report CM-TR-MGMTv3 0-DIFF-V01-071228, pp. 1-62.

DOCSIS 3.0 OSSI Configuration Management Technical Report CM-TR-OSSIv3 0-CM-V01-080936 pp. 1-84.

MPEG Headers Quick Reference, http://dvd.sourceforge.net/dvdinfo/mpeghdrs.html, Mar. 6, 2006.

OpenCable Specifications, Tuning Resolver Interface Specification, OS-SP-TRIF-I01-080130, Jan. 30, 2008, pp. 1-50.

Siebenlist F., et al., "Global Grid Forum Specification Roadmap towards a Secure OGSA," Jul. 2002, pp. 1-22.

\* cited by examiner

PERSONAL MEDIA CHANNEL APPARATUS AND METHODS

RELATED APPLICATIONS

This application is related to co-owned and co-pending U.S. patent application Ser. No. 12/414,576, filed contemporaneously herewith on Mar. 30, 2009 and entitled "Recommendation Engine Apparatus and Methods" and which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates to the field of content delivery over a network. Specifically, in one exemplary aspect, the invention relates to methods and apparatus for delivering content from a variety of sources in a cable television or satellite network to a client device.

2. Description of Related Technology

Recent advances in content delivery technologies have led to the proliferation of different content sources carrying a wide variety of content. A viewer may be easily overwhelmed by the presentation of hundreds of broadcast channels, purchasable content channels (e.g., VOD, pa-perview, etc.) and the like, offering programming 24 hours per day. A channel-by-channel search for specific content can be tedious and frustrating to the user. With such an abundance of content offered, the user may be unable to rapidly and easily locate content of interest at any one time.

Likewise, other technological advancements have brought into common use electronic devices that allow users to record content received from a bearer network (such as a cable television or satellite network), whether at their premises or another location within the network. These devices include, inter alia, on digital video recorders (DVR), and personal video recorders (PVR). Access to content stored on recording devices farther increases the overabundance of content available to the user.

Some existing methods for specifically providing content in which a user may be interested, from among the large quantity and variety of content available, include the utilization of demographic data and/or explicit viewer designation of particular content. For instance, a user may have his/her content pre-selected (or at least the possibilities narrowed) based on their demographics, and/or explicit selections or preferences of the user. However, these methods generate targeted content based only on the information a user specifically gives or enters into the system (or which can be gleaned from their subscriber account, etc.).

Various other solutions have been presented to assist a user in finding content of interest. These include, for example, the utilization of a searchable program guide such as that described in U.S. Pat. No. 7,228,556 to Beach, et al., issued Jun. 5, 2007 and entitled "Distributed, Interactive Television Program Guide; System and Method". Customizable program guides are also used in the prior art to provide targeted content to a user. These generally fit into two distinct categories: those in which a user must enter preference data, and those which are able to gather data about a user without user specification. The first category of customizable program guides, as stated, require a user to manually enter preference or other data, which can be inconvenient for the user, and incomplete depending on the level of detail. One example of the first category of customizable program guides is described in U.S. Pat. No. 7,185,355 to Ellis, et al., issued Feb. 27, 2007 and entitled "Program Guide System with Preference Profiles". Exemplary prior art of the second category of customizable program guides includes U.S. Pat. No. 6,934,964 to Schaffer, et al., issued Aug. 23, 2005 and entitled "Electronic Program Guide Viewing History Generator Method and System".

Certain prior art describe creating a dedicated or virtual channel in which targeted content is displayed; however, a majority of the prior art generally relates only to linear television. Linear television is a standard television service wherein the viewer watches a scheduled program at the particular time it's offered. Linear television models do not take into account the use of DVR and other recording apparatus, as well as other delivery paradigm including, for example, VOD and Pay-Per-View.

Other systems create a dedicated or virtual channel by utilization of an on-demand server or by utilization of user-entered information.

Despite the foregoing variety of different delivery and interface technologies associated with the delivery of content over a network, there is a salient need for improved apparatus and methods for providing content that: (i) a user is likely to have an interest in or enjoy watching, (ii) places no significant burden on the user (such as having to enter preference information), and (iii) avoids the user having to search through the large quantity of available content. Such apparatus and methods would, in addition to efficiently delivering targeted content according to data and criteria gathered passively from user actions, also ideally afford a user the ability to receive the content as one seamless stream on a virtual channel that was in effect dedicated and tailored to that particular user.

Moreover, the presentation of content on such a virtual channel would take into account non-linear television models (e.g., VOD, nPVR, "start over" features, etc.) as well as linear broadcast models, and could also access indigenous content (such as that disposed on a user's DVR or other premises device).

Additionally, the abovementioned apparatus and methods provide a user with the ability to choose among various recommended content, and present the user with a navigable list of content prioritized according to a system which immediately takes into account the user's activities, and thereby derives an even more finely tuned profile.

These features would also be provided using substantially extant network infrastructure and components, and would be compatible with a number of different client device and delivery systems including wired, optical, and wireless technologies.

Further, the apparatus and methods of the present invention provide users with access to a larger pool of content spanning an entire multiple systems operator's product and/or service line. In other words, via the methods and apparatus discussed herein, a user is not limited to a pool of content by a single content provider, but may be able to access content from various content sources.

SUMMARY OF THE INVENTION

The present invention satisfies the foregoing needs by providing improved apparatus and methods for the targeted delivery of content over a network.

In a first aspect of the invention, a method of providing targeted content obtained from a plurality of different sources to a user is disclosed. In one embodiment, the content is provided over a content-based network (e.g., satellite or cable television network), and the method comprises: receiving information regarding a plurality of content; comparing the information to a set of criteria; selecting individual ones of the plurality of content for provision to the user based at least in part on the act of comparing; and providing the selected individual ones of the plurality of content to the user.

In one variant, the content sources are selected from the group consisting of: (i) an on demand content source; (ii) a broadcast program content source; (iii) a digital video recorder; (iv) a personal media content storage device; and (v) a pay-per view content source.

In another variant, the information comprises metadata transmitted with and relating to individual ones of the plurality of content.

In yet another variant, the set of criteria comprises a user profile having information about the user relating to various aspects of the content. The act of comparing comprises e.g., examining aspects of individual ones of the plurality of content for similarity to the various aspects in the user profile, and the act of selecting individual ones of the plurality of content for provision to the user based at least in part on the act of comparing comprises storing information relating to individual ones of the plurality of content having a threshold level of similarity to the various aspects in the user profile.

In another variant, the method further comprises using the stored information relating to individual ones of the plurality of content to generate a list, the list comprising: content identification information; content location; and content accessing information; and wherein the list is prioritized based at least in part on the act of comparing the information regarding the plurality of content to the set of criteria. The act of providing the selected content to the user comprises e.g.,: displaying a portion of the content identification information to a user display; providing a mechanism for the selection of individual ones of the content; utilizing at least the content location and content accessing information to locate and access the content; and displaying the content to the user at the user display.

In still a further variant, the mechanism for selecting individual ones of the content comprises a user interface (UI), the user interface comprising a network-operated site.

In another variant, the act of providing the selected content to the user comprises providing a virtual channel accessible by the user; providing a mechanism to utilize at least the content location and content accessing information to locate and access the content; and displaying the content to the user at the virtual channel; the content is displayed in an order dictated by the list.

In a further variant, at least one of the content provided to the user comprises purchasable content; and wherein the act of providing the selected content to the user comprises: providing the content identification information; allowing the selection of the purchasable content; providing at least one user confirmation for the purchase of the content; providing a mechanism to utilize at least the content location and content accessing information to locate and access the content; and displaying the content to the user at the user display.

In another variant, the method further comprises modifying the user profile based at least in part on at least one user action; e.g., adding data regarding the at least one user action to the user profile. The data regarding the at least one user action is weighted depending on the classification of the at least one user action.

In another variant, the user actions comprise at least one of a group consisting of: (i) viewing the content; (ii) navigating away from the content; (iii) recording the content; (iv) deleting the content; and (v) rejecting recommendations to view the content.

In a further variant, the method further comprises modifying the user profile based at least in part on user feedback, the user feedback comprising instructions relating to the user's impression of the provided content.

In a second aspect of the invention, a system for the delivery of user-specific content is disclosed. In one embodiment, the system comprises: a receiving apparatus, the receiving apparatus adapted to receive data regarding a plurality of content; a processing apparatus, the processing apparatus adapted to generate a list of recommended content from among the plurality of content; apparatus adapted to allocate a carrier to deliver the recommended content; and a display apparatus, the display apparatus adapted to display the recommended content.

In one variant, the plurality of content is received from a plurality of content sources including at least two of; (i) an on-demand content source; (ii) a broadcast program content source; (iii) a digital video recorder; (iv) a personal media content storage device; and (v) a pay-per view content source.

In a second variant, the data regarding the plurality of content comprises metadata regarding various aspects of individual ones of the plurality of content, and the processing apparatus comprises a computer program adapted to: compare the various aspects of individual ones of the plurality of content to information contained in a user profile; select individual ones of the plurality of content for provision to a user, the selected individual ones of the plurality of content correlating with the information of the user profile to at least a pre-determined degree; and direct the display of the selected individual ones of the plurality of content to the user. The act of selecting comprises e.g., storing information relating to individual ones of the plurality of content, the information comprising: (i) content identification information, (ii) content location, and (iii) content accessing information. The system further comprises a user interface and the act of directing the display of the selected individual ones of the plurality of content comprises: utilizing the stored information to generate a list; displaying at least a portion of the list to a user on the interface; enabling the user to select at least one entry from the list; utilizing at least the content location and content accessing information to locate and access content associated with the selected entry; and displaying the content to the user at the display. Entries on the list are prioritized based at least in part on the act of comparing individual ones of the plurality of content to the user profile. The user interface comprises for example a network-operated Internet site.

In another variant, the system further comprises a user interface and the act of directing the display of the selected individual ones of the plurality of content comprises: providing a virtual channel accessible by the user; utilizing the stored information to generate a list; displaying content associated with the selected individual ones of the plurality of content to the user at the virtual channel; and wherein the content is displayed in an order determined by the list.

In yet another variant, the user profile comprises pre-programmed user preferences relating to various content aspects, and further comprises a computer program adapted to modify the user profile based at least in part on at least one user action by adding data regarding at least one user action to the user profile.

Data regarding the at least one user action is weighted depending on the type of the at least one user action. For instance, the user actions comprise at least one of a group consisting of: (i) viewing the content; (ii) navigating away from the content; (iii) recording the content; (iv) deleting the content; and (v) rejecting recommendations to view the content.

In another variant, the computer program is further adapted to modify the user profile based at least in part on user feedback, the user feedback comprising instructions relating to the user's impression of provided content, and the modifying comprising adding data regarding the user feedback to the user profile.

In a further variant, the plurality of content comprises programming content and advertising content, and the processing apparatus comprises a cable television network headend or switching hub server.

In yet another variant, the processing apparatus is located substantially on a consumer premises device, and the receiving apparatus comprises a hard disk drive of the consumer premises device.

In a third aspect of the invention, an apparatus for delivery of targeted content in a network is disclosed. In one embodiment, the apparatus comprises: a processor, the processor adapted to run at least one software process thereon, the software process adapted to: receive information related to a plurality of available content; compare the information relating to a plurality of available content to a standard (e.g., an individual one of the plurality of content); select individual ones of the plurality of available content for provision to a user based at least in part on the act of comparing; and deliver the selected content to the user; a network interface in data communication with the processor; and a storage device in data communication with the processor.

In one variant, the apparatus comprises a consumer premises device selected from the group consisting of: (i) a settop box; (ii) a digital video recorder; and (iii) a converged premises device.

In a second variant, the apparatus comprises a cable television network headend or switching hub server.

In a further variant, the information related to the plurality of available content comprises metadata rendered at least partly in a human-readable form, and the comparison comprises: generating records regarding various aspects of each of the plurality of available content; and utilizing the records to find matches between the various aspects of the available content and various aspects of the standard. The standard comprises e.g., a user-based profile, and wherein the storage device in data communication with the processor is adapted to store at least a portion of the user-based profile. The user-based profile is modified based at least in part on user actions, the user actions comprising for example at least one of: (i) viewing the content; (ii) entering the user's impression of displayed content; (iii) navigating away from the content; (iv) recording the content; (v) deleting the content; and (vi) rejecting recommendations to view the content.

In another variant, the selected individual ones of the plurality of available content are compiled into a selected content list, the selected content list having entries prioritized based at least in part on the results of the act of comparing. The delivery comprises displaying the selected content list on a display device in data communication with the apparatus; and wherein the software process is farther adapted to enable a user to choose one or more of the content in the prioritized list for delivery.

Alternatively, the delivery comprises displaying content associated with each of the selected content in the selected content list on a virtual channel.

In another variant, the display device in data communication with the apparatus comprises an Internet site in data communication with the software process.

In a fourth aspect of the invention, a method of using an electronic program guide in a content-based network is disclosed. In one embodiment, the method comprises: generating a navigable schedule of programs broadcast within a predetermined period of time; providing a means for navigating the schedule; and displaying a program stream simultaneous to the generation and navigation of the electronic program guide.

In one variant, the predetermined period of time comprises an interval of time extending from some past point in time to some future point in time.

In another variant, the method further comprises providing a representative icon for each program within the electronic program guide, wherein the representative icon for a particular program is displayed in the electronic program guide upon navigation through the program on the electronic program guide. For example, the representative icon comprises a recognizable picture related to the program, and may be further accompanied by a program description.

In a further variant, the electronic program guide is further adapted to provide a user with at least one function selected from a group consisting of: (i) accessing more information regarding a selected program; (ii) starting a program over from its beginning during the time block a program is set to broadcast; and (iii) setting an alert or reminder for at least one program having a broadcast time in the future.

In still another variant, the electronic program guide is further adapted to provide a user with at least one function selected from a group consisting of: (i) rating content; (ii) viewing descriptions of previous episodes of content in a series; and (iii) viewing clips of previous episodes of content in a series.

In a further variant, the electronic program guide is further adapted to display a list of recommended content. The recommended content is generated based e.g., at least in part on a comparison of available content to selected content, and/or a comparison of selected content to a user profile.

In another variant, the content broadcast within a predetermined period of time further comprises content beating a threshold level of similarity to the user profile.

In yet another variant, the method further comprises: displaying a personal timeline; and selecting content from the navigable schedule for placement in the personal timeline. Selecting content from the navigable schedule for placement in the personal timeline occurs via e.g., an internet site in data communication with the headend.

In a further variant, the user is further provided with an aspect of the electronic program guide showing a broadcast schedule for one day of one content source.

In still another variant, the display of the program stream occurs as a background to the simultaneous generation and navigation of the electronic program guide.

In a fifth aspect of the invention, a premises device adapted to generate an electronic program guide is disclosed. In one embodiment, the device comprises: apparatus for generating a navigable schedule of content; apparatus for navigating the navigable schedule of content; apparatus for displaying a representative icon for each program in the schedule; and apparatus for displaying as a background a programs stream over which the electronic program guide is displayed.

In one variant, the schedule of content comprises programs broadcast within a predetermined period of time, the predetermined period of time including future, present, and past broadcasts.

In another variant, the representative icon comprises a recognizable picture related to the program. The icon may farther be accompanied by a program description.

In a further variant, the electronic program guide is further adapted to comprise at least one tool with a function selected from a group consisting of: (i) accessing more information regarding a selected program; (ii) starting a program over from its beginning during the time block a program is set to broadcast; (iii) setting an alert or reminder for at least one program having a broadcast time in the future; (iv) receiving a short program clip regarding a selected content; (v) rating content; and (vi) viewing descriptions of previous episodes of content in a sense.

In another variant, the device further comprises a recommendation tool that performs a comparison of available content to a selected content and displays a list of the results of the comparison. Alternatively, the recommendation tool performs a comparison of a selected content to a user profile; and displays a recommendation based on the results of the comparison.

In a further variant, the navigable schedule of content comprises a one-day schedule of content from one content source.

Alternatively, the navigable schedule of content comprises content bearing a threshold level of similarity to a user profile, and the device further comprises a personal timeline, wherein the user is able to select content from the navigable schedule for placement in the personal timeline.

In yet another variant, the act of selecting content from the navigable schedule for placement in the personal timeline occurs via an Internet site.

In a sixth aspect of the invention, a computer readable apparatus is disclosed. In one embodiment, the apparatus comprises media adapted to contain a computer program having a plurality of instructions, the plurality of instructions which, when executed: request a plurality of available content; generate a navigable schedule of content; link each content item in the schedule of content a plurality of information regarding the content; link each content item in the schedule of content to a plurality of tools operable by a user via a user interface; and display the navigable schedule of content on top of a currently displayed program stream, the display comprising a user interface.

In one variant, the plurality of available content comprises content from a plurality of content sources.

In a second variant, the act of generating a navigable schedule of content further comprises utilizing metadata relating to the content to determine similarity to a prescribed set of criteria, and the computer program is further adapted to: display a personal timeline, the timeline comprising a plurality of date and time place holders; enable the user to select content from the navigable schedule of content for placement into the various date and time place holders; and display content from the personal timeline at the date and time given by the placeholders.

In another variant, the plurality of information comprises at least one of a group consisting of: (i) an icon representative of the content; (ii) a text description of the content; (iii) content identification information; (iv) content location information; and (v) content accessing information.

In a further variant, at least one of the plurality of tools operable by the user via the user interface comprises at least one function selected from a group consisting of: (i) accessing more information regarding a selected program; (ii) starting a program over from its beginning during the time block a program is set to broadcast; (iii) viewing a program by selection of the program during the time block the program is set to broadcast; and (iv) setting an alert or reminder for at least one program having a broadcast time in the future. In yet another variant, at least one of the plurality of tools operable by the user via the user interface comprises at least one function selected from a group consisting of: (i) receiving a short program clip regarding a selected content; (ii) rating content; (iii) viewing descriptions of previous episodes of content in a series; and (iv) viewing clips of previous episodes of content in a series.

In still a further variant, at least one of the plurality of tools operable by the user via the user interface comprises a recommendation tool. The recommendation tool performs e.g., a comparison of available content to a selected content and displays a list of the results of the comparison. Alternatively, the recommendation tool performs a comparison of a selected content to a set of criteria; and displays a recommendation based on the results of the comparison.

In another variant, the navigable schedule of content comprises schedule of content comprising a single day from one content source.

In another embodiment, the computer readable apparatus comprises a program which, when executed, generates a navigation toolbar interface comprising: a representative icon for each of a plurality of navigation tools; a means for allowing a user to navigate the plurality of navigation tools; and a program stream background over which the navigation toolbar is displayed.

In one variant, the representative icon for each of a plurality of navigation tools comprises a picture representative of the function of the navigation tool, and a textual description of the navigation tool.

In another variant, the means for allowing a user to navigate the plurality of navigation tools further comprises an indicator adapted to indicate which of the navigation tools the user has selected.

In a yet another variant, at least one of the plurality of navigation tools comprises a search tool adapted to permit the user to search available content based on user-entered key words.

In a further variant, at least one of the plurality of navigation tools comprises a tool linking the user to a virtual channel wherein recommended content is displayed.

In still another variant, at least one of the plurality of navigation tools comprises a tool linking the user to purchasable content.

In another variant, at least one of the plurality of navigation tools comprises a tool linking the user to an electronic program guide.

In yet another variant, at least one of the plurality of navigation tools comprises a tool linking the user to the contents of a premises content storage device.

In a third embodiment, the computer readable apparatus comprises a computer program which, when executed links individual ones of a plurality of navigation tools to the performance of a specific function; displays the plurality of navigation tools, the tools operable by a user via a user interface; and carries out navigation functions upon a user's selection of any one of the plurality of navigation tools via the user interface.

In a seventh aspect of the invention, a method of generating a subset of content elements having features consistent with a set of criteria is disclosed. In one embodiment, the method comprises: retrieving metadata regarding content elements from a content source associated therewith; determining similarity of the content metadata to the set of criteria; placing content elements having a threshold level of similarity in a list, the list arranged by similarity level; displaying at least one of the content elements in the list; interpreting a user action; updating the set of criteria to reflect the user action; and determining similarity of the content metadata to the updated set of criteria.

In an eighth aspect of the invention, a method of doing business in a content-based network is disclosed. In one embodiment, the method comprises: requesting and receiving an ensemble of content elements from a plurality of content sources; providing a navigable electronic program guide of the ensemble of content elements; providing a mechanism for the comparison of at least portions of the ensemble of content elements to a prescribed set of criteria; storing information regarding individual ones of the ensemble of content elements; and displaying results of the comparison to a user.

In one variant, the comparison comprises utilizing metadata transmitted with and relating to the content to find matches to the set of criteria.

In another variant, the stored information regarding individual ones of the ensemble of content elements comprises at least content identification information, content location information, and content accessing information, and the act of providing the selected content to the user comprises: displaying a portion of the content identification information to a user display; providing a means for the selection of individual ones of the content; utilizing at least the content location and content accessing information to locate and access the content; and displaying the content to the user at the user display.

In a further variant, the act of providing the selected content to the user comprises: providing a virtual channel accessible by the user; providing a mechanism to utilize at least the content location and content accessing information to locate and access the content; and displaying the content to the user at the virtual channel. The content is displayed in order dictated by the list.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
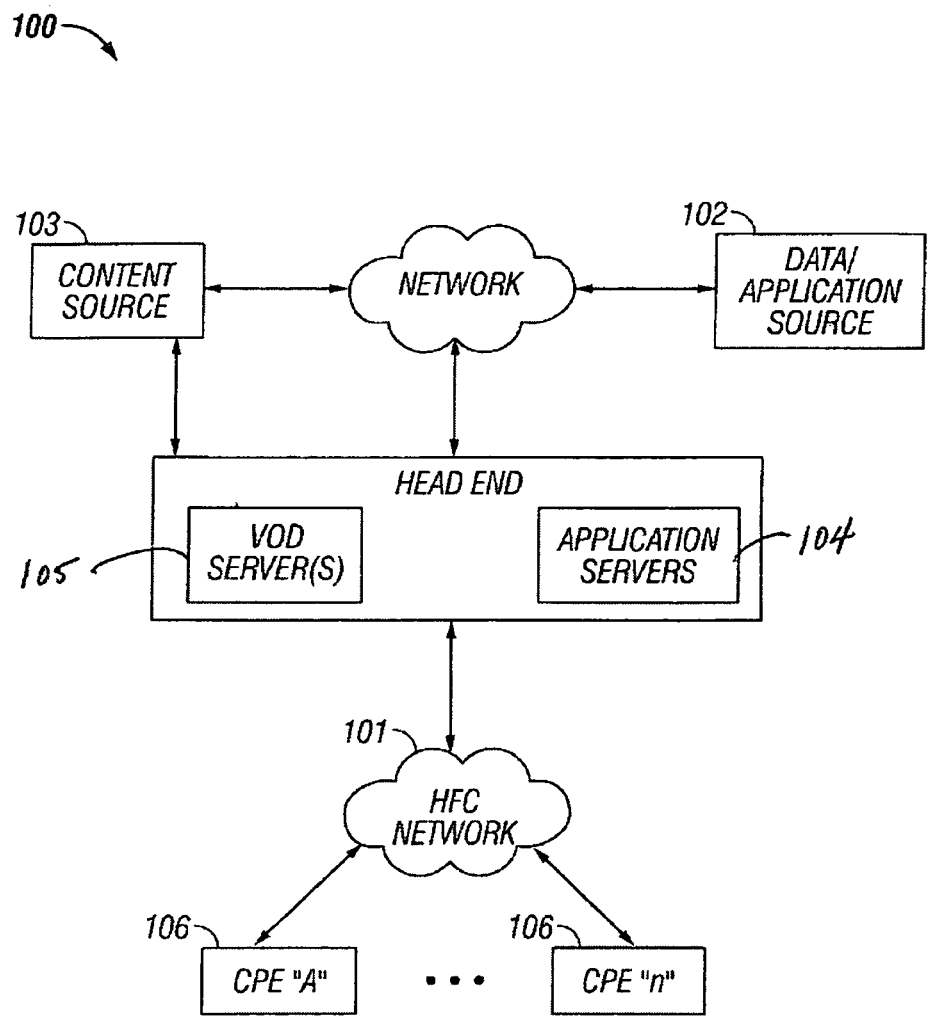
FIG. 1 is a functional block diagram illustrating an exemplary HFC cable network configuration useful with the present invention.

Reference is now made to the drawings, wherein like numerals refer to like parts throughout.

As used herein, the term "advertisement" and similar forms refers without limitation to any audio, visual, promotion, message, or communication, whether for-profit or otherwise, that is perceptible by a human. Examples of advertisements include so-called "bumper" advertisements (advertisements inserted before or after a client requested program), "pause" advertisements (presented when a client sends a pause control command to a video server or the like), or additional and replacement advertisements.

As used herein, the term "application" refers generally to a unit of executable software that implements a certain functionality or theme. The themes of applications vary broadly across any number of disciplines and function (such as on demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "capacity" refers to, without limitation, the ability of a network, portion of a network, or component thereof (whether individually or in concert) to provide a requested or needed service, act or level of performance. One commonly used metric of capacity is so-called "bandwidth", roughly akin to the size of the channel or "pipe" capable of carrying content or other information. However, capacity limitations may be imposed by any number of factors, such as the unavailability of the content from a provider (e.g., studio or television network), delays imposed by transmission, filtering, transcoding, encryption/decryption, conditional access establishment and/or download (e.g., according to a "DCAS" or downloadable conditional access system paradigm), and so forth.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "conditional access" refers to any access control scheme, whether implemented in hardware, software, or firmware (or combinations thereof), including without limitation members of the "PowerKey™" family, NDS (including VideoGuard, mVideoGuard, etc.), DVB, and Motorola/General Instrument DigiCipher® family (DigiCipher II, etc.). These can be implemented using, for example, CA-specific hardware/software elements embedded in the device, the so-called "CableCARD™" plug-in security module access technology, a downloadable CA system (DCAS), or otherwise.

As used herein, the term "consideration" refers without limitation to a payment, incentive, option, forbearance of a debt, credit, or any other thing or act which conveys monetary or any other type of value between two or more parties, such as for example cash or credit/debit payments, credits to account, erasure of debt, exchanges, barters, options or rights of first refusal.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "display" means any type of device adapted to display information, including without limitation: CRTs, LCDs, TFTs, plasma displays, LEDs, incandescent and fluorescent devices. Display devices may also include less dynamic devices such as, for example, printers, e-ink devices, and the like.

As used herein, the term "DOCSIS" refers to any of tie existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "DVR" (digital video recorder) refers generally to any type of recording mechanism and/or software environment, located in the headend, the user premises or anywhere else, whereby content sent over a network can be recorded and selectively recalled. Such DVR may be dedicated in nature, or part of a non-dedicated or multi-function system.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2, DRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multi-systems operator" or "multiple systems operator" refer to a cable, fiber to the home (FTTH), fiber to the curb (FTTC), satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™, radio frequency tuner (e.g., in-band or OOB, cable modem, etc.), WiFi (802.11a,b,g,n), WiMAX (802.16), PAN (802.15), or IrDA families.

As used herein, the term "node" refers without limitation to any location, functional entity, or component within a network.

As used herein, the term "on demand" or "OD" is meant to include any service that enables real, quasi-real time (e.g. "trick" mode delivery) or even non-real time delivery of content such as audio and/or video programs at any resolution, or data. Such content may be, for example, stored or temporarily cached on a server, or streamed directly from a source, and may be in response to a user-initiated event, service profile or configuration, headend event, or otherwise.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video on demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers) or the resources shared by them in the form of entire cable RF signal, only the RF channels used to receive the service or otherwise treated as a single logical unit by the network for resource assignment.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the terms "user channel" and "program channel" are all generally synonymous with the concept of a perceived stream of information. For example, a program/user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the term "user interface" refers to, without limitation, any visual, graphical, tactile, audible, sensory, or other means of providing information to and/or receiving information from a user or other entity including without limitation computer display screens and windows, touch screens (including "multi-touch" Y units), mechanical interfaces such as keyboards, scanners, microphones and speakers, etc.

As used herein, the term "WiFi" refers to, without limitation, any of the variants of IEEE-Std. 802.11 or related standards including 802.11 a/b/g/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the invention discloses methods and apparatus for "fused" targeted content delivery in a content-based network, such as a cable television or satellite network. Specifically,-the present invention provides a substantially user-friendly mechanism for viewing content compiled from various sources, including, inter alia, DVR, broadcast, VOD, Start Over, etc., and particularly that content selected to align with a user's preferences, which is displayed as a substantially continuous stream as part of a "virtual" user-based channel. In one embodiment, a user profile is constructed and targeted content gathered without requiring any user intervention whatsoever; e.g., based on a user's past or contemporaneous interactions with respect to particular types of content. The "virtual channel" acts as a centralized interface for the user and their content selections and preferences, as if the content relevant to a given user were in fact streamed over one program channel.

In another aspect, the compiled content is presented to the user in the form of a "playlist" from which a user may select desired content for viewing and/or recording. In one variant, a user is also presented with content having varying degrees or aspects of similarity to that presented in the "playlist" or elsewhere, including content listed in the EPG. In another variant, the user's purchase of recommended (and non-recommended) content is enabled directly from the aforementioned playlist and/or the virtual channel.

In another aspect of the invention, the user is able to navigate between on-demand content, the virtual channel, an EPG, a search tool, and a DVR navigation tool from a single user interface (e.g., on-screen display).

In yet another aspect of the invention, an improved EPG is provided. The EPG gives a user the ability to view broadcast content across a broad timeline (i.e., content previously aired, as well as that which is currently airing and that which will air in the future). The EPG may incorporate various functions including allowing a user to start over, record, watch, receive more information about, catch up with, and rate the content of interest. The EPG also includes a function wherein a user may view an entire day's programming from one or more program channels. The user may also pull up recommended content from the EPG and can, in one embodiment, view a customized EPG showing a schedule solely comprised of recommended content.

Another feature of the invention is the ability for content viewed to continue progressing (i.e., continue playing) in the background while a user navigates among the various associated interfaces available to them.

In another aspect, client applications (e.g., those disposed on a subscriber's CPE and/or network servers) are utilized to compile the playlist based on user-imputed as well as pre-programmed user profiles. Various feedback mechanisms may also be utilized to enable the client application to "learn" from the user's activities in order to update the user profile and generate more finely-tuned and cogent recommendations. Client applications may also be utilized to manage the seamless presentation of content on the virtual channel, and locate/flag various scenes inside selected content for user viewing or editing.

Additionally, a user may establish a remote connection to the aforementioned client applications via an internet or LAN/MAN (such as the Internet). Accordingly, the user may modify and create a future playlist and may remotely establish programs to record and/or be erased from an at home recording device (DVR, etc.).

Methods and apparatus for dynamic secondary content insertion (e.g., recommendation and/or insertion of content such as movies, advertisements, etc. based upon the user profile) are also described, as well as techniques for maintaining user anonymity (privacy) across the various delivery paths.

In yet another aspect, all or portions of the functionality of the client applications discussed above may be implemented by a network-based entity (e.g., hub or headend server) adapted to perform these function for a variety of user profiles simultaneously.

Advantageously, the methods and apparatus of the invention are readily implemented using existing infrastructure, thereby obviating significant modifications or expense in implementing such capabilities.

An operational and business rules "engine" useful in implementing various operational or business goals, and methods of doing business, are also disclosed.

Detailed Description of Exemplary Embodiments

Exemplary embodiments of the apparatus and methods of the present invention are now described in detail. While these exemplary embodiments are described in the context of the aforementioned hybrid fiber coax (HFC) cable architecture having an multi-system operator (MSO), digital networking capability, and plurality of client devices/CPE, the general principles and advantages of the invention may be extended to other types of networks and architectures, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system, or over a satellite or millimeter wave-based network.

It will also be appreciated that while described generally in the context of a network providing service to a consumer (i.e., home) end user domain, the present invention may be readily adapted to other types of environments including, e.g., commercial/enterprise, and government/military applications. Myriad other applications are possible.

Moreover, while the primary embodiments described herein describe predominantly the distribution of programs or similar content, other types of content including without limitation advertisements/promotions, instructional videos, or even data applications or files may likewise be distributed using the techniques of the present invention.

It is also noted that while aspects of the invention are described primarily in the context of 6 MHz RF channels within the HFC network, the present invention is applicable to any frequency/bandwidth, such as for example 8 MHz channels. Further, while generally described in terms of content delivery over discrete QAMs or RF channels, relevant portions of the invention can be used in conjunction with multiplexing algorithm and wideband tuner apparatus such as that described in co-owned and co-pending U.S. patent application Ser. No. 11/013,671 filed Dec. 15, 2004 and entitled "Method And Apparatus For Wideband Distribution Of Content", which issued as U.S. Pat. No. 9,723,267 on Aug. 1, 2017 and is incorporated herein by reference in its entirety.

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

Bearer Network Architecture

FIG. 1 illustrates a typical generalized content-based network configuration with which the personal media delivery methods and apparatus of the present invention may be used. The various components of the network 100 include (i) one or more data and application origination points 102; (ii) one or more content sources 103, (iii) one or more application distribution servers 104; (iv) one or more VOD servers 105, and (v) consumer premises equipment (CPE) 106 The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

Furthermore, as discussed in greater detail subsequently herein, the generalized network of FIG. 1 also includes one or more interfaces to other (e.g., external) networks that can be used for the "personalized" delivery of content.

The data/application origination point 102 comprises any medium that allows data and/or applications (such as a VOD-based application, gaming application, or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the servers 104, 105) that can be accessed by a distribution server 104 or VOD server 105. Exemplary embodiments of a "converged" CPE (i.e., CD) of the invention are also described subsequently herein.

Figure 1A:
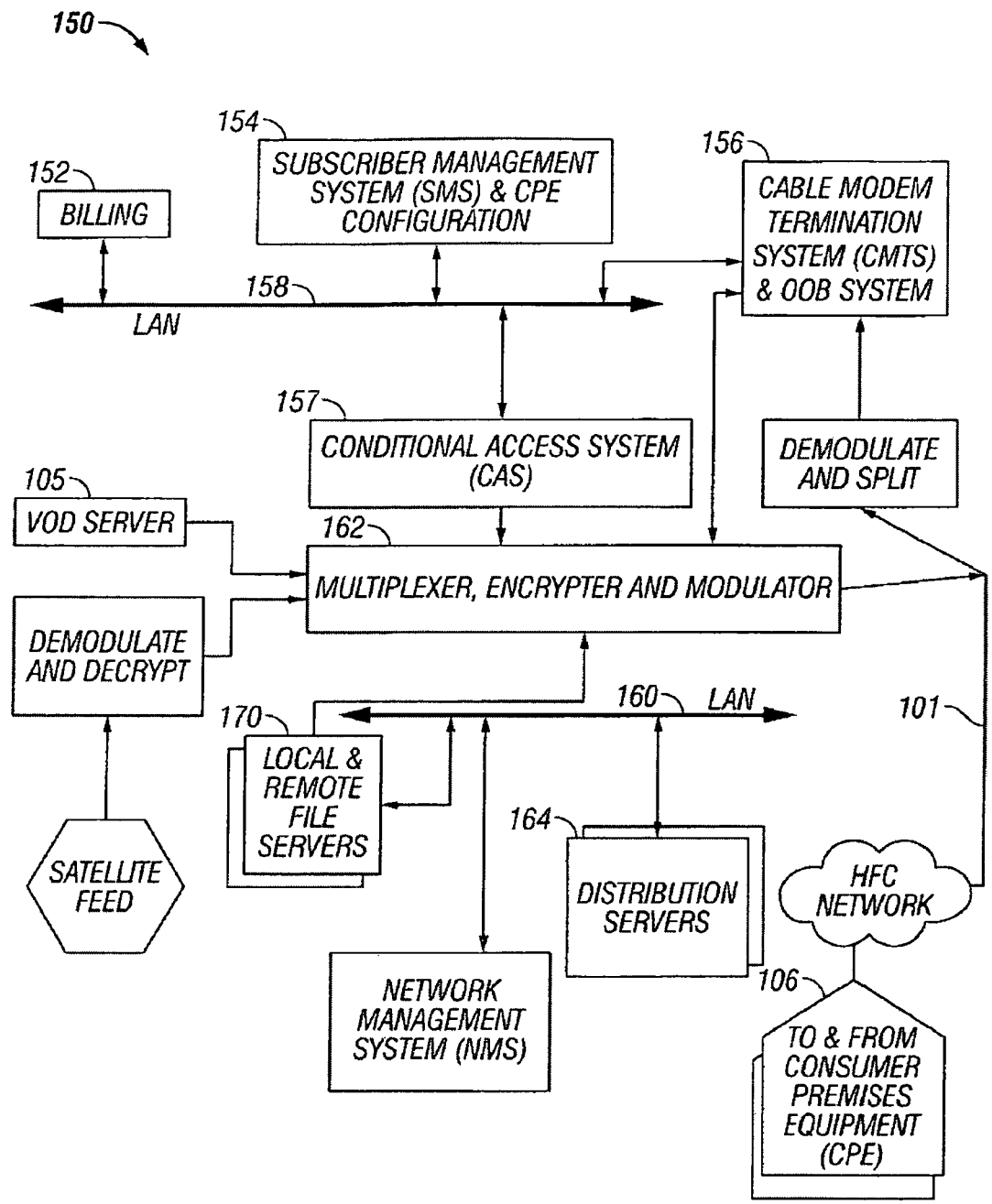
FIG. 1a is a functional block diagram illustrating one exemplary HFC cable network headend configuration useful with the present invention

Referring now to FIG. 1a, one exemplary embodiment of headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the COPE 106 ("downstream") are multiplexed together in the headend and sent to neighborhood hubs (FIG. 1b) via a variety of interposed network components.

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in co-owned U.S. patent application Ser. No. 11/048,334, filed Feb. 1, 2005 and entitled "Apparatus and Methods for Multi-Stage Multiplexing in a Network", which issued as U.S. Pat. No. 7,602,820 on Oct. 13, 2009 and is incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed-forward" mechanisms for transferring information between multiplexing stages.

Content (e.g., audio, video, data, applications, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
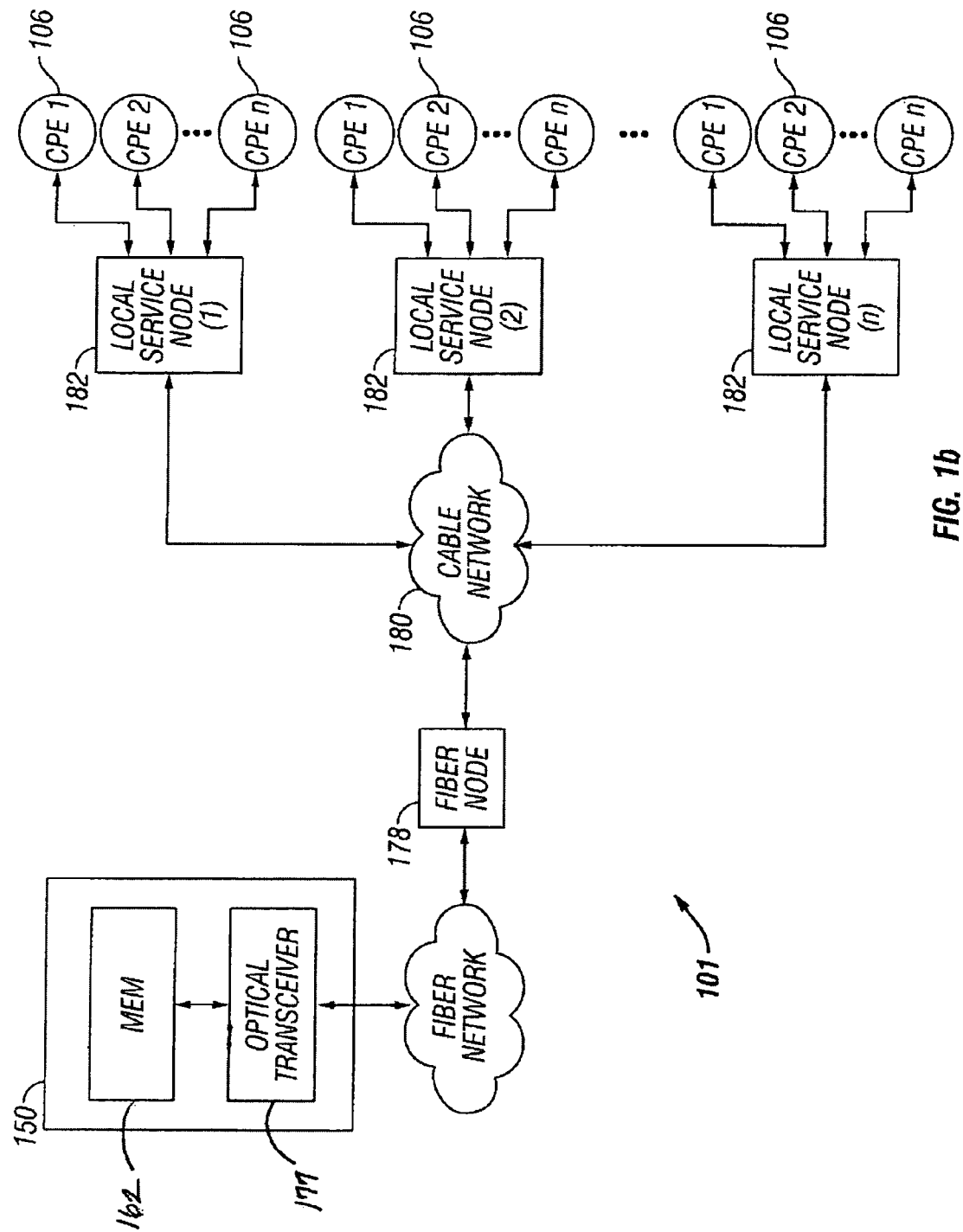
FIG. 1b is a functional block diagram illustrating one exemplary local service node configuration useful with the present invention.
Figure 1C:
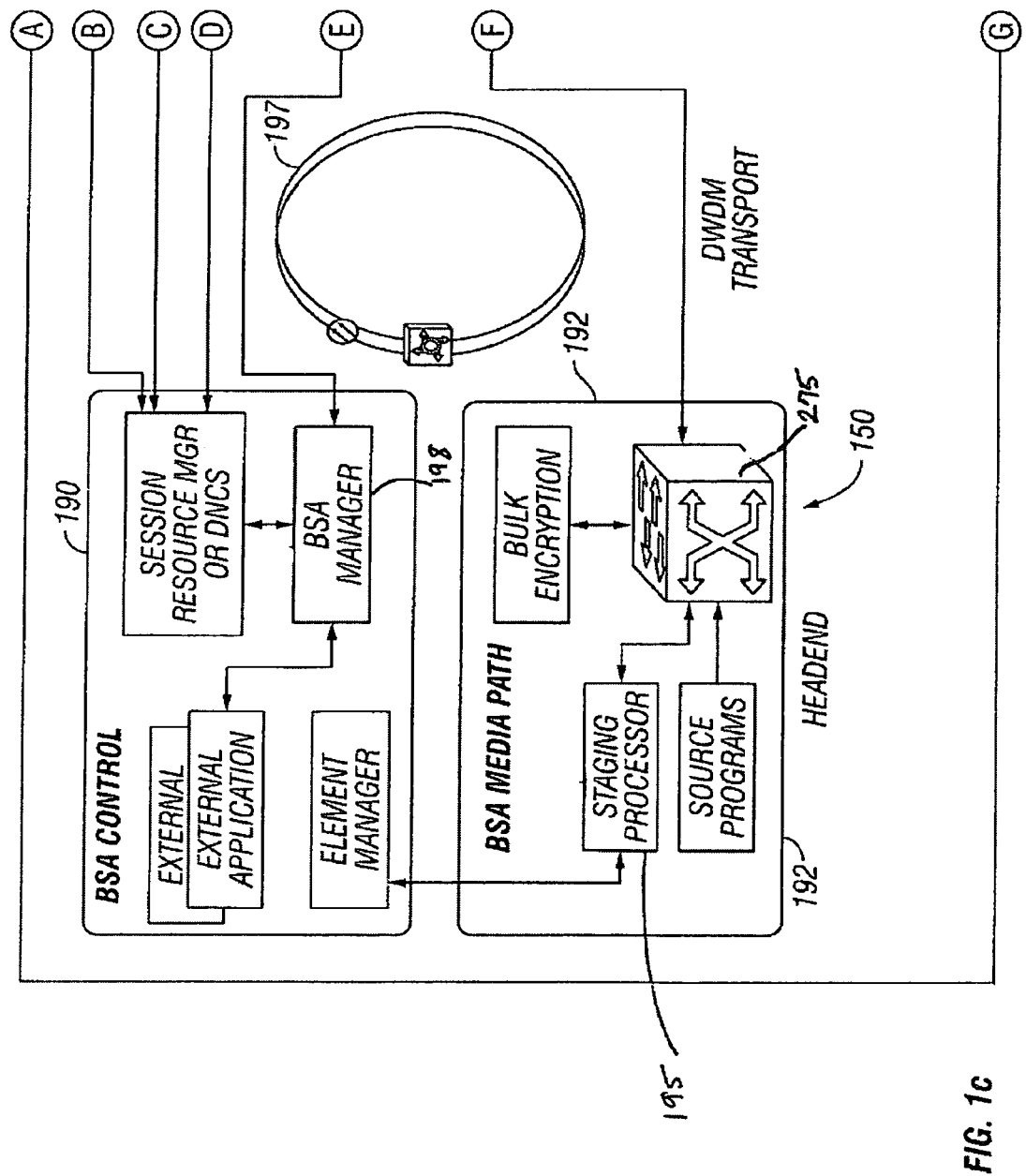
FIG. 1c is a functional block diagram illustrating one exemplary broadcast switched architecture (BSA) network useful with the present invention.
Figure 1C:
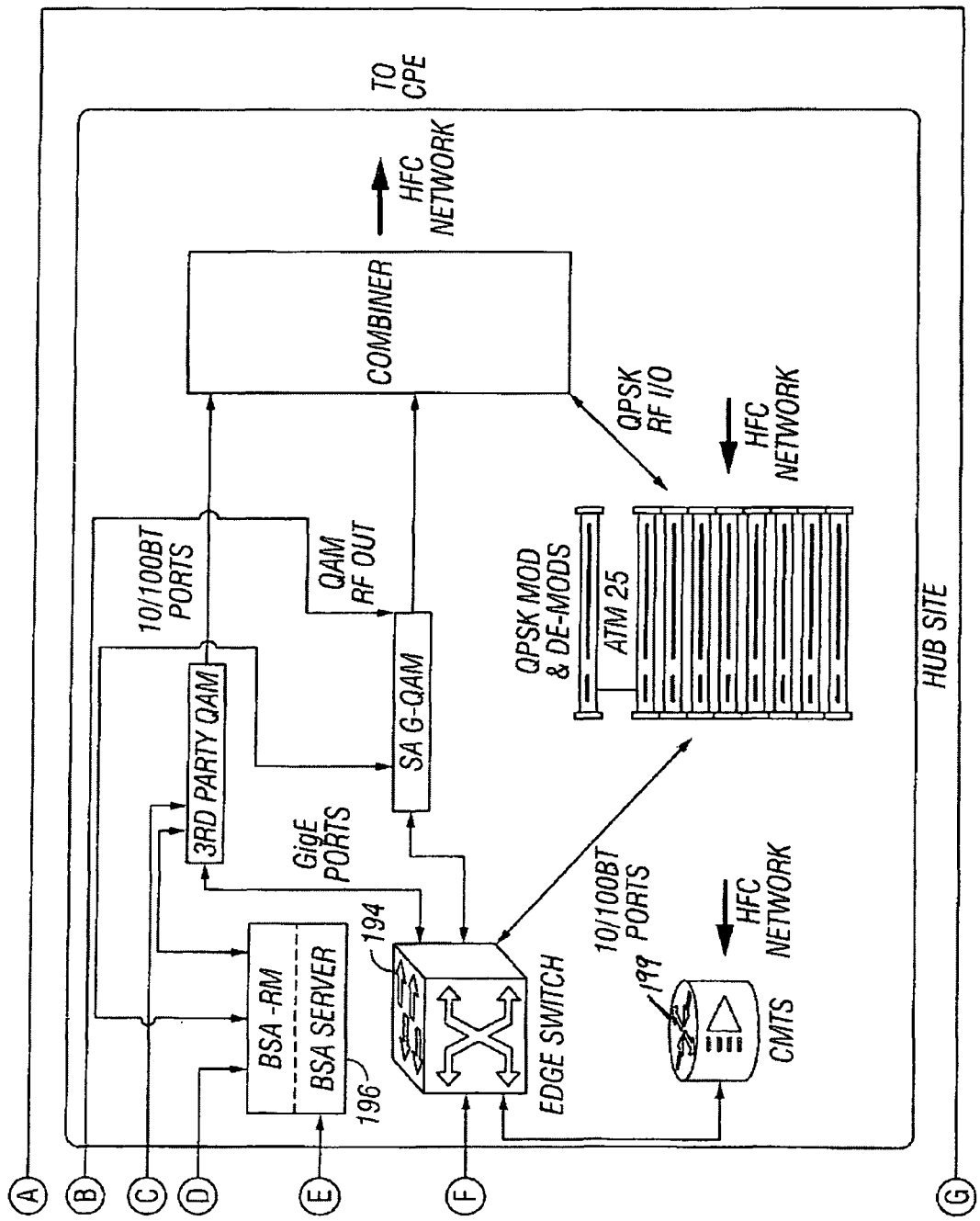

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the headend or farther downstream). The optical domain signals are then distributed to a fiber node 178, which farther distributes the signals over a distribution network 180 to a plurality of local servicing nodes 182. This provides an effective 1:N expansion of the network at the local service end.

"Switched" Networks

FIG. 1c illustrates exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path function 190, 192; these element cooperating to control and feed, respectively, downstream or edge switching devices 194 at the hub site which are used to selectively switch broadcast streams to various service groups. A BSA server 196 is also typically disposed at the hub site, and implements function related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001 and entitled "Technique For Effectively Providing Program Material In A Cable Television System", which issued as U.S. Pat. No. 8,713,623 on Apr. 29, 2014 and is incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a-1c can also deliver Internet data services using the Internet protocol (IP), although other protocols and transport mechanisms of the type well known in the digital communication art may be substituted. One exemplary delivery paradigm comprises delivering MPEG-based video content (e.g., "IPTV" or the like), with the video transported to user PCs (or IP-based STBs) over the aforementioned DOCSIS channels comprising MPEG (or other video codec such as H.264 or AVC) over IP over MPEG. That is, the higher layer MPEG, or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable or other modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPEs (or CD). The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Virtual Personal Media Channel (VPMC)

In the exemplary embodiment, the virtual personal media channel (VPMC) of the present invention somewhat resembles a conventional program channel, at least from a user's perspective. However, unlike a conventional program channel, when a user tunes to the VPMC, they are provided with a content stream that is specifically tailored to that user without the user having to physically enter preference or other information. The VPMC advantageously provides a seamless stream of programming pulled from various content sources, which is displayed according to a priority such that available content which a particular user is most likely to enjoy will be presented first, and so forth.

Hence, the VPMC can be thought of as a personalized user-specific program channel (one exemplary implementation of which is the "Me Channel™" service provided by the Assignee hereof) which aggregates content from various sources to make for a richer, more enjoyable user viewing experience.

Various aspects of the VPMC are now described in detail.

Content Sources

As noted above, the exemplary configuration of the VPMC presents a user with a highly tailored program stream containing content pulled from various sources. Several of the sources from which content may be streamed, and the manner in which they are pulled and placed in the VPMC stream, are discussed below.

Content presented to the user may in one case comprise content contemporaneously broadcast on a separate program channel. In other words, the VPMC may pull content from a separate program channel while it is being broadcast on that other channel. Accordingly, both the VPMC and the original program channel will broadcast the content simultaneously ("simulcast"). A user, tuning to the VPMC, is benefited inter alia in that the user will not have to bear the burden of having to seek out the content on his/her own, such as from a guide (whether electronic, physical or otherwise), and tune to the program channel which the content is set to broadcast at the appropriate time (e.g., by selection at an EPG or by manually keying in the program channel number). Rather, the VPMC in effect "knows" that the user would prefer to view that content, finds the content for the user, and displays the content at the time the broadcast of the content is set. In one embodiment, the broadcast of contemporaneously broadcast programs on the virtual channel is accomplished by well known simulcast techniques (i.e., actually delivering the content on two different program channels, which may or may not be on the same downstream QAM. Alternatively, the VPMC may seamless link the virtual channel to the program channel on which the program is broadcast via an imperceptible program channel switch; e.g., instructing the tuner to switch to the relevant QAM where the content is being delivered, and back to the VPMC at appropriate points. Alternative methods may also be utilized.

Delivery of content within a user's premises may be substantially IP based. In other words, a gateway storage device (such as, for example, a Furnace) may be disposed within the premises so that content may be transported within the premises (e.g., to other devices within a home premises). It is also appreciated that one or more devices within the home premises may utilize Media Over Coax Alliance (MoCA) technology for providing data over coax capability or other similar content distribution technology.

The content presented to the user may also comprise content previously broadcast on a separate program channel, which is either stored locally (e.g., on a user premises device such as a CD or DVR) or stored at a headend entity. Thus, rather than displaying the content, the VPMC presents the user with an opportunity to record the content locally (such as at the user's DVR) and view it at a later time, more appropriate for the user. Alternatively, the system may be programmed to automatically record content having a certain threshold level of similarity to the user's preferences. At any time after the content has been recorded, the content may be presented to the user. In one embodiment, the virtual channel may display the recorded program automatically when the recorded content has the highest level of similarity to the user's preferences, or meets other such criteria. In another embodiment, the user may be given an option to watch the recorded program or watch a currently airing program (having a lower level of similarity to the user's preferences).

Alternatively, the VPMC may present the user with broadcast content at any time after the broadcast has begun but before the broadcast has ended. In this model, the content is stored on a headend entity, such as at a VOD server 105 for storing "start-over" content as described in co-owned, co-pending U.S. Patent Publication No. 2005/0034171 to Benya entitled "Technique for delivering programming content based on a modified network personal video recorder service" incorporated herein by reference in its entirety; and is accessible anytime during the period set for broadcast of the program. In one embodiment, when a user tunes to the VPMC, the user will be presented with an opportunity to re-start the broadcast of a program; e.g., one having the highest level of similarity to his preferences. In an alternative embodiment, the re-started program may be automatically presented upon tuning to the VPMC.

The VPMC may also present a user with VOD, subscription VOD (SVOD), Free VOD (FVOD) or other on-demand content which is accessible through a VOD server or other related server. Where applicable, this content may be purchased directly via the VPMC user interface (described in greater detail subsequently herein). According to this model, the VPMC enables a user to order purchasable content which appears in the VPMC stream (as content the user may want to view) by establishing a connection to the aforementioned VOD server. The user, upon confirmation of the purchase of the content, is then able to view the content on the VPMC in the same logical "stream" as the other content the VPMC presents.

In another embodiment, the user's personal media content will appear in the VPMC stream through the establishment of a connection to the user's CPE/personal content storage device. For example, the user's CPE 106 may comprise a converged premises device such as that described in co-owned and U.S. patent application Ser. No. 11/378,129 filed Mar. 16, 2006 and entitled "Methods and Apparatus for Centralized Content and Data Delivery", which issued as U.S. Pat. No. 8,347,341 on Jan. 1, 2013 and is incorporated herein by reference in its entirety, although other configurations may be used consistent with the invention with equal success. Such converged premises devices afford a substantially integrated management platform and gateway for multiple sources of content within the subscriber's premises, such as their premises LAN (and connected PCs), MoCA network, DVR, etc.

Thus, the VPMC compiles content from any source by establishing a connection thereto, and adding appropriate content from that source to the prioritized list of content to be displayed on the VPMC. A user, when tuned to the VPMC, will be presented with the content from the various sources according to the display hierarchy (e.g., in priority order). Hence, the user is no longer required to search through the various program channels, program guides, DVR interface (list of recorded content), etc., in order to find content that the user would like to view and/or record. Additionally, as discussed in further detail below, the VPMC "knows" the time that content will be available, and adjusts the priority accordingly to ensure that its user is given an opportunity to view or record finite duration content as it is broadcast or available.

Viewing Content on VPMC and Navigating the Priority Playlist

As will be discussed in greater detail below, the exemplary configuration of the VPMC relies on a recommendation engine (e.g., software process) to generate a priority playlist; i.e., a playlist of content which is tailored to a user profile and is presented in priority order. The user may navigate through the prioritized content of the priority playlist to view certain ones of the content in a user-specified order, or may allow the VPMC to display the priority playlist as a single content stream (i.e., the entirety of the playlist is displayed in priority order, uninterrupted).

In one embodiment, the user tunes to the VPMC (e.g., program channel No. XYZ) and views content as it appears (i.e., in priority order, uninterrupted). Accordingly, the user is presented with the first priority content first. As will be discussed in further detail below, the prioritization of content takes into account that certain content is time-sensitive, and thus the prioritization scheme adjusts accordingly. As the user views the first priority content in this embodiment, the prioritization of the remaining content may also dynamically change so as to incorporate any new content that becomes available according to a broadcast schedule, and to remove content that is no longer available as its broadcast has terminated. When the viewed content terminates (either naturally or upon a terminating user act), the priority playlist updates itself to present the user with a new, first-priority content and/or an updated priority playlist.

It is also appreciated that during viewing, the user will be able to apply so-called "trick mode" features to control their viewing experience including for example pause, fast forward and rewind, where available. Methods and apparatus for implementing such trick mode features within a content based network (such as via the lightweight stream control protocol or LSCP) are well known in the art, and thus will not be described in further detail herein.

In another embodiment of the invention, when the user "tunes" to the VPMC (e.g., makes a selection via an on-screen display within a navigation program running on their CPE 106), the prioritized content is presented as a series of clips or "trailers" which play from highest to least priority, and cycle back through again until the user makes a selection or requests an alternative action.

Alternatively, when the user selects the VPMC and is presented with the first priority content of the priority playlist, the user may navigate away from this content by selecting an option to "surf the VPMC" and/or to view the priority playlist so as to possibly select certain content there from.

Figure 2A:
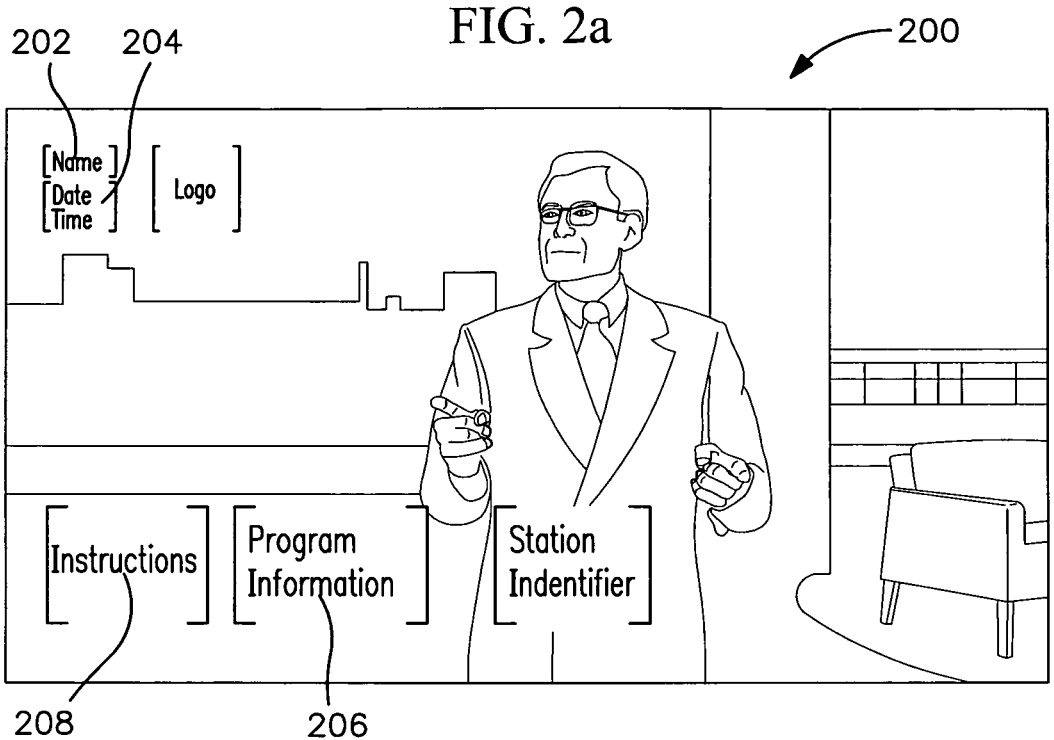
FIG. 2a is a graphical illustration of an exemplary display image produced by a virtual personal media channel (VPMC) as it would appear on a user's display device according to one embodiment of the invention.

As illustrated in the exemplary screenshot of FIG. 2a, when a user joins or selects the VPMC, he/she is presented with a surfing interface 200 which provides date and time information 204, and lists the user profile 202 (such as via a particular viewer's name). The user profile 202 information assists the viewer in determining to which profile the personalized VPMC content relates. As will be discussed in greater detail below, in one embodiment, the viewer may at any time change to a different user profile 202 via a menu or similar VPMC user interface, and as such users can "share" or use proxy profiles from other users if desired. In one variant, these proxy profiles may form the basis of a business model; e.g., "watch the same content that your favorite celebrity or sports personality watches on their VPMC . . . " for an additional fee).

The surfing interface 200 of FIG. 2a provides the user with instructions on how to begin surfing the VPMC (surfing instructions 208), which include notification of which button(s) on the users remote control or DSTB to press in order to commence surfing. For example, the surfing instructions 208 may read "Press JUMP to surf", etc.). The illustrated surfing interface 200 also provides the user with program information 206 regarding the content the user is currently viewing; e.g., program name, duration, network, etc. As the user surfs within the VPMC, the user profile 202 and date and time information 204 will remain unaltered; however, the program information 206 changes as the user jumps to the second content, third content, etc. to display program information 206 related thereto. Surfing within the exemplary VPMC of FIG. 2a occurs in priority order; thus, if the user selects to surf while viewing the first priority content, he/she will be subsequently shown the second priority content, and so forth. Where the content comprises purchasable content such as a PPV or VOD offering, a trailer, thumbnail and/or textual description of the content (rather than the content itself) is displayed.

In an alternative embodiment, however, surfing of the VPMC may comprise surfing trailers, thumbnails and/or descriptions of all of the available content (whether purchasable or otherwise), such that a user will not view any content, even immediately available content, until the user has affirmatively selected to view that content.

Figure 2B:
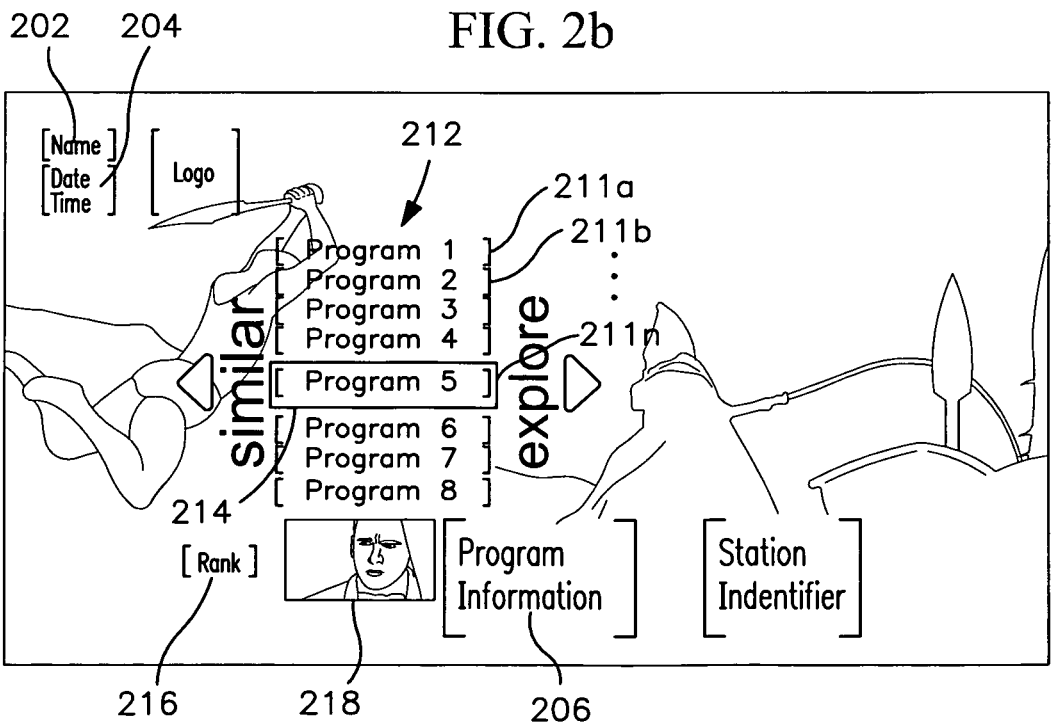
FIG. 2b is a graphical illustration of an exemplary display image of a playlist interface as it would appear on a user's display device according to one embodiment of the invention.

As noted above, the user may navigate away from the first priority content by selecting to view the playlist. FIG. 2b illustrates an exemplary embodiment of the playlist interface 210. The playlist interface 210 provides the user with date and time information 204 and lists the user profile 202. The playlist interface 210 also provides the priority playlist 212 which is a navigable listing of any number n of individual programs or pieces of content 211a, 211b, . . . 211n, listed in priority or other hierarchical order. Generation of the priority playlist 212 will be discussed in greater detail subsequently herein; however, the exemplary playlist 212 is generally populated by comparing one or more facets or attributes of a user's profile with those of available content to find that content which is most similar or best suited to that user's profile. The individual programs 211a, 211b , . . . 211n which comprise the playlist 212 are listed by title (text); it is appreciated however that icons or other display elements such as emotions, audible signals (e.g., audio clips when a user rolls over or selects the given display element) may be utilized in place of or in addition to the aforementioned text.

The mechanism for indicating to the user his position within the playlist interface 210 in the illustrated embodiment comprises a highlighted bar 214, however, it is appreciated that other indicators 214 including, inter alia, an icon, such as a dot, a star, increased size of wording, modulating the color or intensity of the text/icon, etc., may be utilized as well. The user's position within the playlist 212, and thus the indicator 214 may be moved within the list by a user pressing "up" and "down" keys (or other keys which have a position relative one another that would indicate position on the list, such as, volume keys, numerical channel keys, etc.) on the remote control. As a user disposes the indicator 214 on an individual program 211n within the list, program information 206 about that individual program 211n is displayed such as in a balloon window or other display area; the exemplary playlist interface 210 of FIG. 2b also displays the rank 216 of the program 211n on which the indicator 214 is resting, and a thumbnail 218 associated therewith. The thumbnail 218 gives the viewer a small picture (still or moving) or icon relating to the program 211n. The content rank 216 notifies the user of the priority position of the highlighted program 211n with respect to the remainder of the playlist 212. In the illustrated example, the indicated program 211n is the fifth priority content with respect to the other twenty-four pieces of content listed in the playlist 212 as displayed by the rank 216 "5 of 25". It will also be recognized that other information about the highlighted program 211n can be provided, such as a short audio clip, information as to why that content was matched to the user (i.e., "why is this program on my playlist?") so as to enable a subscriber to more finely tune their playlist in the future, etc.

Similar Content Function

Figure 2C:
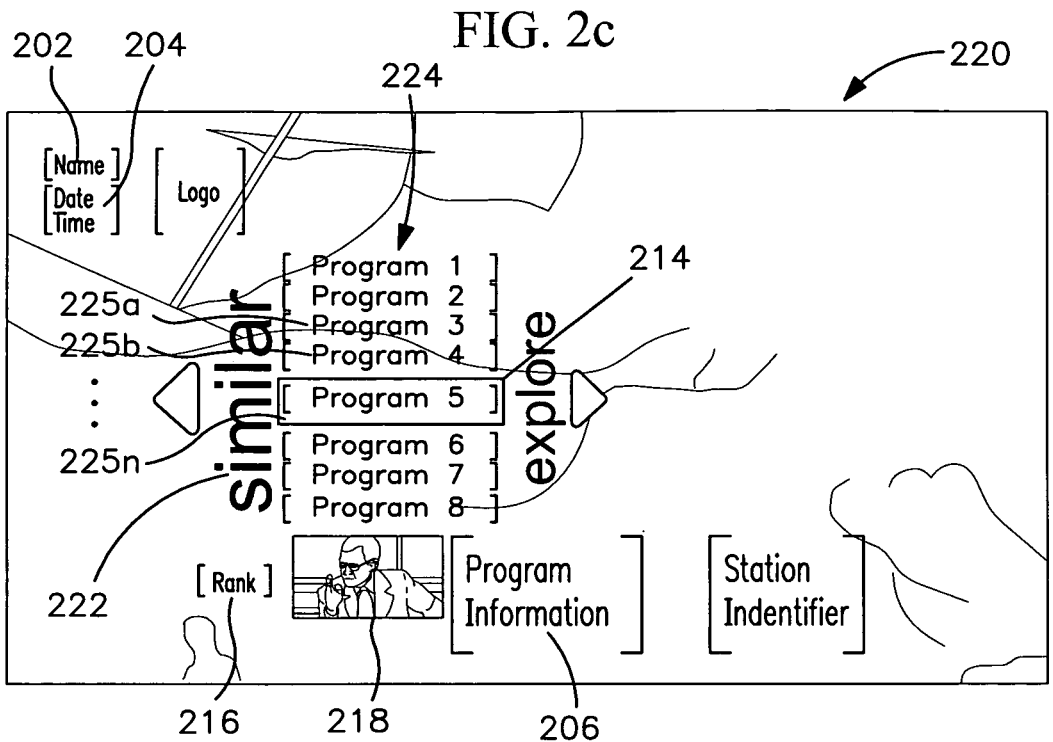
FIG. 2c is a graphical illustration of an exemplary display image of a similar content interface as it would appear on a user's display device according to one embodiment of the invention.
Figure 2D:
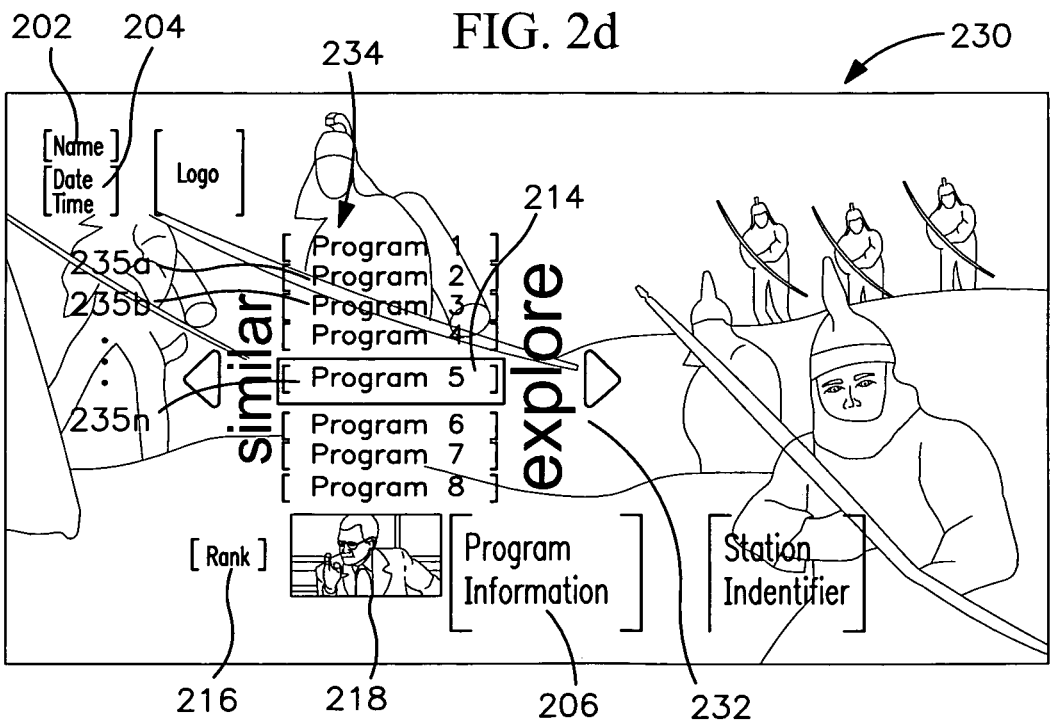
FIG. 2d is a graphical illustration of an exemplary display image of an "explore" content interface as it would appear on a user's display device according to one embodiment of the invention.

In one embodiment, at the playlist interface 210 of FIG. 2b, a user is also able to move the indicator 214 to the left or right of a selected content via the appropriate buttons on the remote control (e.g., "left" or "right" buttons, or other buttons which have a position relative one another) to indicate that the user would like to find programming similar to the selected content 211n. In the embodiment of FIGS. 2b-2d, a user indicates their intent to locate similar content by pressing a button that moves to the left; however, other configurations are also readily utilized.

Referring now to FIG. 2c, one embodiment of the similar content interface 220 is shown. A user is made aware that he is navigating within the similar content interface 220 by the magnification of the word "Similar" on the similar tool panel 222 as compared to its size in the playlist interface 210; however, other mechanisms may be utilized to indicate that a user has selected the "similar" function including, inter alia, highlighting or an icon, such as a dot, a star, an arrow, modulating color or intensity, etc. It is also noted that various other descriptive terms may be substituted for the word "Similar" on the tool panel 222, such as for example "Other matches", "More like this", and so forth.

The "similar" content interface 220 of FIG. 2c also displays the user profile 202 and date and time information 204. More significantly, the similar content interface 220 displays a similar content playlist 224 comprised of several individual pieces of similar content or similar programs 225a, 225b, 225n. The similar content 225a, 225b, 225n is generated by a mechanism akin to that which derives the priority playlist 212. Accordingly, generation of the similar content playlist 224 in the illustrated embodiment occurs by comparison of various aspects of the selected content 211n to corresponding aspects of the available content, although other criteria for selection may be used (such as where the "Similar" content is derived from content which also matches the user's profile and matches certain attributes of one or more content elements on the primary playlist, yet with a lower score (degree of correlation), much as Internet search engine "more like this" functions operate.

The indicator 214, as above, may be moved within the similar playlist 224 by using appropriate remote control buttons (such as "up" and "down", "channel up" and "channel down", or "volume up" and "volume down" controls, dedicated function buttons, etc.) to select an individual similar program 225n. Program information 206, a thumbnail 218 and rank 216 (where applicable) of the selected similar program 225n are displayed when the user places the visual indicator 214 on a similar program 225n.

Explore Content Function

At the exemplary playlist interface 210 of FIG. 2b, a user is also able to move the indicator 214 to the left or right of a selected content (via the appropriate buttons on the remote control, e.g., "left" or "right" buttons, or other buttons which have a position relative one another) to indicate that the user would like to explore programming generally related to the selected content 211n. In the embodiment of FIGS. 2b-2d, a user indicates intent to explore related content by pressing a button that moves to the right; however, other configurations are also feasible.

Referring now to FIG. 2d, the "Explore" content interface 230 is shown. As above, the word "Explore" (or other descriptor) is magnified in size to indicate the user's presence in the explore interface 230 (other mechanisms may alternatively be utilized to indicate selection of the explore function). It is also noted that various other descriptive terms or graphical mechanisms (e.g., icons) may be substituted for the word "Explore" in the tool panel 232. The Explore interface 230 also displays an explored content playlist 234 comprised of several individual pieces of "explored" content or programs 235a, 235b, 235n. The explored content 235a, 235b, 235n is generated by a mechanism akin to that which derives the similar content playlist 234, discussed in greater detail below.

The indicator 214, as above, may be moved within the Explore playlist 234 by using appropriate remote control buttons to select an individual explored program 235n. Program information 206, a thumbnail 218 and rank 216 (where applicable) of the selected explored program 235n is automatically displayed when the user disposes the indicator 214 on an explored program 235n.

As noted above, generation of the "Similar" and "Explore" content playlists 224, 234 occurs by examining one or more facets of the content (such as theme or genre, studio, primary actors, run time, rating/suitability for various audiences, geographic relation, etc.) and comparing these to corresponding aspects of other available content. In one embodiment, each evaluated facet is given a weight, and content with the highest level of similarity to the selected content (e.g., that highlighted on the primary content playlist and selected for the "Similar" or "Explore" functions) based on these evaluated aspects and weighing is presented. The aspects which are evaluated in the exemplary embodiment differ between the Similar and Explore content functions, and/or these functions may impose a different weight to individual ones of the various aspects examined. In one embodiment, the Explore content function delivers content which has a higher degree of similarity to certain aspects of the selected content than that content which is delivered via the aforementioned Similar function. In other words, the exemplary Explore function permits a more narrow and focused search of available content than the similar content function. Alternatively, the Explore content function may be configured to deliver content having less similarity to the selected content, thus providing a broader search than the Similar function.

It is also appreciated that, in another embodiment, the user may, upon selection of the "Explore" and/or "Similar" function be given an opportunity to select or enter the criteria by which similar or explored content will be searched. For example, a user may select the Explore and/or Similar menu option and be presented with a list of the various aspects of the selected content. In the example of FIG. 2d, if the user selects Explore and/or Similar while the program The Late Show is selected, the user will be presented with various aspects of that show such as its genre, the actors or guests who will appear on the show, the musical guests, etc. (e.g., Talk Show, Matt Damon, etc.). Then, the user may then select from among those aspects for one or more criteria which will be used to deliver a list of other "similar" or "explored" content. Likewise, the user may manually enter other criteria to search as well. Thus, if the user selects to explore and/or find similar content to Matt Damon, the user will be presented with other programs, movies and content which also contain the aspect Matt Damon (e.g., as a guest, actor, director, subject of the content, etc.). Further, if the user also manually enters the genre "movie" (entry would be manual because the genre "movie" may not show up as an aspect of the selected content The Late Show), the user will be presented with only movies featuring Matt Damon.

Purchasable Content

When a viewer tunes to the VPMC stream and/or navigates the playlist 212 (FIG. 2b) and encounters content from sources which require additional payment for viewing (e.g., on demand or PPV content), the VPMC may be configured to access a trailer or preview of the content (or provide other descriptive information such as a textual abstract or thumbnail images), and require prior authorization before the content is delivered.

In one embodiment, where the user has viewed the first priority content, and the second priority content is purchasable content, the VPMC may cycle through the trailer or preview one or more times before proceeding on to the next priority content or, alternatively, may display the priority list 212 (at which point the user must affirmatively select the purchasable or other content).

Figure 2E:
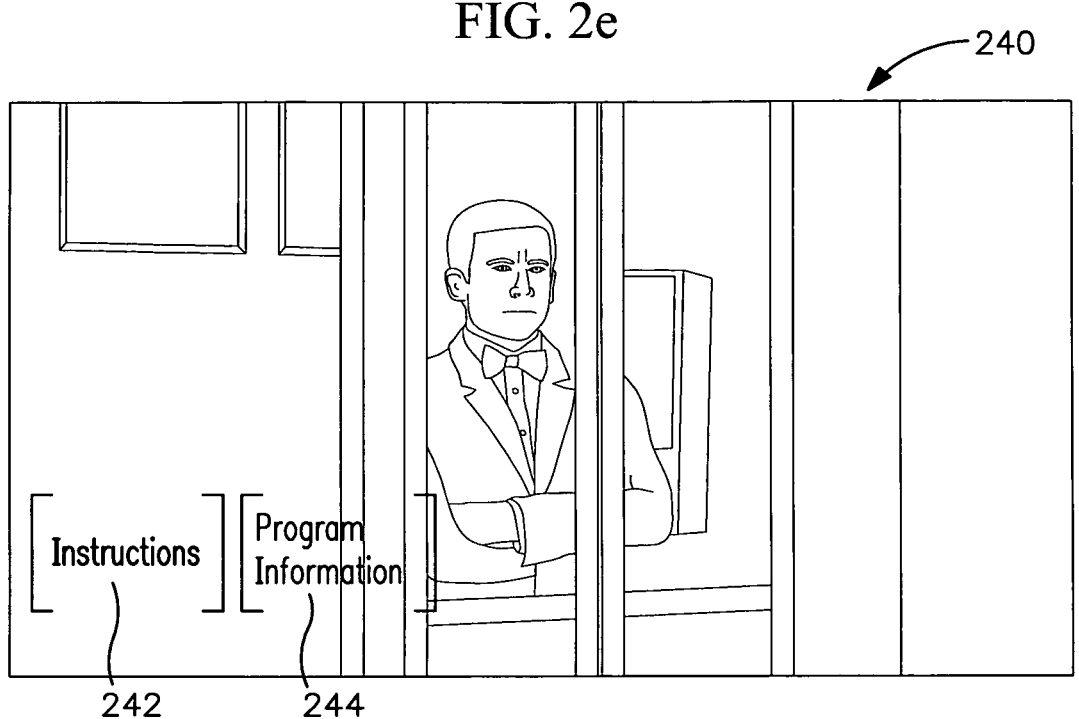
FIG. 2e is a graphical illustration of an exemplary display image of a purchasable content interface as it would appear on a user's display device according to one embodiment of the invention.

As will be discussed in greater detail below, when a purchasable content trailer or other such descriptive information is presented, the display elements 242, 244 of the purchasable content interface 240 are displayed on top of the trailer in such a way so as to not appreciably obscure or mask the user's continued viewing of the trailer/information. One embodiment of the purchasable content interface 240 is depicted in FIG. 2e. The instructional information 242 informs the user of the appropriate remote control buttons to press in order to begin a purchase of the content. In the illustrated example, the instruction information 242 indicates to the user that he must "Press SELECT to order"; however, other remote control buttons or keys may be employed as well. The general purchasing information 244 is a display of relevant information for the purchaser of content, the general purchasing information 244 includes, inter alia, the title, cost or rental rate, and rental period.

Figure 2F:
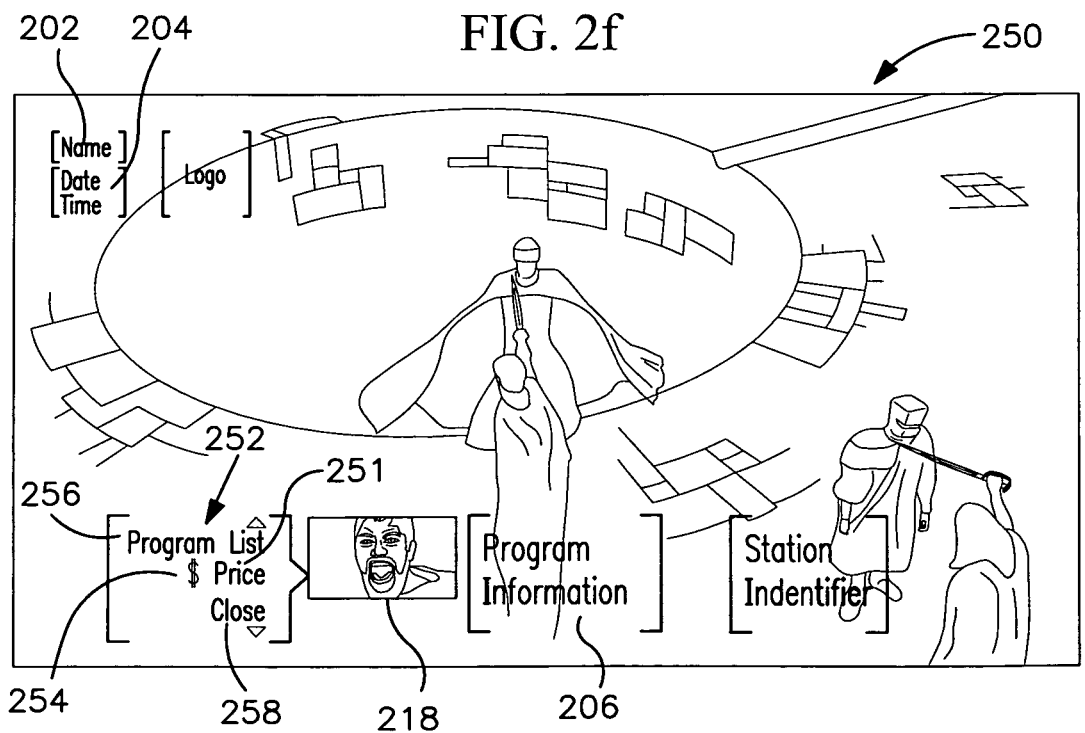
FIG. 2f is a graphical illustration of an exemplary display image of a purchase confirmation interface as it would appear on a user's display device according to one embodiment of the invention.

Upon selection of content for purchase per the instructions 242 of FIG. 2e (i.e., after beginning purchase of content), the user is presented with a purchase confirmation interface 250 as depicted in FIG. 2f. At this interface, the user is shown the program information 206 and a thumbnail 218 corresponding to the program to be purchased. A confirmation menu 252 is also displayed. At the confirmation menu 252, the user manipulates the indicator 251 (in a manner similar to that described above with respect to the content indicator 214) to navigate between various menu 252 options including, inter alia, purchasing 254 the content, returning 256 to a previous menu, and exiting 258 the confirmation interface 250. If the user requests to purchase the content selection of the purchase option 254 would begin display of the content; otherwise, the user will be returned to a previous interface. Display and verification at two separate interfaces, i.e., the confirmation interface 250 and the confirmation menu 252, assists the MSO in verifying that the user did, in fact, intend the purchase of the selected content.

Navigation Interface

Figure 3:
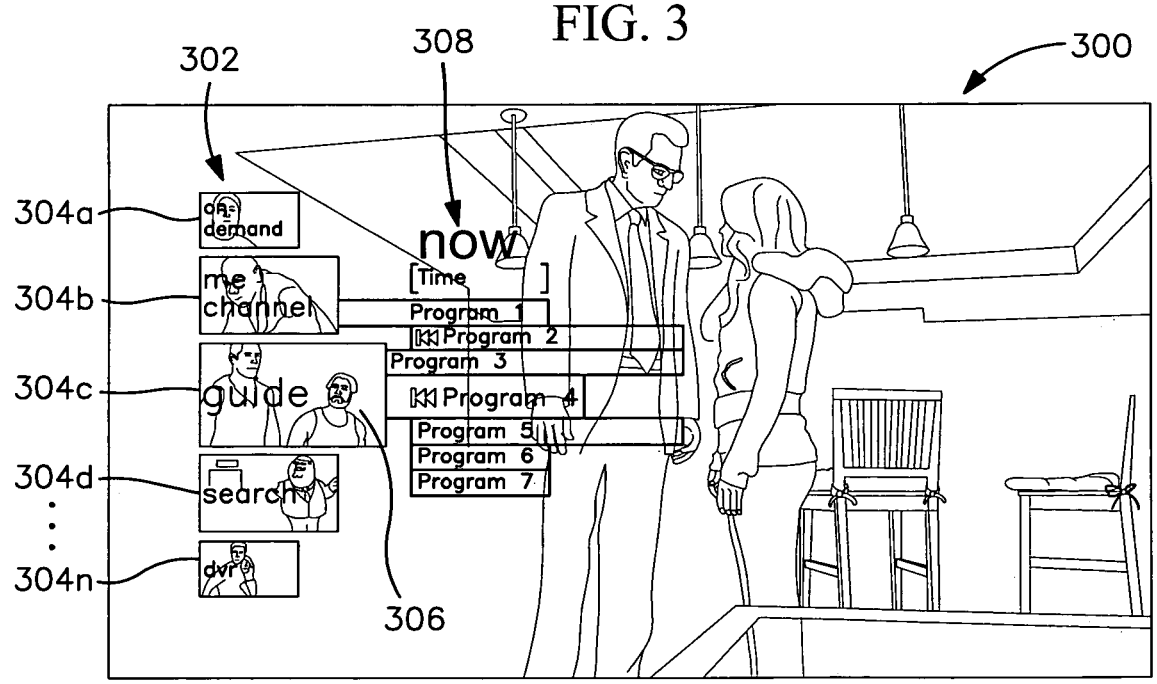
FIG. 3 is a graphical illustration of an exemplary display image of a navigation interface as it would appear on a user's display device according to one embodiment of the invention.

Referring now to FIG. 3, an exemplary embodiment of a navigation interface 300 is shown. The navigation interface 300 of FIG. 3 presents to the user a navigation toolbar 302 containing various navigation tools 304 including, inter alia, an on-demand tool 304a, a VPMC (e.g., Me Channel™) tool 304b, a program guide tool 304c, a search tool 304d, and a DVR navigation tool 304n. Each of the tools 304 is represented by an icon; in the illustrated embodiment, the icon is a screenshot or thumbnail background, with a textual description of the function of the tool 304 given in the foreground; other configurations are also effective.

The user's position on the navigation toolbar 302, in the embodiment of FIG. 3, is indicated by highlighting 306 and enlarging the tool's icon; the tools 304b, 304d immediately adjacent to the selected tool 304c are also slightly enlarged; however, these are not highlighted. This configuration gives the user a sense that the list is navigable in either direction relative to the selected tool 304c. However, it is appreciated that other indicators 214, including, inter alia, other approaches such as the appearance and movement of an icon, modulated color or intensity, etc., may be utilized as indicators as well. The user's position within the navigation toolbar 302, and thus the highlighting indicator 306, is changed or moved within the list by the user pressing "up" and "down" keys (or other keys which have a position relative one another that are indicative of position on the list, such as, volume keys, channel keys, etc.) on a remote control.

As a user places the highlight 306 on particular tool 304c within the list, additional information, lists, or interfaces may appear. In other words, indication (via the highlighting indicator 306) in the navigation interface 300 triggers an abbreviated interface or information list to appear on the display for each of the navigation tools 304. Thereafter, the user may select the tool 304 (by pressing "enter", "select", or other appropriate remote control button) to view the fall, more detailed interface or information.

For example, placing the highlight 306 on the on-demand tool 304a of the navigation toolbar 302 presents the user with a navigable list (not shown), such as the playlist 212 described above with respect to FIG. 2b, of VOD, SVOD, Free VOD, and other content available on demand. If a user then selects the on-demand tool 304a, the on-demand content may be presented on a second interface (not shown) that displays icons or thumbnails, more detailed program information, pricing information etc. Alternatively, selection of the on-demand tool 304a may trigger the presentation of a series of trailers each having a purchasable content interface 240 and a confirmation interface 250 as discussed with respect to FIGS. 2e-2f above.

Placing the highlight 306 on the Me Channel (VPMC) tool 304b presents the user with a priority playlist 212 similar to that discussed with respect to FIG. 2b above. Then, upon selection of the tool 304b, the playlist interface 210 of FIG. 2b described above is displayed.

As illustrated in FIG. 3,. placing the highlight 306 on the program guide tool 304c causes the current broadcast schedule 308 portion of the EPG to be displayed. Actual selection of the program guide tool 304c permits navigation within the current broadcast schedule 308 portion. Further navigation within the EPG is possible, and will be discussed in greater detail below with respect to FIGS. 4a-4e.

In another example, placing the highlight 306 on the search tool 304d of the navigation toolbar 302 provides the user with an interface (not shown) for searching various sources for content matching user-entered or other criteria. At this interface, the user can enter a search for a particular program, keyword, actor, genre, year, etc. The search engine will then generate a playlist of content (from the various sources discussed above) which matches the criteria of that search.

Alternatively, when a user selects the search tool 304d, a second searching interface (not shown) having more features may be provided. At this more detailed interface, a user may once again enter the user's own search criteria, or may select suggested search criteria provided by the search engine. For example, the search engine may suggest the user search previous searches, common searches, use "auto-complete" function of the type used on web browsers search inputs, etc., so as to save the user having to enter the criteria manually each time. The search engine may also suggest searching popular searches—the search engine may for example determine popularity based on data collected from various sources. For instance, the search engine may gather popularity data from Internet-based databases and/or from data collected from other similar search engines located in other user's homes within the same MSO network (e.g., other MSO subscribers).

It will be recognized that the aforementioned functions, and potentially other aspects of the present invention, can be effectively implemented by having user/CPE-specific data. To the degree that the collection of search engine or other data utilizes subscriber-specific or CPE-specific data in its operation, such data can optionally be protected so as to maintain subscriber privacy. For example, the MSO might use a mechanism to anonymously identify and associate the aforementioned data with particular CPE (and hence individual subscriber accounts). In one embodiment, subscriber identities are optionally protected by hashing or encryption of the tuner address or the like prior to logging and storage. The stored "hashed" address or other parameter (e.g., TUNER ID, MAC address, etc.) and associated data are therefore not traceable to a particular user account. The resulting obscured tuner address is repeatable so the necessary tuning location and other tracking may be performed while still maintaining complete subscriber anonymity. Alternatively, all or portions of the user-specific (albeit anonymous) information may be stripped off before storage and/or usage of the data. See, e.g., co-owned and co-pending U.S. patent application Ser. No. 11/186,452 filed Jul. 20, 2005 and entitled "Method and Apparatus for Boundary-Based Network Operation", which is incorporated herein by reference in its entirety, for exemplary implementation of such privacy protection mechanisms. Accordingly, the search engine can evaluate individual CPE 106 based on searching activity, and provide analysis based on data gleaned from that particular CPE (i.e., on a per-CPE basis), or groups of CPE, if desired.

Referring again to FIG. 3, placing the highlighting indicator 306 on the DVR navigation tool 304n gives a list (not shown) of the content available on the user's local storage device or DVR for immediate viewing. Selection of the DVR navigation tool 304n gives a detailed interface (not shown) having additional information and function including, inter alia, information about upcoming scheduled recordings and series recordings, and the ability to lock certain content (and/or delete content).

Although the embodiment of FIG. 3 illustrates only the abovementioned tools 304a, 304b, 304c, 304d, 304n, it is appreciated that a plurality of other tools and functions known in the art may be incorporated on the navigation toolbar 302 as well. For example, a tool giving recommendations in the form of a "quick list" of top picks, and/or a tool giving the user an option to view most recently viewed content, or the results of recent searches, and/or a tool linking a user to games, a gaming console, or the Internet may be presented on the navigation toolbar 302 as well. Myriad different functions and combinations therefore can be implemented within the tool bar.

Improved Electronic Program Guide (EPG)

As discussed above and illustrated in FIG. 3, at the navigational interface 300, placing the highlighting indicator 306 on the program guide tool 304c of the navigation toolbar 302 presents the user with the current broadcast schedule 308 portion of the EPG.

Figure 4A:
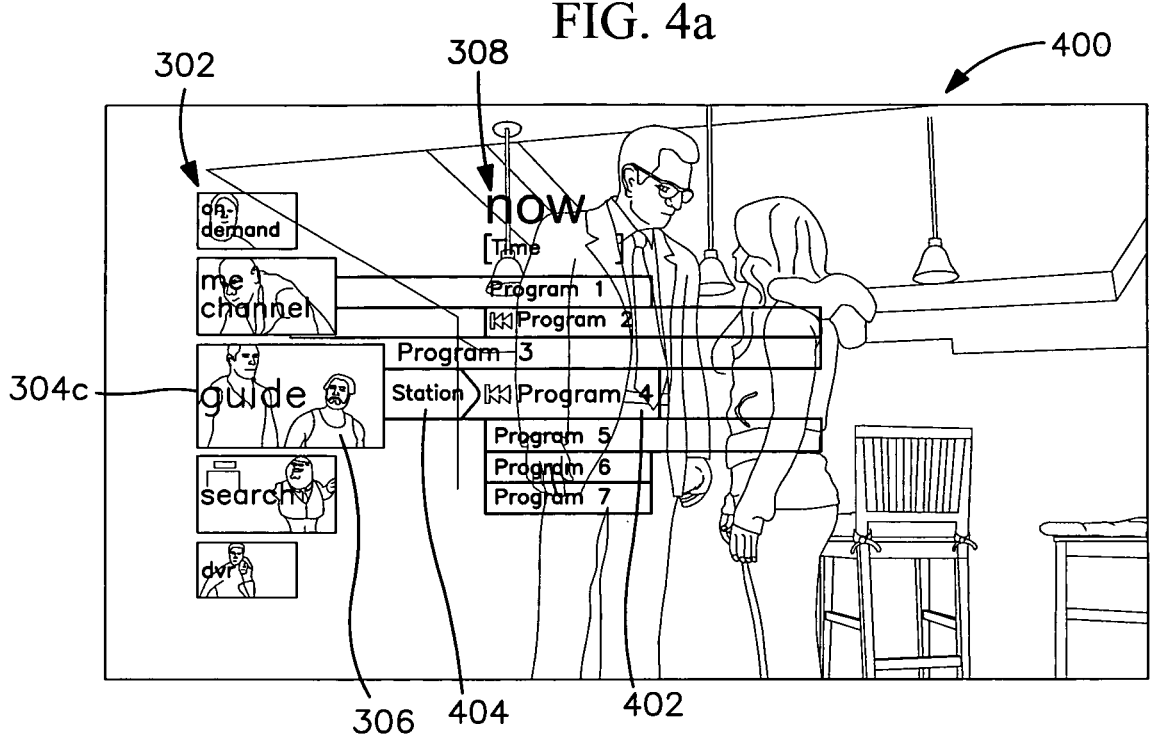
FIG. 4a is a graphical illustration of an exemplary display image of a current broadcast schedule in an exemplary scheduling interface as it would appear on a user's display device according to one embodiment of the invention.

Referring now to FIG. 4a, actual selection of the program guide tool 304c permits navigation within the current broadcast schedule 308 at the current schedule interface 400. The current broadcast schedule 308 is a display of content presently being aired on all program channels with minimal information about the content, including e.g., title and a graphic representation of the start and end time of each program. A user may navigate within the current broadcast schedule 308 to view programs that are currently broadcast on the various program channels by moving the navigation indicator 402 up or down via corresponding buttons on a remote control. As illustrated, placing the indicator on a particular program causes the network identifier 404 to which the program is associated to be displayed and indicated (e.g., highlighted) as well. As a user navigates the schedule 308 in either direction, the uppermost or lowermost displayed program is removed from the list and each of the remaining programs is moved up or down the list in relation to the center of the screen. A new program is also added to the bottom or top of the list depending on the direction of navigation.

Figure 4B:
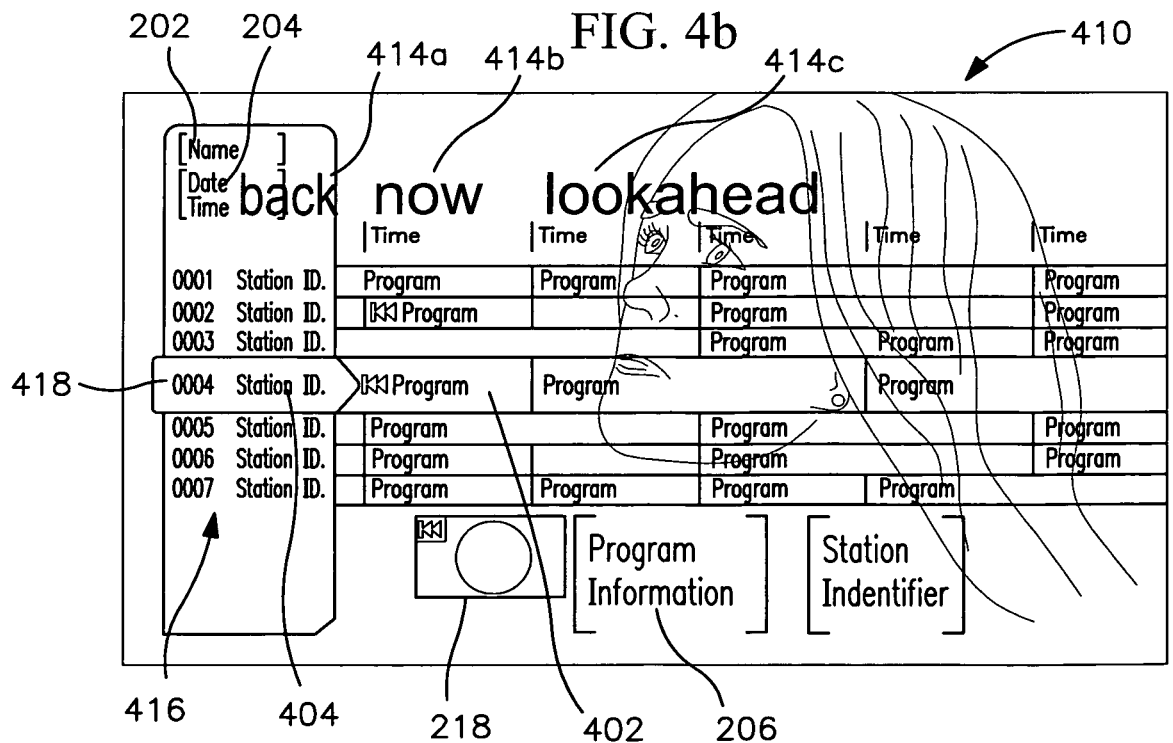
FIG. 4b is a graphical illustration of an exemplary display image of an electronic programming guide (EPG) interface as it would appear on a user's display device according to one embodiment of the invention.

FIG. 4b illustrates the exemplary EPG interface 410 of the present invention. The EPG 410 of this embodiment comprises a user interface (GUI) adapted to display program information 206 and a thumbnail 218 of the programs the user navigates through. The EPG 410 displays a list of broadcast and other programming for every program channel along a timeline 412. The EPG 410 further comprises a network description column 416. The network description section 416 is located adjacent to the schedule of programming, and comprises two columns giving the network identifier 404 and program channel number 418 for each of the content titles displayed in the EPG 410. As the user navigates within the EPG 410, the channel 418 and network 404 information associated with the displayed content are given.

The exemplary EPG 410 of the present invention further comprises descriptive headers 414 which indicate to the user whether he/she is viewing a listing of content that: (i) was previously aired 414a, (ii) is currently being aired 414b, or (iii0 will air at some future time 414c. In the illustrated embodiment, the headers which indicate the user's position relative to the current time are: "look back" 414a, "now" 414b, and/or "look ahead" 414c; however, it is noted that alternate text or mechanisms (such as icons) may be used in the descriptive headers 414.

Figure 4C:
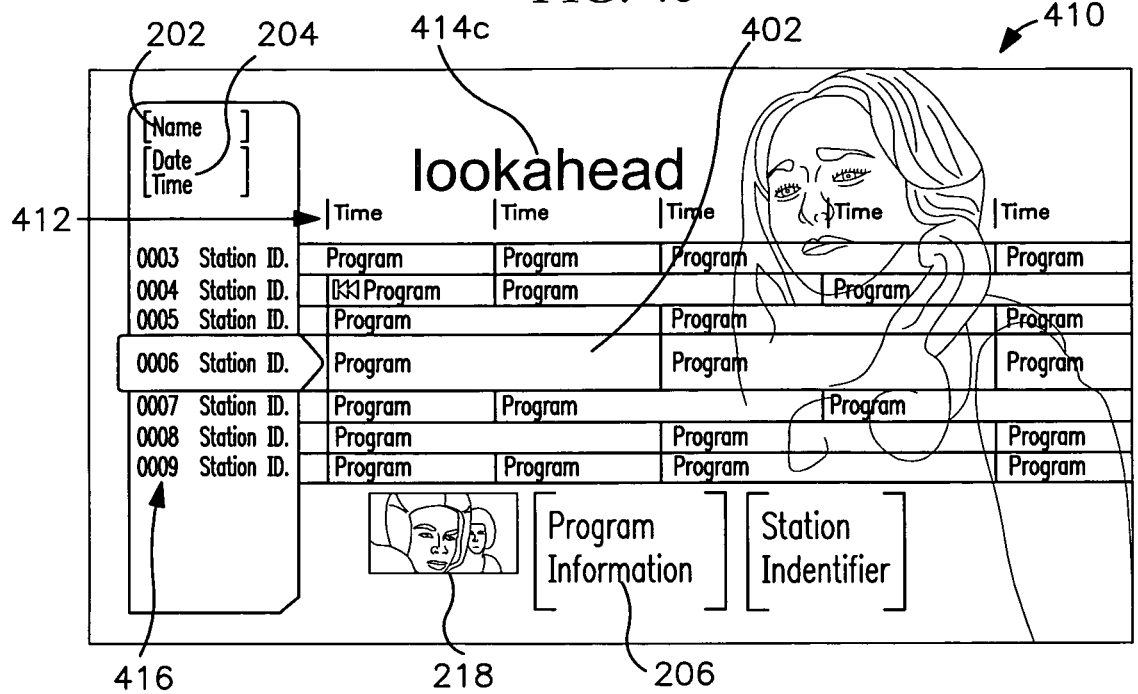
FIG. 4c is a graphical illustration of an exemplary display image of an EPG showing exemplary future broadcast programming, as it would appear on a user's display device according to one embodiment of the invention.

As shown in FIG. 4c, the headers change position according to the user's position within the timeline. In the exemplary screenshot of FIG. 4c, the user has navigated to content which is set to air in at a future point in time relative the user's current time (as indicated in the date and time information display 204 of FIG. 2a); thus, the "look ahead" header 414c is prominently displayed. It is noted that a user may employ appropriate buttons (such as, for example, up, down, channel up and down, volume up and down, etc.) on their remote control to perform the aforementioned navigation within the EPG 410.

The navigation indicator 402 allows the user to keep track of his movement within the EPG 410. In the illustrated embodiment, the indicator 402 comprises a highlighted or different color indicator; nevertheless, other approaches to indication (e.g., icons, modulation of color or intensity, etc.) are equally useful. The EPG also highlights, by showing in a separate color or shade, all of the content that is broadcast simultaneously with the content indicated by the navigation indicator 402. It is appreciated that such shading and/or coloring methods may also be implemented to indicate to the user which programs will be displayed on the VMPC and/or are, or will be, listed in the priority playlist 212.

Program Options Menu

Figure 4D:
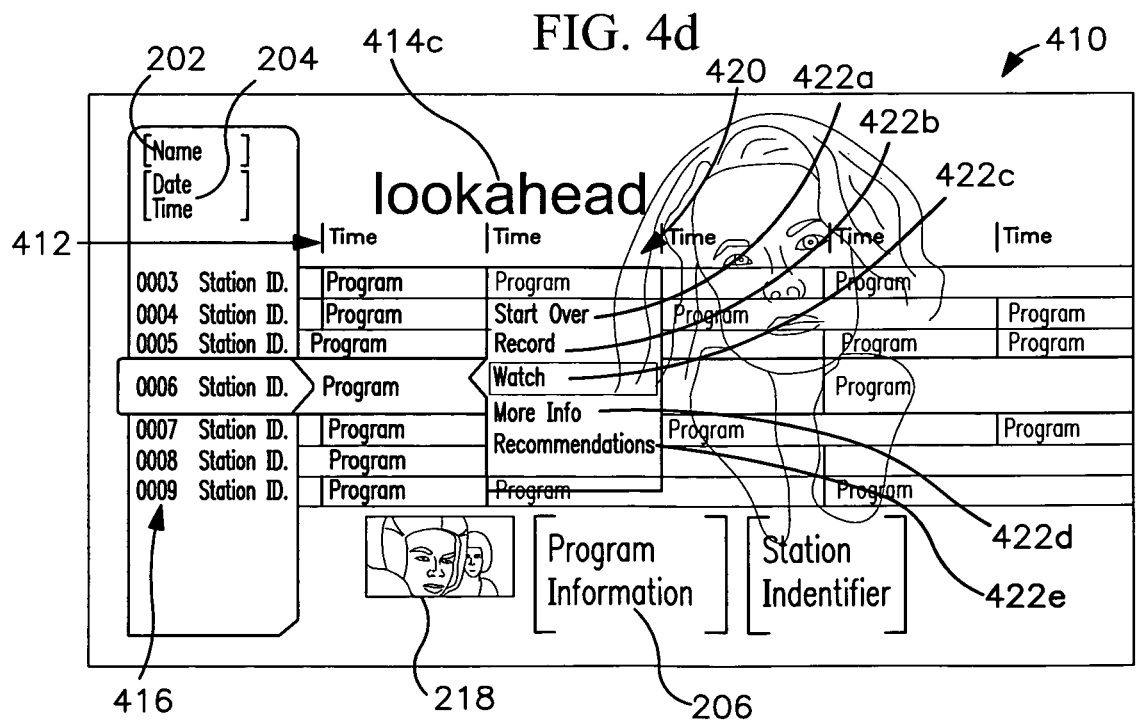
FIG. 4d is a graphical illustration of an exemplary display image of a program options menu for an exemplary program of the EPG as it would appear on a user's display device according to one embodiment of the invention.

Referring now to FIG. 4d, one embodiment of the program options menu 420 according to the invention is shown. The program options menu 420 appears when the user, at the EPG 410, selects a particular program. A program is selected for example by pressing "select", "enter" or other appropriate button on the user's remote control. The program options menu 420 gives a list of user actions 422 from which the user may select (in order to carry out that that user action 422) and be taken to the appropriate interface or display.

Figure 4E:
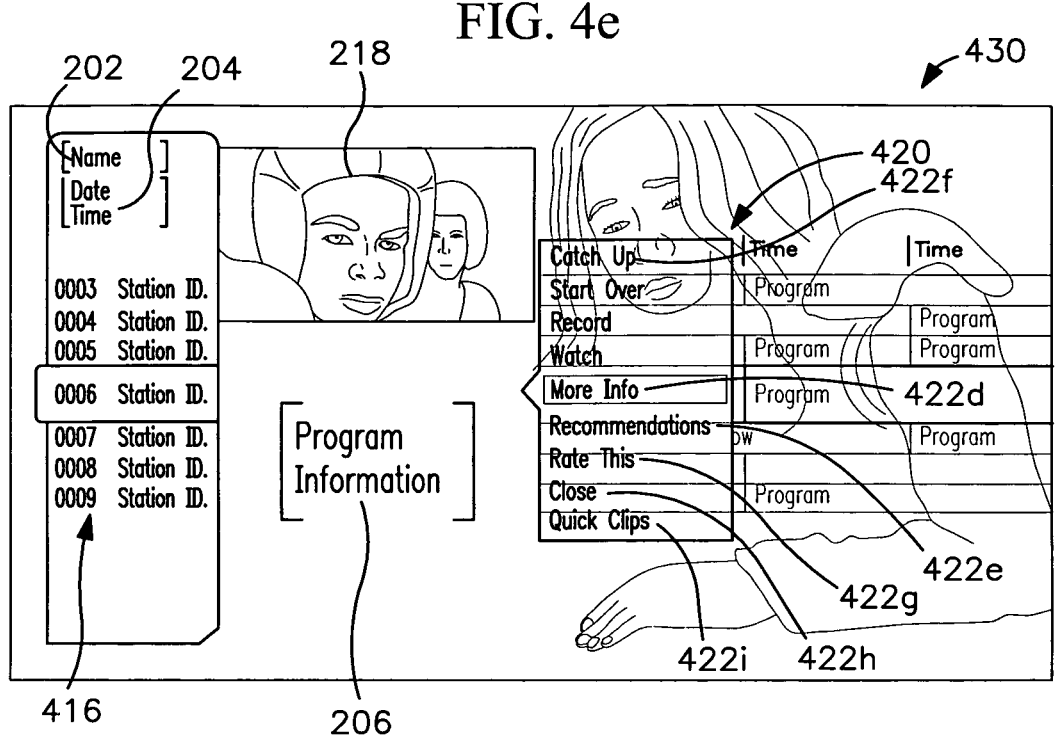
FIG. 4e is a graphical illustration of an exemplary display image of an additional information interface indicating information about a program associated with the EPG, as it would appear on a user's display device according to one embodiment of the invention.

For example, FIG. 4e illustrates an exemplary additional information interface 430, which is the interface to which a user is taken when he/she selects the "More Info" user action 422*d*. The exemplary additional information interface 430 of FIG. 4*e* displays more detailed program information 206, and an enlarged thumbnail image 218. It is appreciated that other information may also be displayed at the additional information interface 430 including, inter alia, the display of an estimated user rating to signify to a user whether (based on previously collected historical data) he/she would likely tend to enjoy or have interest in the content.

Referring again to FIG. 4*d*, the actions 422 which the user may initiate at the program options menu 420 include, inter alia, "Start Over" 422*a*, "Record" 422*b*, "Watch" 422*c*, "More Info" 422*d*, and "Recommendations" 422*e* in order to be taken to that user action 422 interface or display; these actions 422 are now described in greater detail.

Selection of the "Start Over" user action 422*a* takes the user to the beginning of the program; thus, the user will be directed to a display of the content.

The "Record" user action 422*b* takes the user to the recordation interface (not shown) which shows details of the recording, and confirms the user's intent to record the program.

When the user selects the "Watch" user action 422*c*, the user is taken to the program as it is being broadcast; this may be at the beginning, middle or end of the broadcast depending on what time the program began and what time the user selects the action 422*c*. Selection of the "Watch" user action 422*c* for a program that has not yet broadcast may take the user to the recordation interface discussed above, or to an interface adapted to allow the user to set a reminder to notify him at some point proximate the beginning of the broadcast.

In one embodiment, selecting the "Recommendations" user action 422*e* sends the user to a list of recommended programming generated by a recommendation engine (similar to that used by the VPMC above). Accordingly, the program will suggest content similar to the highlighted content. It is appreciated that the programs suggested by the "Recommendations" user action 422*e* may be filtered to include e.g., only broadcast programs and/or only programs which are set to begin or have already begun at the time the list is generated. In an alternative embodiment, the "Recommendations" user action 422*e* may give the priority playlist 212 and/or take the user to the VPMC interface 210. In yet another embodiment, the "Recommendations" user action 422*e* may be adapted to use the recommendation engine to compare the content highlighted to the user profile and generate a descriptor of how likely the user is to enjoy or have interest in the content. In other words, the user will be given an estimate of the likelihood the user will enjoy the content. The descriptor may be a certain number of icons (e.g., 3 stars, etc.), a number within a scale (such as a 4 out of 10), or may be textual in nature (such as a fuzzy logic scheme—"highly likely to enjoy", "likely to enjoy", "not likely to enjoy" etc.).

Additional user actions 422, sending users to alternative user action 422 interfaces or displays, are presented in the embodiment of FIG. 4*e*, which demonstrates an expanded program options menu 420. The additional actions 422 include, inter alia, "Catch Up" 422*f*, "Rate This" 422*g*, "Close" 422*h* and "Quick Clips" 422*i*; each of these actions 422 is now described in greater detail.

Selection of the "Catch Up" user action 422*f* sends the user to a catch-up interface (not shown), at this interface, the user will be able to read about and/or watch clips from previous episodes of the selected program. Clips from the current episode may also be displayed so as to "catch up" to the point in the episode he/she is joining at some time after it has begun. This feature can also be utilized for serialized content; e.g., to catch a user up on prior episodes of the same program series (e.g., what happened in the prior four episodes of "24").

When the user selects the "Rate This" user action 422*g*, the user is sent to a rating interface (not shown). At this interface, the user will be able to explicitly indicate whether this program (based on genre, actor, etc.) is one that the user likes or dislikes, and/or other subjective attributes. As will be discussed below, entry of information at this interface will assist a recommender in finding programming that is better suited to the user's profile and tastes.

Selecting the "Close" user action 422*h* automatically takes the user out of the present menu (context). Accordingly, in the illustrated embodiment, selecting "Close" will return the user to the EPG 410.

Finally, the "Quick Clips" user action 422*i*, when selected, allows customers to access short-form video content, including without limitation trailers and content produced for the Internet (e.g., YouTube™ videos, etc.). The Quick Clips function of the illustrated embodiment uses an IP-based transport and software such as that described in co-owned, U.S. Pat. No. 7,174,126 to McElhatten, et al. issued Feb. 6, 2007 and entitled "Technique for effectively accessing programming listing information in an entertainment delivery system" incorporated herein by reference in its entirety, to push short-form content created by the participating networks to a user's on-screen display. Online video content is provided from participating programmers within minutes of its original web posting. This is facilitated via a server package media gateway catcher which acquires, re-encodes and makes content available to users (e.g., by placing a link to the content on an on-screen menu). For example, according to one embodiment of the present invention, a user may select the Quick Clips feature and see a display of all available short-form content; the user may then select to view any one of the available content elements.

It is appreciated that the user actions 422 discussed above with respect to FIGS. 4*d*-4*e* are representative of only some of the multitude of user actions 422 which may be presented in the program options menu 420 and expanded program options menu 420; other actions 422 known in the television arts may be included as well including, inter alia, setting program reminders or alerts.

Day Viewer

Figure 4F:
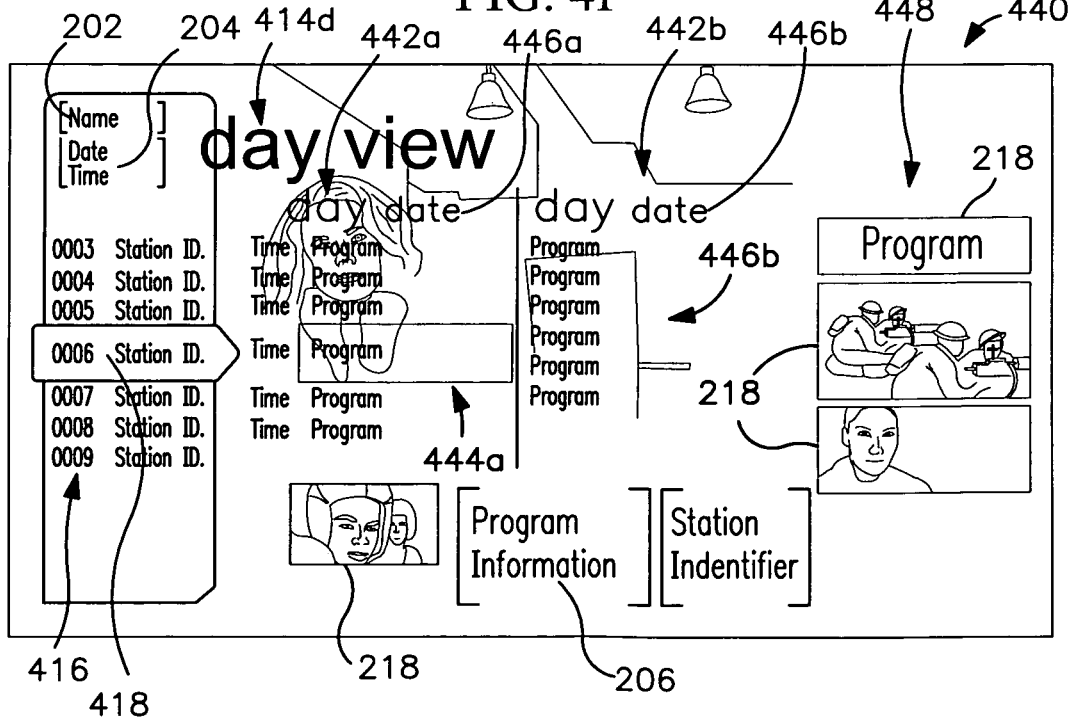
FIG. 4f is a graphical illustration of an exemplary display image of a day viewer interface associated with the EPG as it would appear on a user's display device according to one embodiment of the invention.

Referring to FIG. 4*f*, the EPG 410 of the exemplary embodiment further provides the user with the ability to view an entire day's schedule of programming, and/or programming for several days at once for at least one network, via a day viewer interface 440. As illustrated in FIG. 4*f*, the day viewer interface 440 displays the user profile 202, and date and time information 204. The interface 440 also provides a network description column 416 having the network identifier 404 and program channel number 418 highlighted to indicate for which network the schedule relates. The network 404 and program channel 418 highlighting indicator is similar, and may be moved in similar manner, to those described previously herein. The interface 440 displays a header 414*d* similar to the aforementioned EPG 410 headers 414*a*, 414*b*, 414*c* discussed previously with respect to FIG. 4*b*.

In the illustrated embodiment, the day viewer interface 440 gives a schedule 442*a* comprised of a list of content sorted by time 444*a* and having a date header 446*a* (e.g., "Tuesday 11/10"). This configuration enables a user to view an entire day's content for a particular channel. The exemplary day viewer interface 440 also shows a schedule 442*b* which is comprised of time sorted content list 444*b* and date header 446b (e.g., "Wednesday 11/11"). In the illustrated embodiment, the schedules 442a, 442b represent content for the highlighted program channel on two different days. However, it is appreciated that the second schedule 442b may comprise scheduling information for a second program channel for the same or a different day than the first schedule 442a.

The exemplary day viewer interface 440 also comprises a featured content thumbnail display 448. The content thumbnails 218 placed in the thumbnail display 448 may comprise for example: (i) content which the selected network has chosen to feature, (ii) content which the recommender (e.g., recommendation engine) suggests from the selected network, (iii) content advertisements or promotions from any network, or may optionally be replaced by a second network description column (not shown) having the network identifier and program channel number highlighted to indicate for which network the second schedule 442b relates.

Personal EPG

In another embodiment of the invention (illustrated in FIG. 4g), the program guide comprises a personalized EPG 450. Rather than being populated by past, current, and future-aired content for every program channel, the personalized EPG 450 can be populated only by recommended content (generated by the below-described recommendation engine) and/or user-selected content. As illustrated, program content meeting certain selection criteria (e.g., having a certain, pre-defined threshold of similarity or relation to the user profile) will be presented in an EPG-like interface for user navigation. As shown, various levels of shading and/or coloring or other visual mechanisms are used to indicate the various levels of similarity the given content has to the user's profile. For example, the darkest shaded content 452 may represent content which is most similar to the user profile, as the shading becomes lighter (as in 454, and 456), the relative similarity to the user profile decreases. Other color and/or shading indicators, as well as other visual or even audible indications (e.g., modulated or moving indications, different audible tones, etc.), may be used as well to convey the relative ranking or similarity of the displayed content elements.

It is noted that, in one embodiment, the recommendation engine may display the priority playlist 212 as if it too were a program channel on the timeline. According to this model, the EPG gives the user a distinct view of what program/content choices are available at any time along the selected timeline. This view can also be dynamically altered as user selections/deletions are received, programming passes the time of its broadcast, etc.

In the illustrated embodiment, the personalized EPG 450 also displays a personal viewing playlist 458 which the user may "fill in" with content that the user would like to be streamed on the VPMC. The user may insert the content via the exemplary UI by inserting the content within the timeline using a series of remote control keys such as arrows and "enter" key (or "dragging and dropping" if remotely accessing using a PC or other such device, as described subsequently herein). Alternatively, selection of the content from the personalized EPG 450 timeline above may result in the placement of the content on the personal timeline of the viewing playlist 458. Other selection mechanisms (e.g., other remote control buttons, textual commands, touch screen interfaces, etc.) may be used for these functions as well.

At various times on the timeline, there may be no adequate (e.g., similar or "logically proximate" enough) content to display in the personalized EPG, these instances are indicated by empty, or alternatively patterned blocks 460 on the EPG. It is noted that at these points in the timeline, "moveable" content may be inserted into the personalized EPG and/or the personal timeline. Moveable content comprises content which is not fixed in the time it may be displayed, for example, VOD content, previously recorded (i.e., DVR) content, content that is "start-over" capable in the selected timeframe, etc. Moveable content may be presented to a user as an option, similar to those of the program options menu 420 discussed above.

Figure 4G:
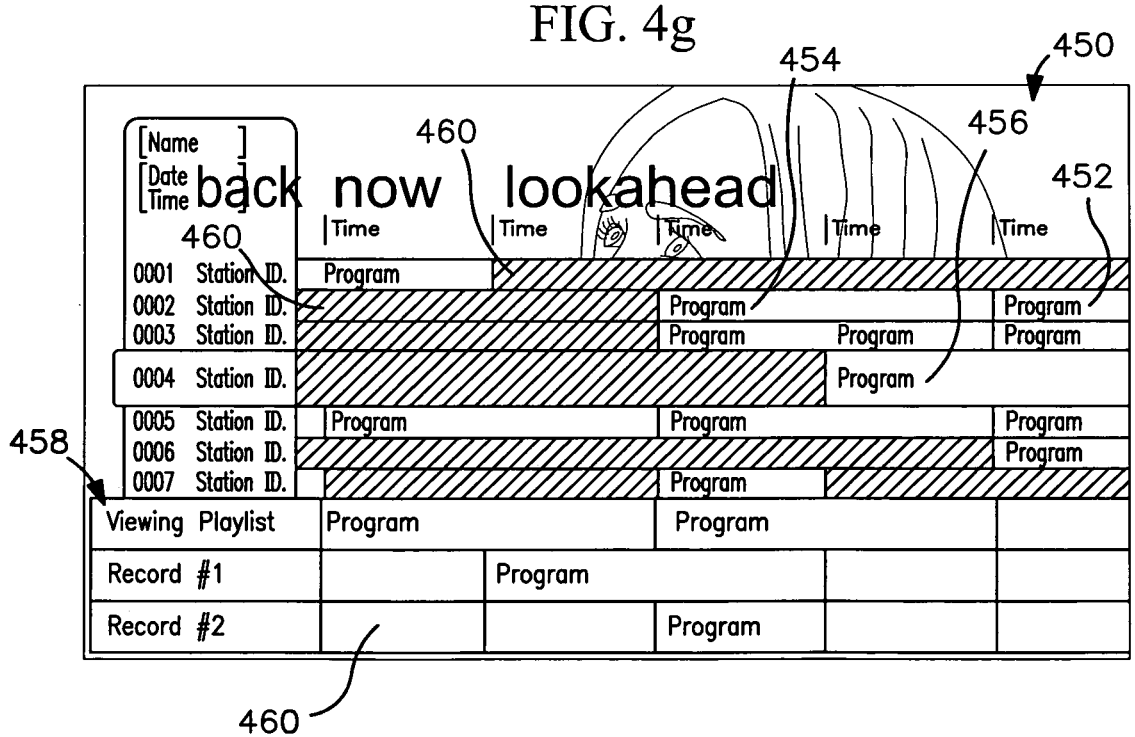
FIG. 4g is a graphical illustration of an exemplary display image of personalized EPG as it would appear on a user's display device according to one embodiment of the invention.

The embodiment of FIG. 4g also allows a user to place content which occurs simultaneously or overlaps in time into one or more recording caches for recording and subsequent viewing.

A further variant of this embodiment includes the ability of the user to view the personalized EPG 450 and/or personal timeline, as well as perform the abovementioned function via an Internet connection to an MSO-operated website (e.g., over a TCP/IP transport).

In an alternative embodiment, the EPG may be comprised of all content from each program channel as discussed above, but has some identifying feature for that content which is recommended; e.g., highlighting, appearing in a different color, shading, arrows, icons, etc.

Continuous Background Content

As illustrated in FIGS. 2a-2f, 3, and 4a-4g, the various menu, playlists, tools, tool panels, information, instructions, schedules, columns etc. discussed above with respect to the user interfaces 200, 210, 220, 230, 240, 250, 300, 400, 410, 430, 440, 450 (hereinafter collectively referred to as "user interfaces 470") are displayed as an overlay to the program stream. In other words, the user interfaces 470 of the present invention are adapted to be presented and navigated by the user over top of the program or content the user was viewing when accessing the interface 470. Accordingly, while the user navigates the interface 470, the audio and video feed of the program (or purchasable content trailer) viewed advantageously remains active and displayed fully in the screen. Unlike prior art systems, which require a user to navigate away from the audio and video feed being viewed or which minimize the video feed to a small portion of the screen when the user enters a navigable interface (for navigating program guide, DVR contents, purchasable content, etc.), the present invention enables the user to not miss a moment of the program in progress as the user surfs the interfaces) 470. In the exemplary embodiment, this simultaneous "viewability" of the content and menus is accomplished by: (i) placement of certain menu display elements at certain locations on the display screen (e.g., within peripheral areas), and (ii) the use of largely "transparent" menu elements which allow the user to see through these elements to view the underlying content.

In one variant, the degree of transparency is primarily coupled to the position on the screen; i.e., more peripheral areas can tolerate a greater opacity, whereas those closer to the center of the display (where most of the interesting "action" is presumed to be, since as a general rule camera images attempt to maintain the primary subject(s) at least somewhat centered), less opacity can be tolerated. Other schemes may be applied as well. Moreover, the client software (e.g., that operating on the CPE 106) can include a user management interface (not shown) which allows the user to set the various attributes of their menu and display functionality according to their own preferences (e.g., persistence or latency of the menus displayed, degree of opacity, brightness, contrast, placement on the display screen, etc.).

Profile Creation and Selection

Figure 5:
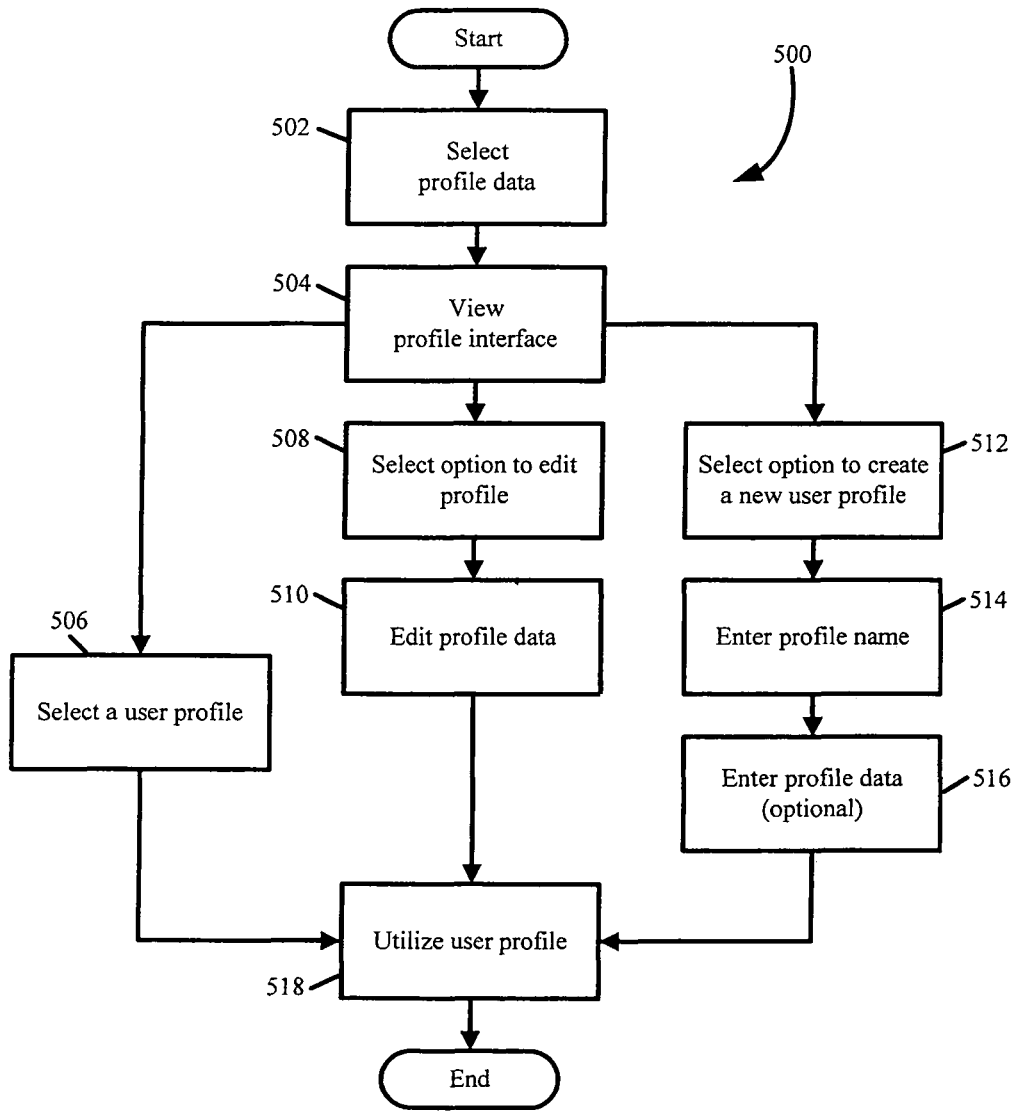
FIG. 5 is a logical flow diagram illustrating one embodiment of the method by which client software enables a user to manage user profiles on a user's system.

FIG. 5 illustrates one embodiment of the general method 500 by which the client software enables a user to manage user profiles on the user's system. As previously discussed, the user is often presented with user profile data 202 (see FIGS. 2a-2f, 3, and 4a-4f) at the various interfaces 470. At step 502 of the method 500, the user navigates within the interfaces 470 to indicate and select (at step 504) the user profile data 202; e.g., by pressing the appropriate buttons on the remote control. Upon selection of the user profile data 202, a user profile interface (step 506) will be displayed. At the user profile interface, the user is presented with a navigable list of the various user profiles associated with the user's system.

It is appreciated that in one embodiment, among the list of user profiles a user is presented with, one or more pre-programmed profiles having descriptive headings, including, for example "Family TV", "Kids", "Night Time Television", "Prime Time Viewer", "Reality TV", "Over 50", "Teens", etc. may be included. These "user" profiles are not necessarily representative of a particular user, but rather a category of user or genre of interest to potentially many different users in the same premises. These profiles may be generated using local data from the affected users at the premises, or alternatively may be generated by the MSO or third party programmer based on demographic or other data (e.g., a profile which people over 50 years of age would in general (on average) tend to enjoy.) Hence, the CPE 106 or other relevant network entity can "pre-load" profiles at installation or first use of the CPE 106, and these profiles can then be modified by the user (or automatically by way of the client software update process) so as to fine-tune them to the particular premises. For instance, the generic or template "Over 50" profile may not be very accurate for a particular household whose adults over age 50 tend to watch programs oriented to younger viewers.

In yet another alternative embodiment, each CPE 106 will automatically have a certain number of profiles established which are indicative of the time of day or date that programs are being viewed. For example the profiles may include: weekday mornings, weekday afternoons, weekday primetime, weekday late night, weekend morning, weekend afternoon, weekend evening, weekend late night, etc., given that most viewers will tend to watch certain types of programming at certain times of the day/week.

At the user profile interface, the user may select a user profile 506 (i.e., log in as themselves or a different user), edit existing user profiles 508, and/or create new user profiles 512. However, it is appreciated that in one embodiment, certain user profiles may have limited editing capabilities since they are generated based on criteria not specific or personal to any given user.

As previously noted, at step 506, the user may select of any one of the list of user profiles. Any interface 470 to which the user is subsequently directed will display, as user profile data 202, the profile selected at step 506.

To make changes to an existing profile (either a previously created profile or a pre-set profile), the user selects at step 508, the option to edit a profile. The client software then, at step 510, directs the user to a profile editing interface. At the editing interface, the user may navigate and change profile related data by designating content features or aspects the user does and does not prefer. For example, a user may indicate at the editing interface a preference for comedy programs, or for certain actors, or programming from a particular era (e.g., the 1970's, etc.). The user may also change personal information (e.g., demographic information) which is utilized to target content to preferences. This information may include, inter alia, gender, age, zip code, occupation, household income, marital status, hobbies, etc. Once the user has completed entering and/or editing the user preferences, the user may save the information, and exit the profile editing interface. Upon exiting, the playlist generator or recommender will use the edited profile (step 518) to generate recommendations, suggestions, playlists, etc.

To create a new profile, the user will select (at step 512) an option to create a new profile. In response, a new profile interface is displayed and the user will be prompted to enter a profile name (step 514). It is further appreciated that other methods of identifying a profile and recognizing a user may be implemented, such as an image, a password, or other identifier. Moreover, if the profile will be accessed or transmitted over the network, the user can be anonymously identified if desired via their CPE, and or the profile encrypted or hashed; see the discussion presented above regarding preserving subscriber anonymity.

At step 516, the user may optionally enter other profile data including, inter alia, designating preferences for particular content features or aspects, as well as entering personal information (such as gender, age, zip code, occupation, household income, marital status, hobbies, etc.). The user may then save the entered information, and exit the new profile interface. Then, per step 518, the playlist generator or recommender uses the new profile to generate recommendations, suggestions and playlists.

Recommendation Engine

Once a user profile has been established and/or when a user profile has been modified, an updated profile is utilized to generate playlists, recommendations, suggestions, etc. by a recommendation engine. The recommendation engine of the illustrated embodiment comprises client software such as, for example, that described in the aforementioned co-owned, U.S. patent application Ser. No. 12/414,576 filed contemporaneously herewith on Mar. 30, 2009 and entitled "Recommendation Engine Apparatus and Methods", which issued as U.S. Pat. No. 9,215,423 on Dec. 15, 2015 and is incorporated herein by reference in its entirety. Other types and configurations of apparatus may be used to generate recommendations, however, including even via human-based selection (e.g., a network operator or third party selecting recommendations based on their knowledge of a particular demographic, historical viewing patterns, etc.)

In the exemplary embodiment, the recommendation engine and feedback mechanisms comprise software located within a storage device (e.g., program memory or HDD) of the client device 106, and adapted to run on a digital processor 714 (see FIG. 7b below). Alternatively, a headend entity such as a personal media server 720 (see FIG. 7a below) may be used as the platform for this software. So-called distributed applications (DAs) of the type well known in the computer application arts may be used as well, such as where a client portion and server portion of an application which communicate with one another are utilized on heterogeneous platforms (e.g., on the client device 106 and a network server disposed at the headend 150, a distribution hub, or even a third party location, respectively).

The recommendation engine can also be integrated with other extant software on the CPE or network device if desired, such as with a "navigator", VOD Session Resource Manager (SRM), BSA switching process, etc.

Figure 6:
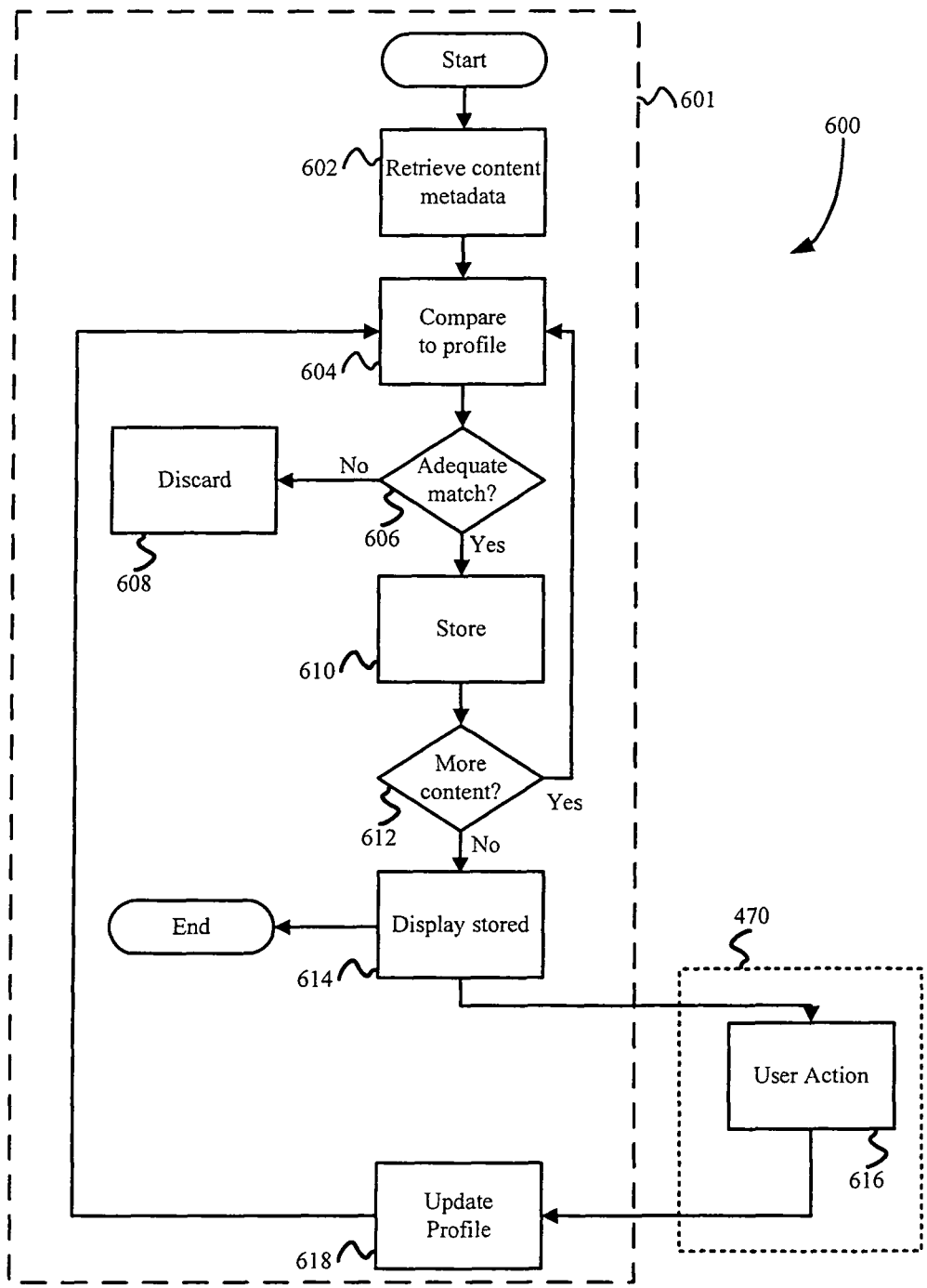
FIG. 6 is a logical flow diagram illustrating one embodiment of the method by which a recommendation engine compiles a playlist, recommendations and suggestions, etc., according to the invention.

FIG. 6 illustrates one exemplary embodiment of the method 600 by which the recommendation engine 601 compiles a playlist, recommendations, and suggestions, etc. As shown, at step 602, the recommendation engine 601 first retrieves metadata related to the pieces of content from the various content sources described above. Generally speaking, "metadata" comprises extra data not typically found in typical primary content (or at least not visible to the users of the network), such as that rendered in an XML or other such format. For each component of primary content (e.g., video/audio) or other content available from the sources, one or more metadata files are associated that specify the relevant search terms or primitives for that content. This metadata can be provided with the content from its source or provider (e.g., a network studio or station or the like), or alternatively added by the MSO. Alternatively, portions of the metadata can be added by multiple entities, and/or editing of another entity's metadata performed. Various permutations and mechanisms for generating, adding and editing metadata will be recognized by those of ordinary skill, and hence are not described in greater detail herein.

The metadata may be transmitted with the content either as part thereof or as a separate file, or alternatively may be obtained by the engine via another transport (e.g., from the same source via a different network interface), from an MSO repository (e.g., database or library), or from another source such as a third party website or server. Depending on the location of the recommendation engine 601, the CPE client software can also be configured to query a headend or other network process to generate a playlist for a given user profile beforehand, so as to obviate the transmission of any content (downstream) until it is requested, thereby conserving resources and bandwidth.

Per step 604, the recommendation engine 601 then compares one or more aspects of the metadata associated with an individual piece of content to one or more attributes of a user profile; if the recommendation engine 601 determines (at step 606) that the content is not an adequate match (based on established criteria, such as by the number and weight of matches within the various aspect of the content examined), then the content will not be selected (or discarded) per step 608.

However, if an adequate match is found, then per step 610, data regarding the content will be stored. The PID (Program ID), access code, etc. are stored by the recommendation engine 601 and linked to the content title as presented in a playlist. By this mechanism, the client software of a user's CPE 106 will be able to locate and retrieve the content selected for display.

Next, at step 612, the recommendation engine 601 determines whether there are any pieces of content which have not yet been analyzed. If there is remaining content, the recommendation engine 601 will begin again at step 604. If not, the recommendation engine 601 will prioritize the content that was selected for the playlist, and either display the stored content in the form of a playlist, etc. (step 614) or alternatively at least temporarily cease operation. As noted previously, the prioritization performed by the exemplary recommendation engine takes into account the matching discussed above, as well as other factors including the duration of availability of the content, location of the content, etc.

Per step 614, the stored data regarding content is displayed to the user in the form of the VPMC playlist, a recommendations list, a suggestions list, or other appropriate textual or graphical presentation to the user at a suitable interface 470. Then, at step 616, the user takes some action at the interface 470, which provides the recommendation engine 601 with either data (e.g., positive or negative feedback (see discussion of feedback mechanisms below), additional data to be stored such as preferences, etc.). At step 618, the data collected from the user action is used to update the user profile as applicable. Then, the updated profile is used at step 604 for comparison to the retrieved metadata and subsequent generation of an updated list of recommended content.

Input and Feedback Mechanisms

In one embodiment, the above-referenced content metadata is compared to data the engine has "learned" from the user via the client software (e.g., software running on the subscriber's CPE 106). The "learned data" may be derived from explicit and implicit user actions; i.e., may be affirmatively submitted such as via a user entering data or selecting answers to a questionnaire, or alternatively may be gleaned or extrapolated passively from analyzing user actions (or lack of actions).

One example of explicit user action comprises feedback relating to a watched content element. Thus, after a program ends, during a commercial break, or at the first instance of the user navigating away from the content, the user may be presented with an interface (not shown) wherein the user provides explicit feedback, such as by instructing the recommendation engine 601 (e.g., "Find more like this", "Don't recommend again ever", "Don't recommend for 6 months", "Recommend again", etc.), and/or wherein the user rates the content. Content may be rated by using, inter alia, stars, "thumbs up", a numbering system (e.g., 7 out of 10), a qualitative or fuzzy logic-based system ("poor", "fair", "good"), etc.

A user may also explicitly direct the software towards and away from certain content via the aforementioned profile editing interface. As noted above, the user selects the appropriate user profile, and is then prompted to modify and add information which allows the software to better provide targeted content. For example, the editing interface may allow the user to enter which channels the user likes and dislikes, which genres the user likes and dislikes, and so forth. A user may also be prompted to enter specific favorites, including, inter alia, favorite actors, favorite shows, favorite periods in time (e.g., then 1970's, etc.), favorite themes (Christmas, Halloween, etc.).

Implicit user actions are derived from what users do with content; some user actions may be positive, while others negative. For example viewing content to completion will be considered a positive action, while ending viewing of content will be considered a negative action, Each of the various actions a user may take will also be weighted such that certain actions more indicative of preference effect the user profile learned data more than others which are less likely to indicate preference.

The implicitly and explicitly learned data is dynamically collected and utilized to update a user profile such that immediately after a user action has occurred the recommendation engine 601 generates an updated playlist, recommendations, suggestions, etc. which are more tailored to the user's profile.

It is appreciated that the recommendation engine 601 of the present invention may also be configured to utilize two or more profiles, or a composite profile, as a source for generating playlists, recommendations, etc. For example, it may take into a count a user's activities during different parts of both weekdays and weekends.

Note that the aforementioned edits can be permanent, or on a limited (even one-time) basis. Using the "save" functionality previously described, a user can make permanent changes to a selected profile. Alternatively, however, the user may not wish to modify a certain profile since e.g., they are only using it vicariously or temporarily, say for an evening, a weekend, etc. Accordingly, the changes and additions to a profile can in one embodiment be made to have an "expiration date" such that the profile will revert back to its original form after expiry of a given amount of time, upon occurrence of an event (e.g., when the CPE 106 is powered down next), etc. This approach advantageously helps prevent a proliferation of profiles due to intermittent or temporary use by others.

Moreover, as previously noted, access to a profile for purposes of editing or updating can be purposely limited or restricted, so as to prevent changes or corruption thereof. As part of this scheme, only certain types of data may be edited/updated as well.

Profile and Playlist Utilization

As discussed previously various aspects of each piece of content from the various available content sources are compared (using e.g., the associated metadata for that content) to the user profile as updated by "learned data". Content meeting one or more prescribed criteria; e.g., showing a threshold level of similar aspects to those of the user profile, are ranked more highly in the priority list (which is generated by the recommendation engine 601). However, it is also appreciated that the recommendation engine 601 may take into account other attributes of the content including, inter alia, duration of availability, source location, any latency in obtaining the content, copyright or other intellectual property considerations (e.g., "copy once" or DRM protection), etc.

Business considerations may also factored into the selection of content and population of the playlist (and the priority of content therein). For example, where two content elements are effectively equal in relevance or rating for a given user profile ("don't care"), profitability or revenue information associated with the two choices can be evaluated to determine which selection is likely to produce more revenue or profit for the MSO or a third party (e.g., advertiser). Similarly, acquisition costs (e.g., RTA) for the various options may also be considered. Such "business rules" can also be applied such as to outweigh or overturn recommendations by the engine; e.g., such as where the engine picks one piece of content over another based on matching metadata attributes to the user profile, yet the profitability considerations associated with the less-optimal content element cause it to be selected or prioritized over the more optimal match.

In another embodiment, the client software further comprises a "playlist manager" process. The playlist manager module stores information regarding the source of each piece of content on the playlist. Thus, the playlist manager manages the location of where the content may be found, and keeps track of the appropriate action necessary to deliver the content to the user; i.e., maintains information regarding the asset ID, source ID, or other forms of identification that the underlying operating system middleware requires for tuning. When a user tunes to the VPMC the playlist manager immediately directs the CPE 106 to pull the appropriate content from the appropriate location for display. If viewing of the first priority content is terminated, the playlist manager informs the CPE 106 of where and how to obtain the next content scheduled in the playlist (this can also be performed in a "look-ahead" or anticipatory fashion so that the manager is not left short at any given time when the user terminates a given content element). The playlist manager also assists the CPE 106 in acquiring content which the user selects by manually navigating a playlist.

It will be recognized by those of ordinary skill that myriad different device and software architectures may be used consistent with abovementioned functions of the present invention, the foregoing description being merely exemplary.

Network Server Embodiment

Figure 7A:
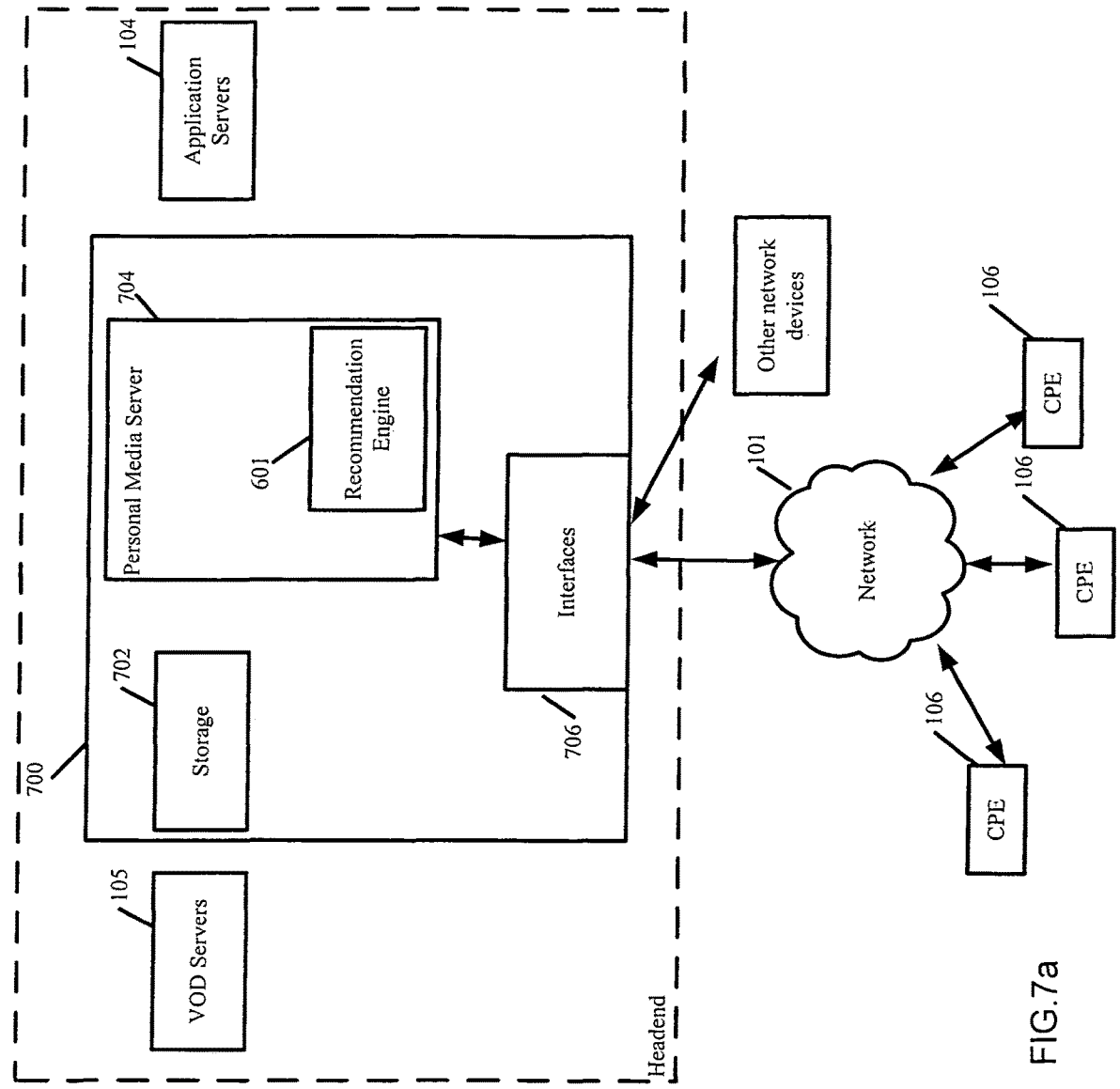
FIG. 7a is a block diagram illustrating an exemplary embodiment of a customer premises device adapted to provide a personal media channel according to the invention.

Referring now to FIG. 7a, an exemplary personal media server 700 is shown disposed at the network headend 150 as a separate entity (similar to the VOD servers 105 and application servers 104 co-located therewith). It is also noted that, in an alternative embodiment, the personal media server 700 may be present at a non-headend network entity such as a switching or distribution hub, or even as part of a third-party server in communication with the network via a LAN/MAN/WAN/broadband interface.

The personal media server 700 shown in FIG. 7a comprises storage device(s) 702, a digital processor(s) 704 and a plurality of interfaces 706 for connection to the network 101 and thereby to the plurality of CPE 106 connected thereto. The interfaces also permit use of the personal media server 700 with other network apparatus such as LANs, routers and other packet network devices, network management and provisioning systems, local PCs, etc. Utilization of the personal media server 700 with a PC or other entity is described below.

As illustrated in FIG. 7a, the personal media server 700 flier comprises a recommendation engine 601 application of the type previously discussed herein running on its digital processor(s).

The storage device 702 of the exemplary illustrated personal media server 700 is adapted to store a plurality of user profiles associated with individual ones of the plurality of CPE 106 to which the personal media server 720 is connected, via the network 101. A is approach also contemplates the case where a given premises or subscriber account includes a plurality of different user profiles, such as for different family members, etc.

It is appreciated that any number of CPE 106 may utilize the same personal media server 700, and that several personal media server 700 may be present at the headend or other location within the network to serve all of the CPE 106 logically connected thereto.

Other components which may be utilized within the server device 700 include amplifiers, board level electronic components, as well as media processors and other specialized SoC or ASIC devices. Support for various processing layers and protocols (e.g., TCP/IP, 802.3, DHCP, SNMP, H.323/RTP/RTCP, VoIP, SD, LSCP, MPEG, etc.) may also be provided as required. Where the content server is also acting in a local network capacity (e.g., as a VOD or application server), an appropriate application is also disposed to run on the server module to provide a functional interface for e.g., VOD session requests received from the client devices 106 or other interposed entities. These additional components and functionalities are well known to those of ordinary skill in the cable and embedded system fields, and accordingly not described further herein.

The server device 700 may take any number of physical forms, comprising for example one of a plurality of discrete modules or cards within a larger network headend or edge device of the type well known in the art. The server 700 may also comprise firmware, either alone or in combination with other hardware/software components such as those previously described (e.g., disposed in the aforementioned edge device). Alternatively, the server module 700 may even include its own RF front end (e.g., modulators, encryptors, etc.) or optical interface so as to interface directly with various portions of the HFC network 101 if desired. Numerous other configurations may be used. The server device 700 may also be integrated with other types of components (such as satellite transceivers, encoders/decoders, etc.) and form factors if desired.

It can also be appreciated that the personals server functionality of the present invention may be practiced using any configuration or combination of hardware, firmware, or software, and may be disposed within one or any number of different physical or logical entities. For example, any required conditioning of the content before delivery (such as the inclusion of watermarking or other data, encryption, generation of encryption key pairs and/or challenges, and so forth) may take the form of one or more computer programs running on a single device disposed within the network, such as at a headend, node, or hub.

As yet another example, portions of the content distribution functionality may be rendered as a dedicated or application specific IC (ASIC) or DSP having code running thereon. For example, a security processor of the type well known in the art can be used to implement encryption algorithms on the delivered content, and/or to perform key pair generation and the like. Myriad different configurations for practicing the invention will be recognized by those of ordinary skill in the network arts provided the present disclosure.

The server operation can also be masked or controlled by a "business rules" engine" or other logical wrapper or layer as described subsequently herein.

In another embodiment (not shown), the recommendation engine 601 of the present invention is run on the processor of another headend entity, including, inter alia, a VOD server 105, an application server 104, or BSA hub server (FIG. 1c), and utilizes storage associated therewith.

Client Device

Figure 7B:
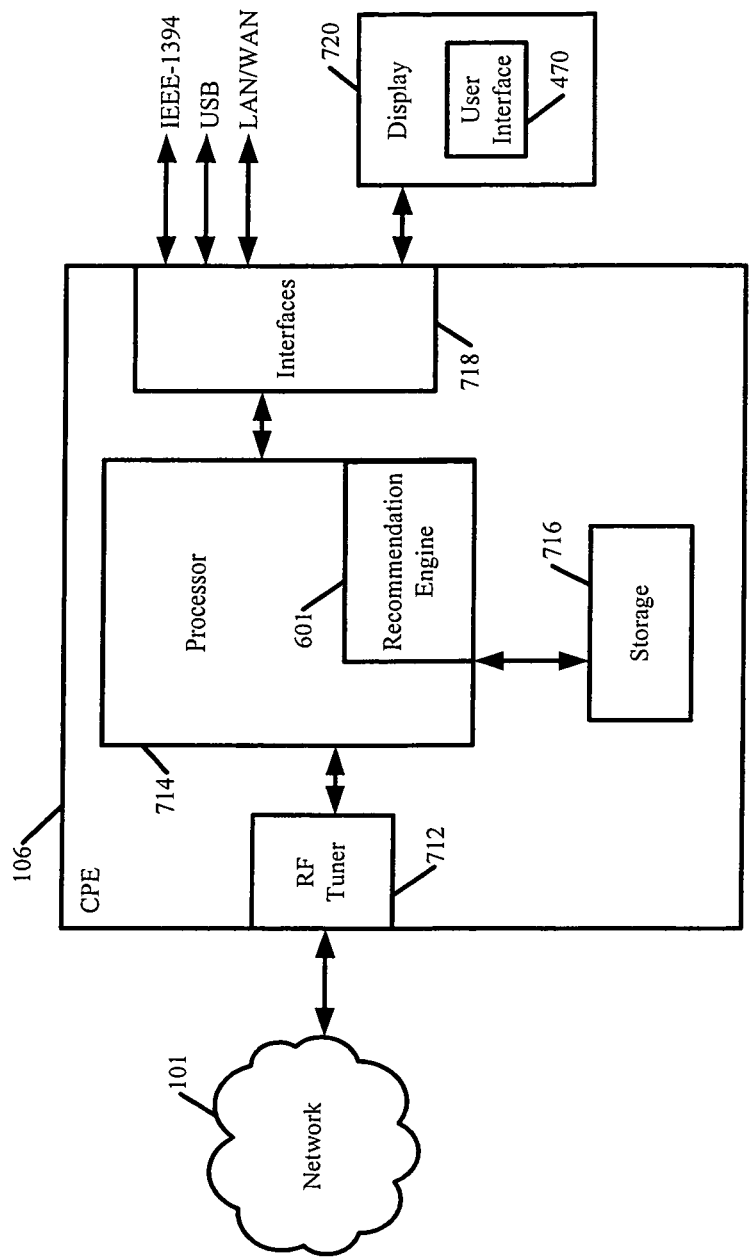
FIG. 7b is a block diagram illustrating an exemplary embodiment of a headend entity adapted to provide a personal media channel according to the invention.

Referring now to FIG. 7b, one exemplary embodiment of a CPE 106 having the user interface and VPMC functionality previously described herein is described. The improved CPE 106 of the present invention differs from legacy CPE 106 in that, inter alia, the CPE 106 of the current invention comprises a client software process (and optionally recommendation engine 601 as previously described—alternatively, the CPE 106 can rely on the recommendation engine 601 running on the aforementioned personal media server 700 as shown in FIG. 7a).

As shown in the simplified diagram of FIG. 7b, the CPE 106 generally comprises a computerized system (e.g., embedded DSTB, converged premises device, etc.) having an RF tuner and front-end 712 for interface with the delivery network 101, digital processor(s) 714, a storage device 716, and a plurality of signal interfaces 718 (e.g., video/audio interfaces, IEEE-1394 "FireWire", USB, serial/parallel ports, wireless air interfaces, etc.) for interfacing with other end-user apparatus such as televisions, personal electronics, computers, WiFi or other network hubs/routers, etc. Among the plurality of signal interfaces 718 is an interface to a user display device 720 on which the graphical user interfaces 470 discussed above are displayed to a user.

Other components which may be utilized within the device (deleted from FIG. 7b for simplicity) include various processing layers (e.g., DOCSIS MAC or DAVIC OOB channel MPEG, etc.) as well as media processors and other specialized SoC or ASIC devices. A separate cable modem (e.g., DOCSIS) tuner may also be included for receiving downstream cable modem signals over the coaxial cable. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein. Alternatively, the CPE 106 may comprise a "head-less" configuration, wherein the only user interaction with the device occurs over a network connection; e.g., in a PVR-like fashion. It is also appreciated that although only one tuner 712 is depicted, other embodiments of the present invention may comprise more than one tuner 712 or a wideband or ultra-wideband tuner consistent with the present invention.

The digital processor(s) 714 of the CPE 106 of FIG. 7b is also adapted include a recommendation engine 601. Placement of the recommendation engine 601 on the individual CPE obviates much of the architecture associated with the network-based variant of FIG. 7a; however, it also necessitates higher-bandwidth communication between the CPE 106 and a headend process, the latter providing the engine 601 on the CPE with metadata so as to enable it to generate recommendations based on e.g., the aforementioned matching process. Hence, one embodiment of the invention contemplates the use of a recommendation engine 601 in the form of a DA; i.e., having client and server portions, the latter communicating with the former to effect analysis and comparison of the user profile with the content metadata.

In another embodiment, the recommendation engine 601 of the CPE 106 may contain programs which allow interactivity with other client devices 106. For example, a management entity (not shown) present on the CPE 106 may be adapted to communicate and interact with that of another CPE 106. Examples of such programs include UPnP application, a program guide, and so on. The CPE may also operate in a "peer-to-peer" (P2P) type of architecture, wherein processing assets (e.g., pre-processed recommendations, profiles, etc.) can be shared between two or more CPE at the edge of the network, thereby obviating significant involvement by the core (and attendant bandwidth usage). See, e.g., co-owned and co-pending U.S. patent application Ser. No. 11/726,095 entitled "Method and Apparatus for Content Delivery and Replacement In a Network" filed Mar. 20, 2007 and incorporated herein by reference in its entirety, for one exemplary approach to CPE P2P interactions and management that may be used consistent with the present invention.

Similarly, the recommendation engine 601 and CPE 106 may be configured such that a user's profile is stored locally (i.e., on the CPE or a proxy storage location), or alternatively at a network location (e.g., on the personal server 700). Depending which approach is used, a user can access the user's profile and associated playlists directly (locally), or over the network.

The CPE 106 bearing the client software (and optionally recommendation engine components) 601) may also comprise a multi-function or converged premises device, such as that described in co-owned U.S. patent application Ser. No. 11/378,129 filed Mar. 16, 2006 and issued as U.S. Pat. No. 8,347,341 on Jan. 1, 2013, previously incorporated herein. This disclosure describes a remotely manageable premises device that, inter alia, acts as a centralized client networking platform providing gateway services such as network management as well as traditional content and high-speed data delivery functions. The device also acts as the shared internet (e.g., Internet) connection for all devices in the premises via a cable modem or other such interface; metadata associated with personal and DVR content such as video, music and photos throughout the premises via may also be utilized as described above to incorporate that content into a playlist. Telephony services utilizing e.g., embedded multimedia terminal adapter (eMTA) and/or WiFi architectures may also be provided via the converged device 106; these services can make use of the network operator's indigenous VoIP or comparable telephony capability if desired, thereby providing an even more unified service environment and a mechanism for the various devices to communicate and interact with one another.

In another embodiment, a wired home network utilizing existing coaxial cable in the premises is created, by using e.g., an Ethernet-to-coaxial bridge technology based on the MoCA specification.

According to these alternate converged and networked CPE embodiments, existing devices and DVRs (i.e., those not having access to the recommendation engine 601) are permitted to connect and share content with a CPE 106. Hence, in one variant, the CPE 106 and its recommendation engine can "see" content disposed on the ancillary premises devices (e.g., DVR), including descriptive information (title, runtime, rating, encoding format, etc.) and even metadata associated with the content if stored there.

Remote CPE, Playlist and DVR Control

In yet another embodiment, the CPE 106 is advantageously accessible via any remote device with internetworking (e.g., Internet) capability. The recommendation engine 601 of the CPE 106b is adapted accordingly and thereby allows content and profiles associated therewith to be accessed by a user from outside the premises. Profiles present on the remote (e.g., mobile) device can also transmitted to the recommendation engine 601 for comparison to metadata (which in one configuration requires the transmission of the received profile data upstream to the server 700 or other network process). Exemplary devices including laptop computers, personal computers, cellular telephones, PDA and other hand-held electronic equipment can be used to remotely access the CPE and recommendation engine.

Moreover, in the embodiment where the recommendation engine 601 is disposed on a network entity or process (see e.g., FIG. 7a), the user's remote device can either: (i) cause the CPE to transmit a selected profile upstream to the engine 601 (e.g., to the server 700), or (ii) transmit a user profile contained on the remote device to the recommendation engine/server 700, using the subscriber's CPE 106 as a proxy for the transfer. Information returned by the engine 601 (i.e., recommendations, etc.) can then be transmitted back to the proxy CPE 106, and then distributed to the remote device via e.g., an Internet connection.

In yet another embodiment, a user may access his user profile and/or the recommended content via the Internet. According to this embodiment, a user logs into an MSO-operated website, and by providing relevant information, be linked to his CPE 106 and its associated recommendation engine 601 (or that of the network server 700 responsible for that CPE).

Figure 8A:
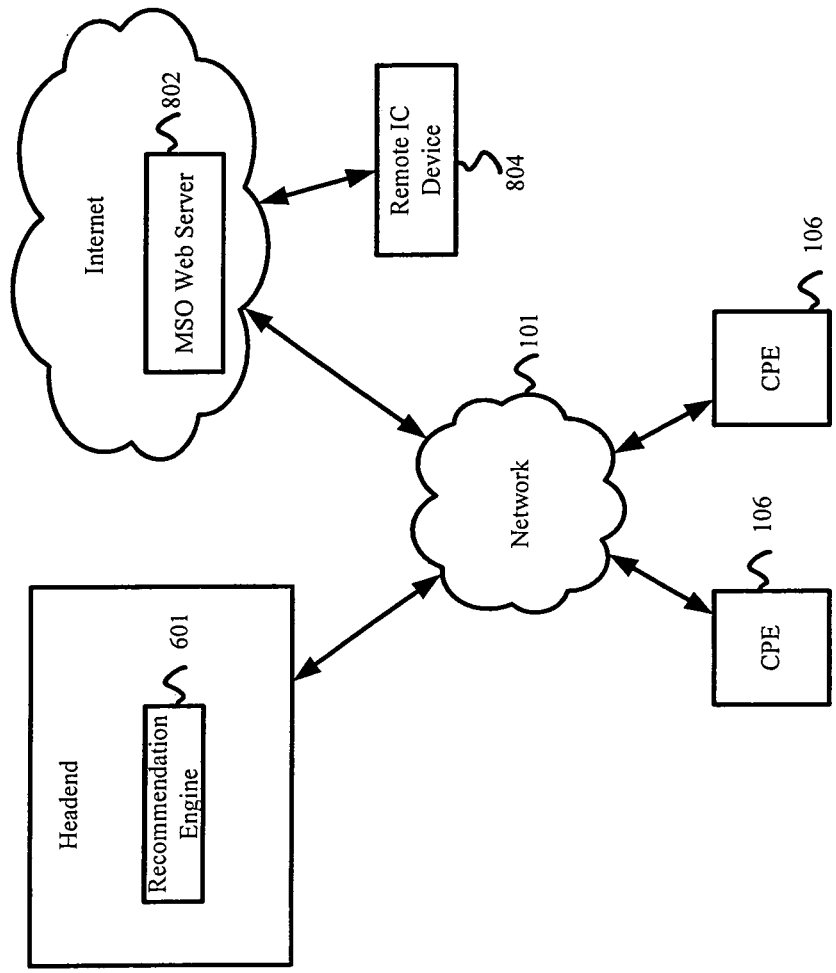
FIG. 8a is a functional block diagram of an exemplary MSO web server in data communication with an exemplary headend recommendation engine according to the present invention.

As illustrated in FIG. 8a, in one variant, the MSO-operated website is run from an MSO web server 802. The web server 802 is in data communication with the network 101 to which various CPE 106 and a headend recommendation engine 601 are in communication. According to this variant, the recommendation engine 601 periodically or when requested publishes a list of recommended content for one or more designated profiles to the Internet web site. The list is then made accessible via the web server 802 to remote Internet-capable (IC) devices 804. Exemplary IC devices 804 include, inter alia, personal computers, laptop computers, internet-ready handheld devices, telephones, PDAs, etc. When the user logs into the website, they can access the recommendation list, and even the content itself if the web server is so configured.

Figure 8B:
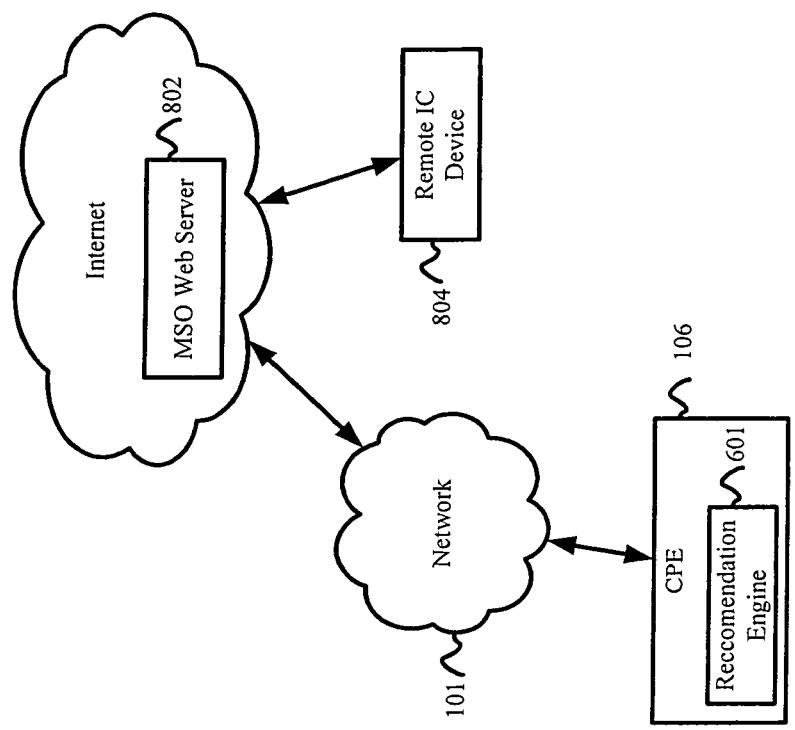
FIG. 8b is a block diagram of an MSO web server in data communication with a client device recommendation engine according to one embodiment of the invention.

Alternatively, illustrated in FIG. 8b, the recommendation engine 601 may be located within a user's CPE 106 as discussed above with respect to FIG. 7b.

Figure 8C:
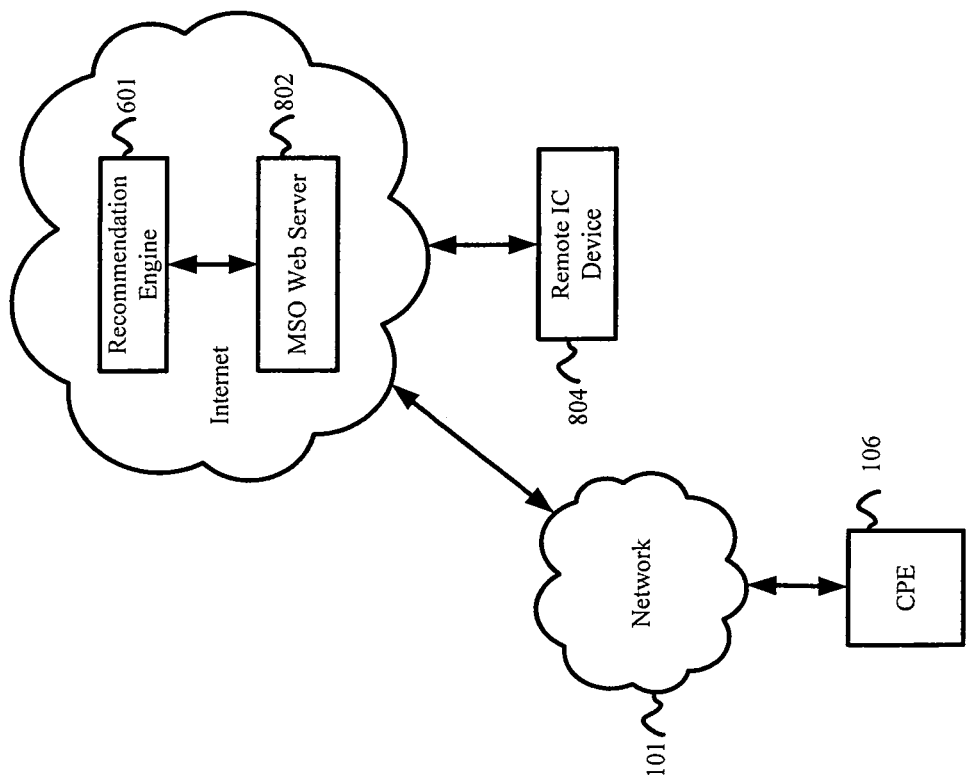
FIG. 8c is a block diagram of an exemplary MSO web server in data communication with a web-based recommendation engine according to another embodiment of the invention.

FIG. 8c illustrates yet another configuration, wherein a recommendation engine 601 similar to that described above is placed on an Internet or other LAN/MAN/WAN website and is in data communication with (and/or co-located on) the MSO web server 802. Accordingly, the user's CPE 106 publishes only the user profiles associated therewith. The particular log-in information supplied to the website triggers applications running on the web server 802 to send the correct user profile information to the remote IC device 804.

The recommendation engine 601 may be linked to an MSO-operated website in such a way so as to provide the user with the ability to schedule programming to a personalized playlist for recording (i.e., recommend and select for recording programs which are recommended and broadcast while the user is not physically at his CPE 106). The website may also offer users the ability to remove recorded programs from the user's DVR so as to open up space for the recording of other programs.

It is further noted that at an MSO-operated website, a user may access a future playlist. In other words, the user is able to view a playlist the recommendation engine 601 will generate at a particular date/time in the future. For example, a user can access the website at 12:00 pm and run a query to find out what programming the recommendation engine 601 will recommend at 8:30 pm, 9:00 pm, 9:30 pm, and 10:00 pm that night. These future playlists will be generated and displayed to the user, who may then create a modified playlist of the content from the future playlists he/she would like to view at those times.

Related and/or Targeted Secondary Content Delivery

In another embodiment, the present invention may advantageously utilize various methods for the delivery and/or selection of targeted or related "secondary" content occurring simultaneously with the delivery of a playlist of recommended content.

One such method for the delivery of contextually-related "secondary" content (e.g., advertising messages, useful informational links, etc.) in association with the primary content selected by the user and/or by the recommendation engine 601 is described in co-owned U.S. patent application Ser. No. 11/198,620, filed Aug. 4, 2005 and entitled "Method and Apparatus for Context-Specific Content Delivery", which issued as U.S. Pat. No. 9,286,388 on Mar. 15, 2016 and is incorporated herein by reference in its entirety. Specifically, secondary content comprising advertising is selected at least in part based on metadata associated with the primary content. The metadata is provided by, e.g., the content originator or network operator, and is sent to a third party network entity (e.g., advertising server) which returns contextually specific advertising matching the search terms. In one variant, the search term is simply one or more keywords drawn from the metadata and used as an input to a search engine (such as the aforementioned recommendation engine 601). In another variant, more sophisticated analysis of the metadata is performed so as to ostensibly reduce the number of irrelevant or marginally relevant "hits" returned by the search engine/advertising server.

Another method enhanced of advertising selection and delivery advantageously coupled with the aforementioned delivery of targeted primary content is described in co-owned U.S. patent application Ser. No. 12/070,559, filed Feb. 19, 2008 and entitled "Method and Apparatus for Enhanced Advertising and Promotional Delivery in a Network", which issued as U.S. Pat. No. 9,503,691 on Nov. 22, 2016 and is incorporated herein by reference in its entirety. Specifically, that application discusses a substantially user-friendly mechanism for viewing content and advertisements which both eliminates the guess-work and impression associated with skipping commercials via manual fast-forwarding through recorded content, and presents a viewer with options regarding the type and content of advertisements to view. Advertisers and network operators are also provided with more avenues for reaching subscribers with advertising or promotional content.

In one embodiment, the aforementioned network comprises a cable television network, and the methods and apparatus enable a viewer to individually preview and select the advertisements that they will view during real-time broadcast programming, as well as during "trick mode" operation in recorded program settings. In another embodiment, an advertising controller (AC) is utilized to select choices on the subscriber's advertising "playlist" based on, e.g., correlation between the advertising metadata and metadata associated with the programming content being viewed or recorded by the subscriber. This may likewise be accomplished by the recommendation engine 601 in manner which utilizes a user profile to create an advertising playlist similar to the manner discussed above. In another variant, advertising or commercial skipping may be substantially frustrated by presenting a viewer with several viewing options of potential interest, and/or imposing one or more minimum viewing policies.

Advanced Content Editor Functions

In yet another embodiment of the present invention, the metadata collected from the various content collected may include metadata related to various "flagged" points within the program. The "flagging" may be incorporated by the MSO, or by the content source prior to distribution; or alternatively, the user may insert flagging, as discussed in co-owned U.S. patent application Ser. No. 11/811,953 filed Jun. 11, 2007 and entitled "Methods and Apparatus for Providing Virtual Content Over a Network", which issued as U.S. Pat. No. 9,024,762 on Sep. 20, 2011 is incorporated herein by reference in its entirety. This application describes providing the user/owner with the capability to personalize content. As described therein, the personalization includes, inter alia, annotating or flagging particular portions of interest of their content for other family members.

Accordingly, one embodiment of the invention provides the user with a downloadable software environment (e.g., application suite or tool) for user content editing and annotation. This software permits the user to make such annotations/personalizations to their content, which is stored in a file that is transmitted up to the headend, BSA hub site, etc. as appropriate. This file can be thought of as a layer atop the encoded content which functions much like metadata; it instructs the headend, BSA, etc. server to perform certain additional functions such as skipping to different frame or SI references within the content, inserting overlays or other graphical and/or audible mechanisms (e.g., pop-up windows), etc. when that particular user plays back their purchased content. This user editing environment is particularly well adapted to VOD or "PVR" delivery models, wherein the user can for example pause the content playback; call up the editing environment to add an annotation and "tag" it to that reference point in the content (wherein the editing environment transmits this annotation and reference to the headend server process via, e.g., OOB message, to be used on subsequent playbacks), and then un-pause the playback and continue watching. Any number of user interface mechanisms well known to those of ordinary skill can be used for enabling the user's entry of annotations, personalizations, etc. including without limitation on-screen displays (OSDs), browsers, interactive remote controls, keyboards, mice, joysticks, touch-screens, speech recognition algorithms, and so forth. It is also noted, that the present invention may be used in conjunction with content stored at a user's CPE (e.g., DVR) as well.

Broadcast modes may also be annotated or personalized, such as by marking locations within the content during viewing (e.g., using a remote control function that initiates a marking reference function that can store the mark points, such as for example by an SI reference or artifact within the content), and utilize these points later within the aforementioned software environment to add the user's personalizations. A screen capture or "snapshot" function can also be employed, such as where the screen display or contents of VRAM, frame buffer, etc. can be captured at each marking point, and saved along with the markings, so as to refresh the user's recollection when conducting annotation at a later time. These references and capture data can be saved locally (e.g., on the user's CPE or PC), or at the headend 150 or hub-site server.

Alternatively, the software environment can associate one or more predetermined annotations with certain portions of the content, such as, for example, "Slow part", "Scary", "Violent", etc. These annotations can be user-designated, set by the MSO, or otherwise as desired. Such annotations can be useful, for example, to warn viewers of impending themes, situations, action, etc. which may be of particular interest, not suitable for children, etc.

These annotations may also be inserted by the content provider, in effect extending the utility of the well known "rating system" used for alerting viewers as to the maturity, sexual content, etc. of the content.

Alternatively, utilization of the aforementioned personalization software may enable a user to create user-edited versions of content which contain and eliminate those sections of a program which the user does not find suitable, is excessive, etc. The user may then opt to place the edited version of the content into the priority playlist 212, or on the aforementioned personalized EPG.

Charitable Content

In yet another variant, the apparatus and methods disclosed above may be utilized to provide users with a "virtual charity channel" which aggregates charity content from various sources into a virtual user or program channel. See, e.g., co-owned and co-pending U.S. patent application Ser. No. 12/393,981 entitled "METHODS AND APPARATUS FOR PROVIDING CHARITABLE CONTENT AND RELATED FUNCTIONS" filed Feb. 26, 2009, and incorporated herein by reference in its entirety- Specifically, the virtual charity channel would incorporate the methods and apparatus discussed above to create a channel for viewing content compiled from various sources, including, inter alia, DVR, broadcast, VOD, Start Over, etc., and particularly that content selected to align with a user's charitable preferences. In one embodiment, the user profile is configured to maintain data based on a user's past or contemporaneous interactions with respect to particular types of charitable content, or primary content which can be contextually related to charitable content. The compiled charitable content may, in one embodiment, be presented to the user in the form of a "playlist" from which a user may select desired content for viewing and/or recording. The charitable content may have varying degrees or aspects of similarity to that presented in a "playlist" of recommended content or elsewhere, including collective content listed in the EPG.

Business Methods and Considerations

The variety of different functions and content "shaping" options provided by the VPMC and user interfaces of the present invention also afford several opportunities for new or enhanced business models. Various business-related aspects of the VPMC and improved EPG interfaces previously discussed herein are now described in detail.

Specifically, in one embodiment, creation and access to a user's VPMC (and the personalized EPG) are provided as incentives or features as part of the subscriber's subscription plan. For instance, premium or new subscribers may be offered these features (either as a bundle, or in various grades) as an incentive or "teaser" to continue their subscription or upgrade it. Alternatively, subscribers may pay a fee for the additional capability.

Additionally, a "watch-along" function may also be marketed as an incentive or additional premium feature. Specifically, parents or others may have the capability to both monitor what their children may watch via Internet access, and modify or edit the priority playlist 212 for the VPMC. Accordingly, the parent or other user is given control and access, even while that person is not near to the location where the VPMC is viewed. This function enables the parent or other user not only to create a custom playlist given the recommendation engine 601 suggestions, but also allows the user to prohibit specific users from viewing material not on the VPMC, i.e., not "pre-approved". This function may also be offered for a premium, or as part of an incentive package. This paradigm can also be readily extended into the enterprise or business arenas, such as to monitor/control employee channel usage.

Similarly, the ability to access one's DVR and/or the VPMC and recommendation engine 601 over an MSO operated website may be offered at a premium, or alternatively as a premium or new subscription or incentive feature.

Access to playlists generated for other individuals may also be used by the MSO or content provider as a "value added" basis. For example, the MSO or content provider may have an arrangement with a celebrity whereby the playlists generated for that celebrity are periodically distributed to user's in the MSO network, such as for an additional monthly fee. In this fashion, subscribers would be advised of what their favorite celebrities might be watching at any given time. Similarly, different user profiles ranging from those based on one other individual, to those based on a large sampling of the subscriber base, or on a particular demographic, genre, time period, etc., could be accessed by a subscriber. The playlist "package" afforded to a given subscriber might be based on subscription level for example; i.e., premium subscribers would receive the widest range of profiles/playlists, while those at lower subscription levels would receive a smaller or more restricted set.

The ability to create customized user profiles might also be tied to consideration given by the subscriber. For example, premium subscribers might be given an expansive set of profile creation and editing tools (thereby ostensibly providing more accurate profiles/playlists), while those at lower subscription levels might only be given a limited or rudimentary set of tools, or none at all.

As previously noted, delivery of content via the VPMC and/or the personalized EPG can also be effected over a TCP/IP-based or similar transport according to the methods and apparatus described in co-owned U.S. patent application Ser. No. 11/198,620 entitled "Method And Apparatus For Context-Specific Content Delivery" filed Aug. 4, 2005, which issued as U.S. Pat. No. 9,286,388 on Mar. 15, 2016 and is incorporated herein by reference in its entirety, which describes, inter alia, the display and seamless transition of primary and secondary content within, e.g., a unified display mechanism (window) in the context of computer-based access such as that described with respect to FIG. 8b or 8c herein. This integration allows for yet additional business or economic opportunities, since the content downloaded by the user can be coupled (seamlessly) to an advertising server or the like, the latter presenting the user with context-specific links or other information (secondary content) relating to the primary content (e.g., video) downloaded. The user then merely selects one or more of these links, and is provided additional information relating to the topic of interest (either the primary content or the links which individually may or may not be commercial in nature). These links can be accessed, e.g., a traditional IP or similar mechanism of the type previously described herein, such as the well known WAP protocol and browser.

Other types of incentives may be used as the basis for a business model as well. For example, an MSO might arrange to have an actor be "live" on a blog, VoIP telephony channel, webcam video, etc. which is made accessible only to donators to a particular charity (and/or of a certain level of donation). The donating user(s) might also be given that actor's "playlist" for a period of time so that the user can watch the same programs or content recommended to or selected by the actor.

Operations/Business Rules Engine

In another aspect of the invention, the aforementioned recommendation engine 601 (rendered as one or more computer programs disposed on e.g., the server 700 and/or the CPE 106) includes a so-called "rules" engine. These rules may be fully integrated within various entities associated with the present invention, or may be associated with the recommendation engine 601 itself, and controlled via e.g., the aforementioned interfaces 470. In effect, the rules engine comprises a supervisory entity which monitors and selectively controls the content recommendation function at a higher level, so as to implement desired operational or business rules. The rules engine can be considered an overlay of sorts to the recommendation and playlist/EPG population algorithms. For example, the recommendation engine 601 may make certain recommendations or playlist collections based on the user profile(s) of interest and the metadata associated with particular content elements. However, these recommendations may not always be compatible with higher-level business or operational goals, such as maximizing profit/revenue, best use of network resources, or system reliability. Hence, when imposed, the business/operational rules can be used to dynamically and transparently (or manually) control the operation of the recommendation engine 601. The rules may be, e.g., operational or business-oriented in nature, or related to preservation of security, and may also be applied selectively in terms of time of day, duration, specific local areas, or even at the individual premises or user level.

For example, as previously noted, where two content elements are effectively equal in relevance or rating for a given user profile ("don't care"), profitability or revenue information associated with the two choices can be evaluated to determine which selection is likely to produce more revenue or profit for the MSO or a third party (e.g., advertiser). Similarly, acquisition costs (e.g., RTA) for the various options may also be considered. Such rules can also be applied such as to outweigh or overturn recommendations by the engine.

Moreover, different aspects of the content, user, and network can be included within the recommendation engine so as to impose desired operational or business rules For example, the engine 601 might perform a three-faceted analysis for generating recommendations: (i) matching content metadata to a user profile, as discussed at length previously herein; (ii) evaluating the revenue, cost, and/or profitability aspects of various alternatives; and (iii) evaluating operational considerations (such as latency for delivery of content, reliability, Quos of the delivered content, user satisfaction, need for transcoding, etc.). The results of these three analyses might then be used as input to a weighted "Scoring" algorithm that generates a composite score for each piece of content; the playlist can then be assembled based simply on highest-to-lowest score (or some other such scheme).

Another rule implemented by the rules engine may comprise providing a virtual channel (a VPMC) of recommended content only to certain classes of subscribers (e.g., those at a premium level of service, or subscribers who have "opted-in" to receiving the channel), those in a particular geographic or network service area, those requesting at a particular time of day or day of the week, etc.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. A method of operating a content server entity for provision of content based at least in part on a user profile, said user profile commonly associated with a plurality of Internet Protocol (IP)-enabled client devices, said method comprising:
   receiving a plurality of content metadata from one or more content sources regarding respective ones of a plurality of content elements, said plurality of content elements comprising one or more of: (i) on-demand content elements, (ii) broadcast program content elements, and (iii) digital video recorder content elements;
   comparing said plurality of content metadata to user criteria data associated with said user profile;
   based at least in part on said act of comparing, selecting a subset of said plurality of content metadata for use in generation of a virtual channel, the virtual channel comprising ones of said plurality of content elements associated with said subset of metadata;
   receiving a request from a first of said IP-enabled client devices to view at least one content element of said virtual channel; and
   responsive to said request, causing said first client device to automatically switch to receive said at least one content element;
   automatically switching said first client device to receive a second content element of said virtual channel after completion of said at least one content element; and
   responsive to receiving user action data from a second of said IP-enabled client devices:
     updating said user criteria data associated with said user profile;
     comparing said plurality of content metadata to said updated user criteria data; and
     based at least in part on said comparing, selecting an updated subset of said plurality of content metadata for use in generating said virtual channel.

2. The method of claim 1, wherein said comparing said plurality of content metadata to user criteria data comprises matching a prescribed minimum number of said plurality of content metadata to user criteria data.

3. The method of claim 1, wherein said comparing said plurality of content metadata to user criteria data comprises determining a weighted similarity between said plurality of content metadata and user criteria data.

4. The method of claim 1, wherein said user action data comprises feedback relating to individual ones of said ones of said plurality of content elements of said virtual channel.

5. A method of delivering content associated with a user profile, said method comprising:
   identifying a user profile associated with a plurality of Internet Protocol (IP) enabled client devices;
   retrieving a plurality of content metadata from one or more content sources, each of said plurality of content metadata comprising respective channel data for an associated content element;
   determining a similarity of individual ones of said plurality of content metadata to user criteria data associated with said user profile;
   generating a playlist comprising individual ones of a plurality of the associated content elements having content metadata with at least a minimum determined similarity to said user criteria data, said playlist arranged according to said minimum determined similarity and comprising at least channel data for said individual ones of the associated content elements;
   storing said playlist at a storage device accessible by each of said plurality of IP-enabled client devices;
   responsive to a request from a first device of said plurality of IP-enabled client devices for a virtual channel comprising said playlist, cause said first device to automatically play at least a first individual one of associated content elements on said playlist using at least channel data associated therewith, the automatic playing comprising playing at least a second individual one of said associated content elements on said playlist when said first individual one of said content elements on said playlist has completed; and
   responsive to a user action associated with said playlist from a second device of said plurality of IP-enabled client devices, (i) updating user criteria data associated with said user profile, and (ii) rearranging said playlist based at least in part on said updated user criteria data.

6. The method of claim 5, wherein said automatic playing of said first individual one of said content elements comprises receiving a simulcast that is received by at least one other device of said plurality of IP-enabled client devices.

7. The method of claim 5, wherein said automatic playing of said first individual one of said content elements comprises tuning to a broadcast of said first individual one of said content elements via said virtual channel.

8. The method of claim 7, wherein said automatic playing of said first individual one of said content elements starts after said broadcast of said first individual one has begun.

9. The method of claim 5, wherein said automatic playing of said first individual one of said content elements comprises retrieving said first individual one from a subscriber premises gateway storage device.

10. The method of claim 5, wherein said automatic playing of said first individual one of said content elements comprises tuning to a Quadrature Amplitude Modulated (QAM) channel based on said associated channel data of said first individual one of said content elements.

11. The method of claim 10, wherein said automatic playing of said first individual one of said content elements comprises:
   recording said first individual one of said content elements at a first time; and
   playing said first individual one of said content elements at a second time occurring after the first time.

12. The method of claim 5, wherein said user action data comprises feedback relating to watched individual ones of said content elements of said playlist.

13. An apparatus for delivery of targeted content in a content delivery network, said apparatus comprising:
   a network interface;
   a storage device configured to store at least a user-based profile associated with a first user device and an Internet Protocol (IP)-enabled user device at a different location from said first user device, said first user device in data communication with said IP-enabled device via one or more of said content delivery network and an Internet; and
   a processor configured to run at least one computer program thereon, said computer program comprising a plurality of instructions which when executed by said processor are configured to cause said apparatus to:
      receive information related to a plurality of available content;
      compare said information to user criteria data associated with said stored user-based profile;
      select individual ones of said plurality of available content for delivery to said first user device based at least in part on said comparison;
      receive a request from said first user device to tune to a virtual channel comprising said selected individual ones of said plurality of available content;
      based at least in part on said request, cause a tuner associated with said first user device to automatically tune to one or more Quadrature Amplitude Modulated (QAM) channels dedicated to delivery of said selected individual ones of said plurality of available content;
      receive user action data from said IP-enabled user device at said remote location from said first user device, said user action data indicative of one or more user actions with respect to one or more of said selected individual ones of said plurality of available content; and
      dynamically modify said user criteria data associated with said user-based profile based at least in part on said user action data received from said IP-enabled client device at said different location from said first user device
   wherein each of said user action data indicative of said one or more user actions each comprise a classification, said classification comprising at least one of: (i) a view of said selected content to completion, (ii) navigation away from said selected content, or (iii) recordation of said selected content by said user;
   wherein said dynamic modification of said user-based profile comprises application of a weighing factor to each of said data indicative of said one or more user actions based on a predicted effect thereof and said classification.

14. The apparatus of claim 13, wherein said information related to said plurality of available content comprises metadata rendered at least partly in a human-readable form.

15. The apparatus of claim 13, wherein said selected individual ones of said plurality of available content are compiled into a selected content list, said selected content list having entries thereof prioritized based at least in part on at least one result from said comparison.

16. The apparatus of claim 13, wherein said comparison further comprises:
   generation of records related to one or more aspects of each of said plurality of available content; and
   utilization of said records to find matches between said one or more aspects of said plurality of available content and one or more aspects of said user-based profile.

17. The apparatus of claim 13, wherein said instructions are further configured to, when executed by said processor, cause said apparatus to:
   compare said information to said modified user-based profile; and
   select a second set of individual ones of said plurality of available content for delivery to said first user device based at least in part on said comparison to said modified user-based profile.

18. The apparatus of claim 13, wherein said user-based profile is selected at least for said first user device based on a time of day.

* * * * *